United States Patent [19]
Nishikawa et al.

[11] Patent Number: 6,058,322
[45] Date of Patent: May 2, 2000

[54] METHODS FOR IMPROVING THE ACCURACY IN DIFFERENTIAL DIAGNOSIS ON RADIOLOGIC EXAMINATIONS

[75] Inventors: Robert M. Nishikawa, Batavia; Yulei Jiang, Chicago; Kazuto Ashizawa; Kunio Doi, both of Willowbrook, all of Ill.

[73] Assignee: Arch Development Corporation, Chicago, Ill.

[21] Appl. No.: 08/900,361

[22] Filed: Jul. 25, 1997

[51] Int. Cl.[7] ........................................ A61B 5/05
[52] U.S. Cl. ........................ 600/408; 128/925; 382/128
[58] Field of Search ................................ 600/407, 408; 128/920, 922, 925; 382/128, 130, 133

[56] References Cited

U.S. PATENT DOCUMENTS

| | | | |
|---|---|---|---|
| 4,839,807 | 6/1989 | Doi et al. . | |
| 4,875,165 | 10/1989 | Fencil et al. | 128/920 |
| 4,907,156 | 3/1990 | Doi et al. . | |
| 5,072,384 | 12/1991 | Doi et al. | 382/128 |
| 5,133,020 | 7/1992 | Giger et al. . | |
| 5,150,292 | 9/1992 | Hoffmann et al. | 600/431 |
| 5,224,177 | 6/1993 | Doi et al. | 382/54 |
| 5,289,374 | 2/1994 | Doi et al. | 382/128 |
| 5,319,549 | 6/1994 | Katsuragawa et al. | 382/128 |
| 5,343,390 | 8/1994 | Doi et al. | 382/128 |
| 5,359,513 | 10/1994 | Kano et al. | 128/920 |
| 5,452,367 | 9/1995 | Bick et al. | 382/128 |
| 5,537,485 | 7/1996 | Nishikawa et al. | 382/130 |
| 5,598,481 | 1/1997 | Nishikawa et al. | 382/130 |
| 5,638,458 | 6/1997 | Giger et al. | 382/132 |
| 5,657,362 | 8/1997 | Giger et al. | 382/171 |
| 5,790,690 | 8/1998 | Doi et al. | 382/128 |

*Primary Examiner*—Brian L. Casler
*Attorney, Agent, or Firm*—Oblon, Spivak, McClelland, Maier & Neustadt, P.C.

[57] ABSTRACT

A computer-aided method for detecting, classifying, and displaying candidate abnormalities, such as microcalcifications and interstitial lung disease in digitized medical images, such as mammograms and chest radiographs, a computer programmed to implement the method, and a data structure for storing required parameters, wherein in the classifying method candidate abnormalities in a digitized medical image are located, regions are generated around one or more of the located candidate abnormalities, features are extracted from at least one of the located candidate abnormalities within the region and from the region itself, the extracted features are applied to a classification technique, such as an artificial neural network (ANN) to produce a classification result (i.e., probability of malignancy in the form of a number and a bar graph), and the classification result is displayed along with the digitized medical image annotated with the region and the candidate abnormalities within the region. In the detecting method candidate abnormalities in each of a plurality of digitized medical images are located, regions around one or more of the located candidate abnormalities in each of a plurality of digitized medical images are generated, the plurality of digitized medical images annotated with respective regions and candidate abnormalities within the regions are displayed, and a first indicator (e.g., blue arrow) is superimposed over candidate abnormalities comprising of clusters and a second indicator (e.g., red arrow) is superimposed over candidate abnormalities comprising of masses. In a user modification mode, during classification, a user modifies the located candidate abnormalities, the determined regions, and/or the extracted features, so as to modify the extracted features applied to the classification technique and the displayed results, and, during detection, a user modifies the located candidate abnormalities, the determined regions, and the extracted features, so as to modify the displayed results.

43 Claims, 28 Drawing Sheets

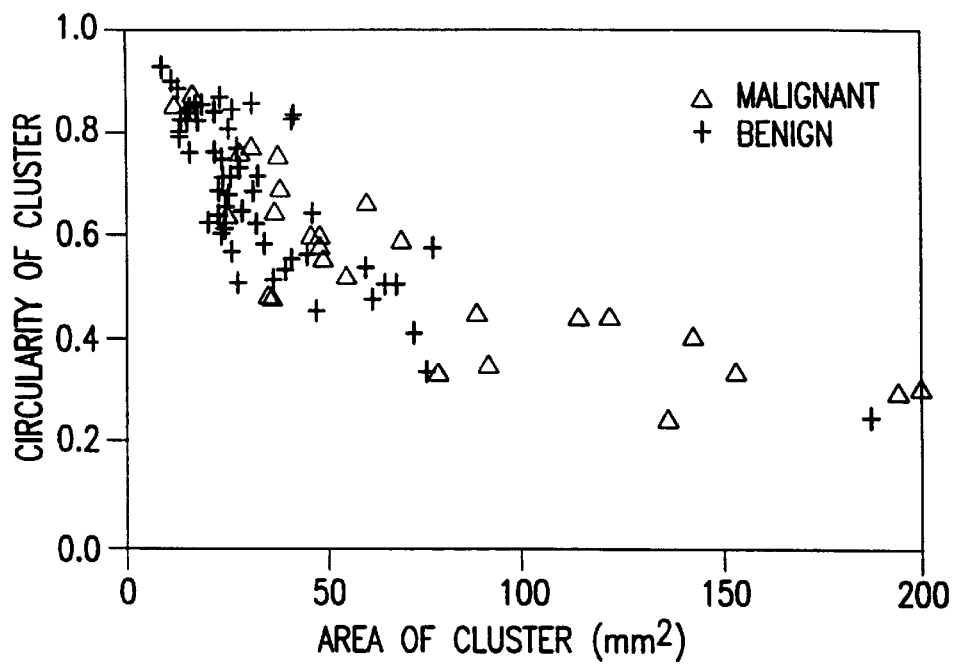
FIG12.A
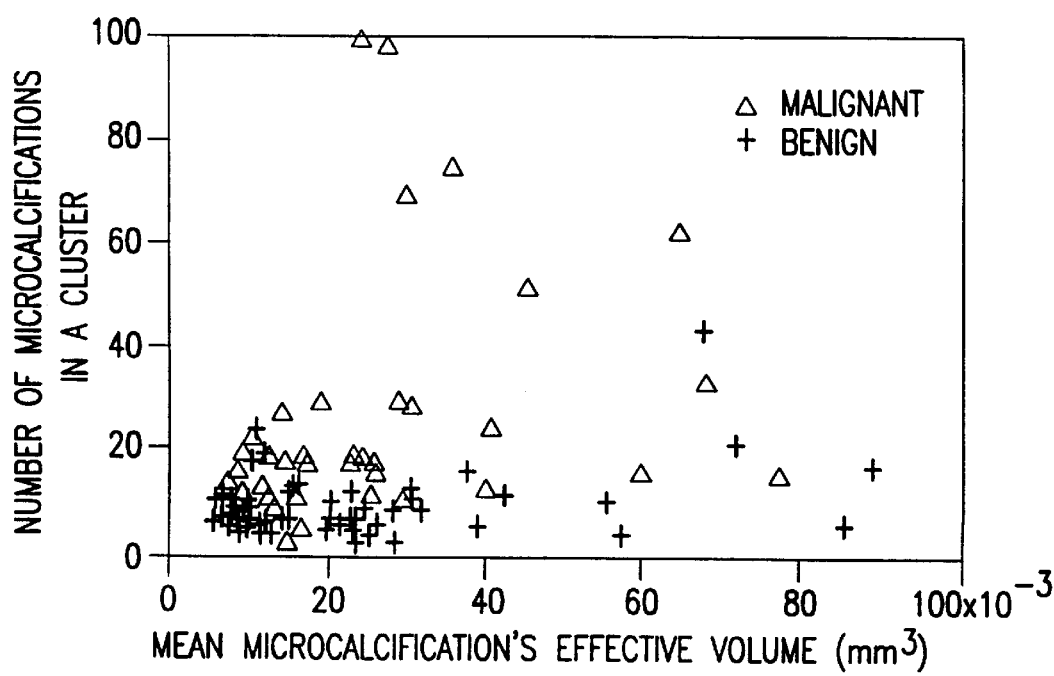
FIG12.B

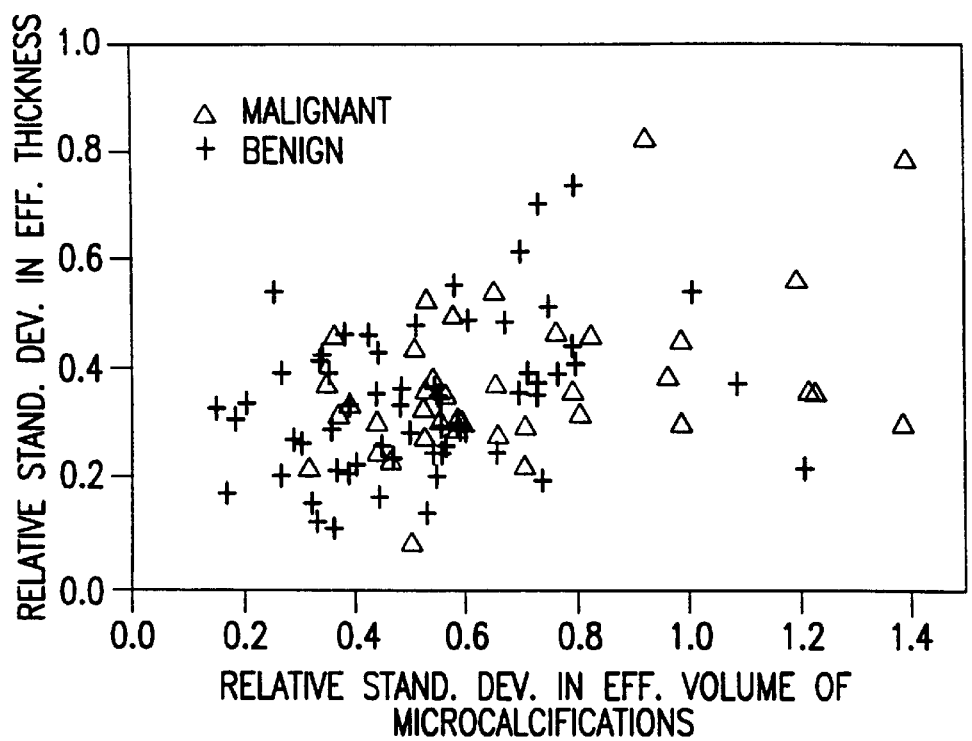
FIG.12C
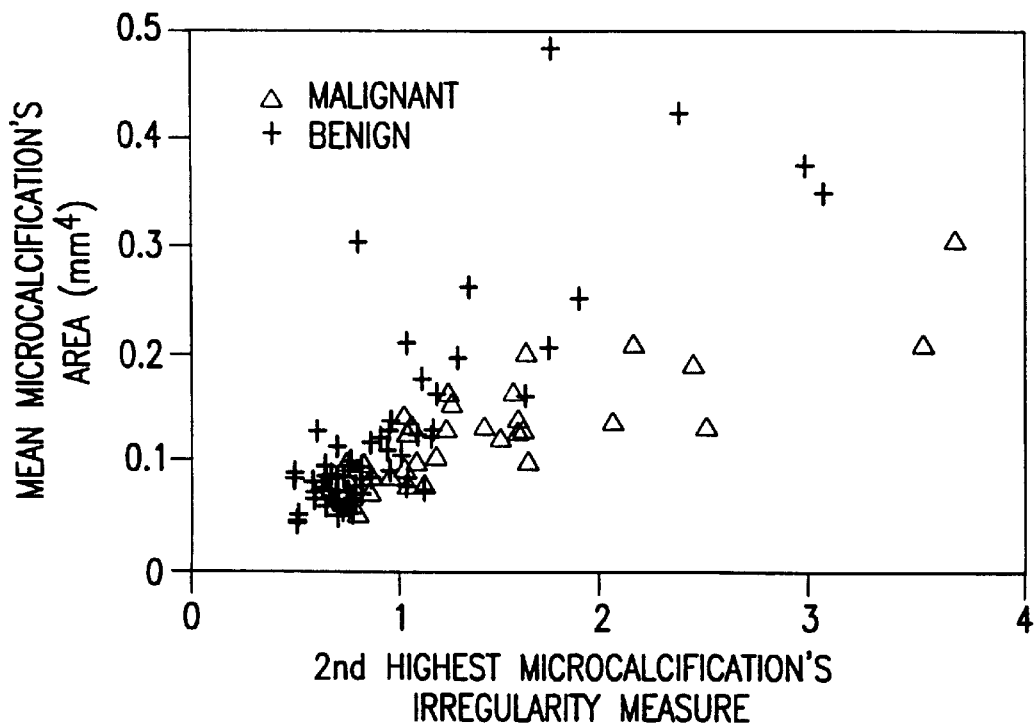
FIG12.D

SCORE SHEET

CASE NO. 121                                DATE: _____
CLINICAL INFORMATION              OBSERVER: _____
    AGE: 27 YRS,     SEX: MALE, ~~FEMALE~~
    TEMPERATURE : 39.8°C
    IMMUNE STATUS : ~~NORMAL~~, SUPPRESSED
    UNDERLYING MALIGNANCY   ~~YES~~, NO

| | |
|---|---|
| DURATION OF SYMPTOMS : (0–12 MON.) | 0.5 |
| SEVERITY OF SYMPTOMS : (0–10) | 8 |
| SMOKING : (0–10) | 4 |
| DRUG TREATMENT : (0–10) | 0 |
| DUST EXPOSURE : (0–10) | 0 |

DIFFERENTIAL DIAGNOSIS (MARK BY A PEN APPROPRIATE LOCATIONS ON ALL DISEASES)

ABSENT(0)                           PRESENT (100)

SARCOIDOSIS    |_____|
MILIARY Tbc    |_____|
LYM. Ca.    |_____|
EDEMA    |_____|
SILICOSIS    |_____|
SCLERODERMA    |_____|
PCP    |_____|
EG    |_____|
IPF    |_____|
VIRAL PNEUMONIA |_____|
DRUG TOXICITY    |_____|

FIG.22

METHODS FOR IMPROVING THE ACCURACY IN DIFFERENTIAL DIAGNOSIS ON RADIOLOGIC EXAMINATIONS

CROSS REFERENCES TO RELATED APPLICATIONS

The present invention generally relates to CAD techniques for automated detection of abnormalities in digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,668,888; 5,673,332; 5,790,690; 5,832,103; 5,873,824; 5,881,124; as well as U.S. patent applications Ser. Nos. 08/158,388; 08/173,935; 08/523,210; 08/757,611; 08/900,188; 09/900,189; 08/900,191; 08/900,192; and 08/900,362; all of which are incorporated herein by reference. The present invention includes use of technologies referenced and described in the above-noted U.S. Patents and Applications, as well as described in the references identified in the appended APPENDIX and cross-referenced throughout the specification by reference to the number, in brackets and bold print, of the respective reference listed in the APPENDIX, the entire contents of which, including the related patents and applications listed above and references listed in the APPENDIX, are incorporated herein by reference.

This invention was made in part with U.S. Government support under grant numbers USPHS CA 62625, CA 60817, and CA 64370 from National Cancer Institute, National Institute of Health, and Department of Health and Human Services, and under grant numbers MRH DAMD 17-93-J-3021 and 71-96-1-6228 from the U.S. Army and Department of Defense. The Government has certain rights in the invention.

BACKGROUND OF THE INVENTION

1. Field of the Invention

This invention relates generally to an automated method and system for detecting, classifying and displaying abnormal anatomic regions, particularly individual and clustered microcalcifications, lesions, parenchymal distortions, interstitial lung disease, etc. existing in digital medical images, such as mammograms and chest radiographs.

2. Discussion of Background

Detection and diagnosis of abnormal anatomical regions in radiographs, such as cancerous lung nodules in chest radiographs and microcalcifications in women's breast radiographs, so called mammograms, are among the most important and difficult task's performed by radiologists. [1–27]

Recent studies have concluded that the prognosis for patients with lung cancer is improved by early radiographic detection. In one study on lung cancer detection, it was found that, in retrospect, 90% of subsequently diagnosed peripheral lung carcinomas were visible on earlier radiographs. The observer error which caused these lesions to be missed may be due to the camouflaging effect of the surrounding anatomical background on the nodule of interest, or to the subjective and varying decision criteria used by radiologists. Underreading of a radiograph may be due to a lack of clinical data, lack of experience, a premature discontinuation of the film reading because of a definite finding, focusing of attention on another abnormality by virtue of a specific clinical question, failure to review previous films, distractions, and "illusory visual experiences."

Similarly, early diagnosis and treatment of breast cancer, a leading cause of death in women, significantly improves the chances of survival. X-ray mammography is the only diagnostic procedure with a proven capability for detecting early-stage, clinically occult breast cancers. Between 30 and 50% of breast carcinomas detected radiographically demonstrate microcalcifications on mammograms, and between 60 and 80% of breast carcinomas reveal microcalcifications upon microscopic examination. Therefore any increase in the detection of microcalcifications by mammography will lead to further improvements in its efficacy in the detection of early breast cancer. The American Cancer Society has recommended the use of mammography for screening of asymptomatic women over the age of 40 with annual examinations after the age of 50. For this reason, mammography may eventually constitute one of the highest volume X-ray procedures routinely interpreted by radiologists.

A computer scheme that alerts the radiologist to the location of highly suspect lung nodules or breast microcalcifications should allow the number of false-negative diagnoses to be reduced. [28–42, 45–51, 53–56, 58–60, 63–70, 105] This could lead to earlier detection of primary lung and breast cancers and a better prognosis for the patient. As more digital radiographic imaging systems are developed, computer-aided searches become feasible.

Successful detection schemes could eventually be hardware implemented for on-line screening of all chest radiographs and mammograms, prior to viewing by a physician. Thus, chest radiographs ordered for medical reasons other than suspected lung cancer would also undergo careful screening for nodules.

Several investigators have attempted to analyze mammographic abnormalities with digital computers. However, the known studies failed to achieve an accuracy acceptable for clinical practice. This failure can be attributed primarily to a large overlap in the features of benign and malignant lesions as they appear on mammograms.

The currently accepted standard of clinical care is such that biopsies are performed on 5 to 10 women for each cancer removed. Only with this high biopsy rate is there reasonable assurance that most mammographically detectable early carcinomas will be treated. Given the large amount of overlap between the characterization of abnormalities may eventually have a greater impact in clinical care. Microcalcifications represent an ideal target for automated detection, because subtle microcalcifications are often the first and sometimes the only radiographic findings in early, curable, breast cancers, yet individual microcalcifications in a suspicious cluster (i.e., one requiring biopsy) have a fairly limited range of radiographic appearances.

One of the early steps in a computer-aided system is to segment a digitized radiographic image, such as a mammogram, into foreground, for example, corresponding to the breast and background, for example, corresponding to the external surroundings of the breast (see, e.g., U.S. Pat. No. 5,452,367.) This segmentation reduces the amount of further processing because extraneous pixels belonging to the background are removed from further consideration. Also, the boundary contour or border between the foreground and the background, theoretically at the skinline, is ascertained. Next, a search for masses within the area segmented as corresponding to the breast may be accomplished by analyzing the size and shape of spots, sometimes referred to as "blobs" or "islands", that are discriminated by thresholding the mammogram at one or a few intensity levels. For example, in U.S. Pat. No. 5,212,637, a search for masses in different intensity ranges utilizes a calculated initial threshold value which threshold value is incremented no more than three times "Blobs" produced by thresholding the mammogram at the initial or at an incremented threshold value, which correspond to regions having a sufficient prominence in intensity with respect to their immediate surround are classified as "potentially malignant" based on their size and shape, i.e. area, circularity, and eccentricity (see, also, U.S. patent application Ser. No. 08/515,798 now U.S. Pat. No. 5,832,103.)

The inventors and others at the Radiology Department at the University of Chicago have been developing a computerized scheme for the detection of clustered microcalcifications in mammograms with the goal of assisting radiologists' interpretation accuracy. (See H. P. Chan et al., "Image feature analysis and computer-aided diagnosis in digital radiography. 1. Automated detection of microcalcifications in mammography," Med. Phys. 14, 538–548 (1987); H. P. Chan et al., "Computer-aided detection of microcalcifications in mammograms: Methodology and preliminary clinical study," Invest Radiol. 23, 664–671 (1988); H. P. Chan et al., "Improvement in radiologists' detection of clustered microcalcifications on mammograms: The potential of computer-aided diagnosis," Invest Radiol. 25, 1102–1110 (1990); R. M. Nishikawa et al., "Computer-aided detection and diagnosis of masses and clustered microcalcifications from digital mammograms," Proc. SPIE 1905, 422–432 (1993); and R. M. Nishikawa et al., "Computer-aided detection of clustered microcalcifications: An improved method for grouping detected signals," Med. Phys. 20, 1661–1666 (1993).)

The computer outputs from this scheme, which involves quantitative analysis of digitized mammograms, indicate possible locations of clustered microcalcifications. These locations can be marked by arrows superimposed on mammograms displayed on the monitor of a workstation. (See U.S. Pat. No. 4,907,156.) If the computer output is presented to radiologists as a "second opinion" (see K. Doi et al., "Digital radiography: A useful clinical tool for computer-aided diagnosis by quantitative analysis of radiographic images," Acta Radiol 34, 426–439 (1993); and M. L. Giger, "Computer-aided diagnosis," RSNA Categorical Course in Physics, 283–298 (1993)), it is expected that the accuracy in detecting clustered microcalcifications in mammograms would be improved by reducing false-negative detection rate. The prior computer-aided diagnosis (CAD) scheme has a sensitivity (i.e., to include as many true microcalcifications as possible) of approximately 85% with 0.5 false-positive clusters per mammogram. Since the sensitivity is at a relatively high level, a reduction of false-positive detection rate is desired before beginning clinical testing. The prior scheme uses the first moment of the power spectrum and the distribution of microcalcification signals to eliminate false-positive microcalcification signals. To reduce further the false-positive rate, new techniques, including application of an artificial neural network (see U.S. Pat. Nos. 5,463,548, 5,491,627, 5,422,500, 5,622,171 and 5,732,697 and pending U.S. patent application Ser. No. 08/562,087) and an area-thickness analysis (see Y. Jiang et al., "Method of extracting microcalcifications' signal area and signal thickness from digital mammnograms," Proc SPIE 1778, 28–36 (1992)) have been investigated and have been shown to be effective.

Differential diagnosis of interstitial lung disease is one of the major subjects in chest radiology (see U.S. Pat. Nos. 4,839,807, 5,289,374, 5,319,549, 5,343,390, and 5,638,458 and pending U.S. patent application Ser. No. 08/758,438.) It is also a difficult task for radiologists because of the similarity of radiological findings on chest radiographs and the complexity of clinical parameters. Artificial neural networks (ANNs) have been applied using hypothetical cases for differential diagnosis of interstitial lung disease and showed the potential utility of ANNs (see, e.g., Asada et al., "Potential usefulness of an artificial neural network for differential diagnosis of interstitial lung disease: pilot study," Radiology 1990, 177:857–860, and U.S. Pat. No. 5,622,171, and pending U.S. patent application Ser. Nos. 08/562,087, and 08/758,438.) However, no testing has been performed with actual clinical cases along with hypothetical cases.

Computer-aided diagnosis (CAD), a diagnosis made by a radiologist who considers the results of a computerized analysis of the radiograph when making his/her decision, has been proposed as a means of improving radiologists' ability to detect and diagnose disease. However, in order for CAD to be effective, clinically, the computerized techniques must be sufficiently accurate to aid the radiologist, and the computer results need to be conveyed to the radiologist in a meaningful and easy-to-use manner (see, e.g., pending U.S. patent application Ser. No. 08/757,611.)

There are generally two different types of CAD techniques being developed. One is for the detection of abnormalities, where the computer identifies suspicious areas (ROIs) in the radiograph. The other is quantification of the an area of an image, for example classifying a lesion as benign or malignant. Here the task is not to find suspicious areas, but rather to provide some quantitative assessment of the area to assist the radiologist in making a diagnosis or recommending patient treatment.

However, further improvement in detecting, classifying and displaying abnormal anatomic regions, particularly individual and clustered microcalcifications, lesions, parenchymal distortions, interstitial lung disease, etc. existing in digital medical images, such as mammograms and chest radiographs is desired.

SUMMARY OF THE INVENTION

Accordingly, an object of this invention is to provide an automated method and system for detecting, classifying and displaying abnormal anatomic regions (e.g., individual and clustered microcalcifications, lesions, parenchymal distortions, interstitial lung disease, etc.) existing in digital medical images, such as mammograms and chest radiographs.

Another object of this invention is to provide an automated method and system for providing reliable early diagnosis of abnormal anatomic regions.

Another object of this invention is to provide an automated method and system for detecting, classifying and displaying abnormal anatomic regions.

A further object of this invention is to provide an automated method and system for detecting, classifying and displaying abnormal anatomic regions, using Artificial Neural Networks (ANNs) with actual clinical cases as well as hypothetical cases.

A still further object of this invention is to provide an automated method and system for detecting, classifying and displaying abnormal anatomic regions, based on difference imaging techniques, image feature analysis, and ANNs, as well a novel computer for implementing the method, and a storage medium for storing a program by which the method is implemented.

Yet another object of this invention is to provide an automated method and system for detecting, classifying and displaying abnormal anatomic regions, with improved displaying of results of computerized analyses to a radiologist.

A still further object of this invention is to provide an automated method and system for detecting, classifying and displaying abnormal anatomic regions, with different display strategies for each of the detection and classification tasks.

Yet another object of this invention is to provide an automated method and system for detecting, classifying and displaying abnormal anatomic regions, in which the number of false positive detections is reduced without decreasing sensitivity (i.e., detection of true positives).

The above and other objects are achieved according to the present invention by providing a new and improved computer-aided method for detecting, classifying, and displaying candidate abnormalities, such as microcalcifications and interstitial lung disease in digitized medical images, such as mammograms and chest radiographs, a computer programmed to implement the method, and a data structure for storing required parameters, wherein in the classifying method candidate abnormalities in a digitized medical image are located, regions are generated around one or more of the located candidate abnormalities, features are extracted from at least one of the located candidate abnormalities within the region and from the region itself, the extracted features are applied to a classification technique, such as an artificial neural network (ANN) to produce a classification result (i.e., probability of malignancy in the form of a number and a bar graph), and the classification result is displayed along with the digitized medical image annotated with the region and the candidate abnormalities within the region. In the detecting method candidate abnormalities in each of a plurality of digitized medical images are located, regions around one or more of the located candidate abnormalities in each of a plurality of digitized medical images are generated, the plurality of digitized medical images annotated with respective regions and candidate abnormalities within the regions are displayed, and a first indicator (e.g., blue arrow) is superimposed over candidate abnormalities comprising of clusters and a second indicator (e.g., red arrow) is superimposed over candidate abnormalities comprising of masses. In a user modification mode, during classification, a user modifies the located candidate abnormalities, the determined regions, and/or the extracted features, so as to modify the extracted features applied to the classification technique and the displayed results, and, during detection, a user modifies the located candidate abnormalities, the determined regions, and the extracted features, so as to modify the displayed results.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIG. 12(a) is a graph showing a distribution of cluster circularity versus cluster area, of malignant and benign clustered microcalcifications;

FIG. 12(b) is a graph showing a distribution of number of microcalcifications within a cluster versus mean effective microcalcifications volume within a cluster, of malignant and benign clustered microcalcifications;

FIG. 12(c) is a graph showing a distribution of relative standard deviation of effective microcalcification thickness within a cluster versus relative standard deviation of effective microcalcification volume within a cluster, of malignant and benign clustered microcalcifications;

FIG. 12(d) is a graph showing a distribution of mean microcalcification area within a cluster versus second highest irregularity measure of microcalcifications within a cluster, of malignant and benign clustered microcalcifications;

FIG. 22 is a score sheet for observer tests for monitoring performance in differential diagnosis of interstitial lung disease with and without computer aid;

DESCRIPTION OF THE PREFERRED EMBODIMENTS

Figure 1:
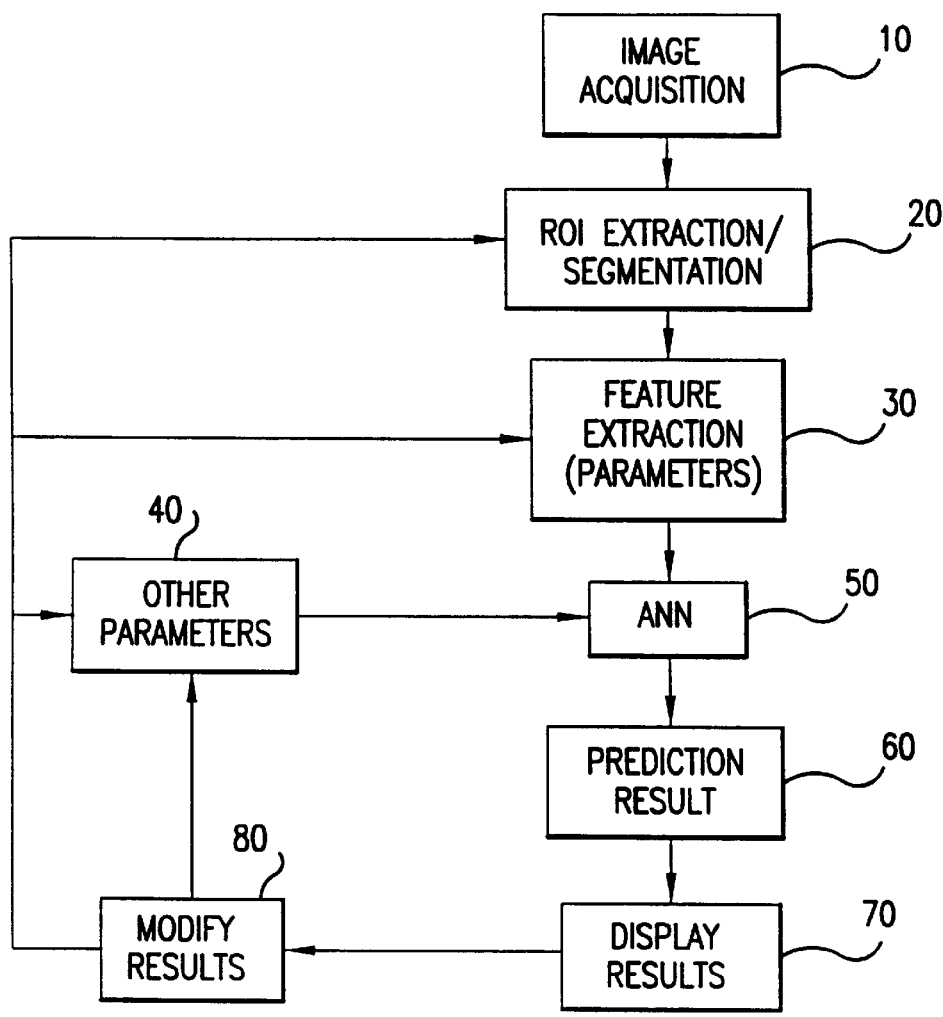
FIG. 1 is a flow chart of the method for detecting, classifying and displaying abnormal anatomic regions, according to the present invention.

Referring now to the drawings, wherein like reference numerals designate identical or corresponding parts throughout the several views, and more particularly to FIG. 1 thereof, there is shown a flow chart illustrating the sequence of processing steps according to the present invention. In a first step 10, a digital radiographic image (or images) is acquired using conventional hardware, such as computed radiography systems, digitizing conventional radiographs using a laser scanner, etc. In step 20, regions of interest (ROIs) are extracted using a segmentation procedure as will be later described. In step 30, features/parameters are extracted which are input into an artificial neural network (ANN) (step 50) along with other parameters (step 40). In step 60, the ANN generates a prediction result, such as a probability of malignancy of an individual or cluster microcalcification or a predication of a probability of an interstitial lung disease lung disease in the ROI. The computer results are displayed in step 70 using, for example, different display schemes depending on detection or classification tasks so as to help radiologists in their diagnosis. However, in step 80, the results from step 70 can be modified by the radiologist so as to modify the processes of steps 20, 30 and 40, as will be later described.

Figure 2:
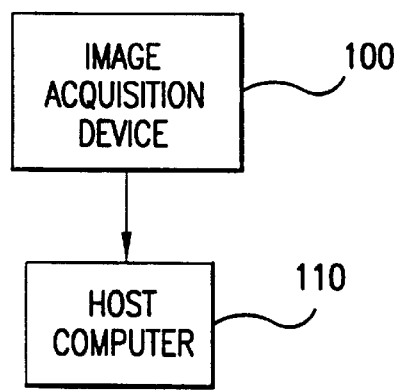
FIG. 2 is a system diagram of the system for detecting, classifying and displaying abnormal anatomic regions, according to the present invention.
Figure 3:
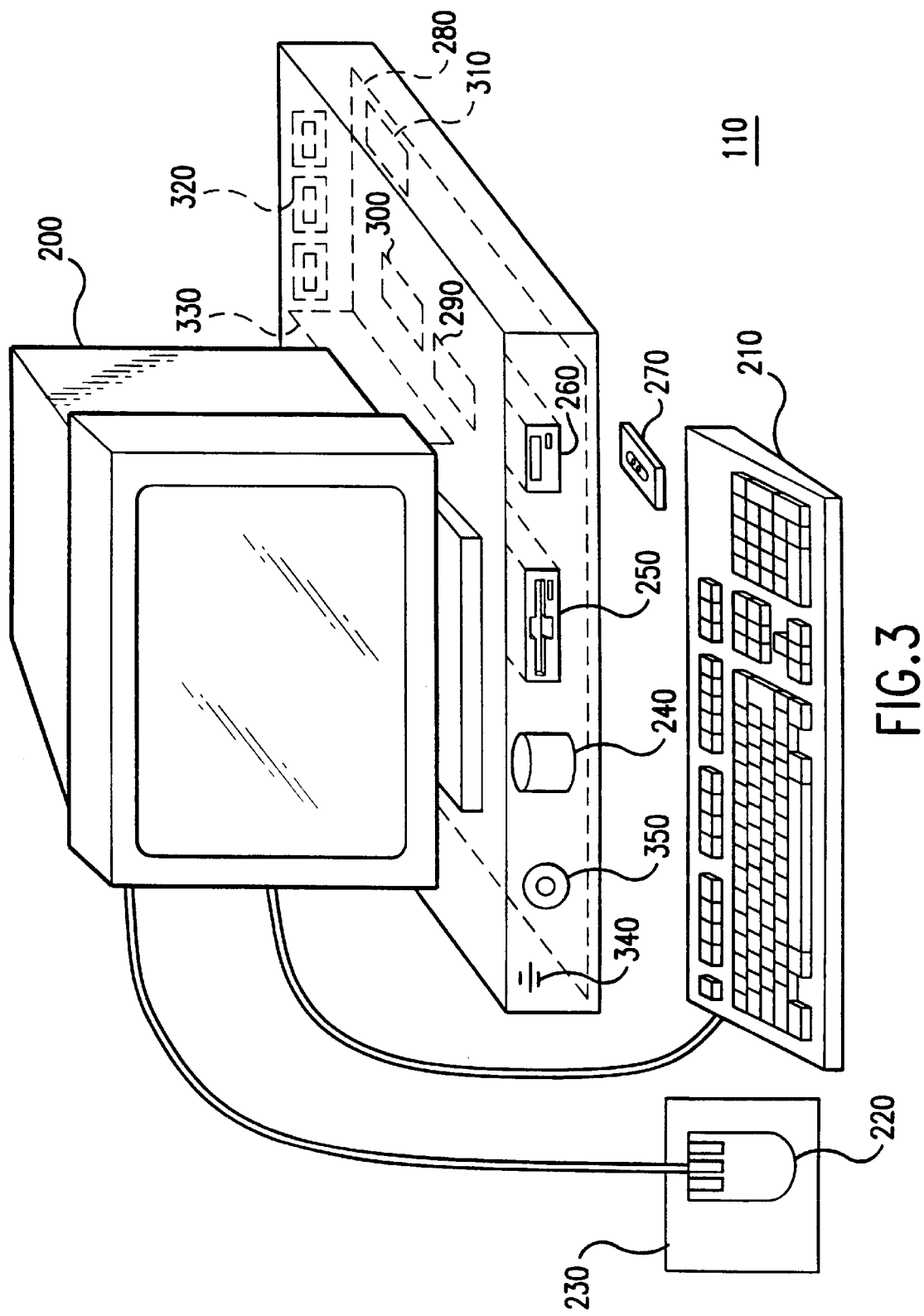
FIG. 3 is a detailed diagram of the computer of FIG. 2.

In FIG. 2, a system for implementing the processes of FIG. 1 is shown including an image acquisition device 100, such as a computed radiography system, a laser scanner, etc., and a computer 110, such as a general purpose computer. The computer 110 is shown in FIG. 3 and, for example, includes a display device 200, such as a touch screen monitor with a touch-screen interface, a keyboard 210, a pointing device 220, a digitizing pad 230, a hard disk 240, a floppy drive 250, a tape or CD ROM drive 260 with tape or CD media 270, and a mother board 280. The motherboard 280 includes a processor 290, a RAM 300, and a ROM 310, I/O ports 320 which are used to couple to the image acquisition device 110, and optional specialized hardware 330 for performing specialized hardware/software functions, such as sound processing, image processing, etc., a microphone 340, and a speaker or speakers 350.

Once an image is acquired by the image acquisition device 100, the computer 110, programmed with appropriate software, performs the processes of FIG. 1, such as the ROI extraction/segmentation (step 20), the feature extraction (step 30), the ANN (step 50), the inputting of other parameters (step 40), the generation of the prediction result (step 60), the displaying of the results (step 70), and the modification of the results (step 80), the details of which will now be described.

ROI EXTRACTION/SEGMENTATION

As previously discussed, one of the early steps in a computer-aided system is to segment a digitized radiographic image, such as a mammogram, into foreground (e.g., corresponding to the breast) and background (e.g., corresponding to the external surroundings of the breast). This segmentation reduces the amount of further processing because extraneous pixels belonging to the background are removed from further consideration. After the medical image is acquired at step 10 of FIG. 1 via the image acquisition device 100 of FIG. 2, the next step of ROI extraction/segmentation (step 20, FIG. 1) is performed as will now be described with reference to FIGS. 4–10.

Figure 4A:
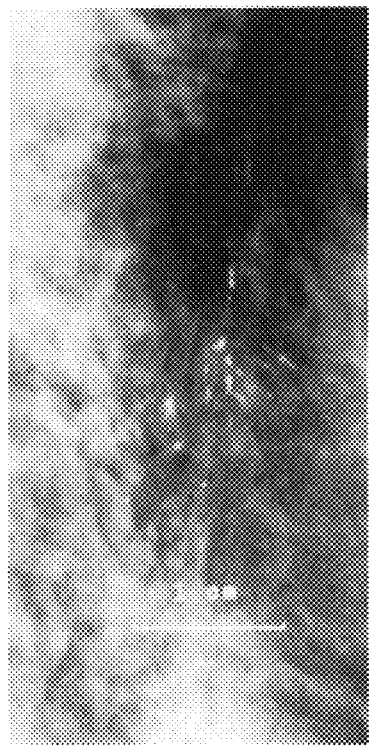
FIGS. 4(a) and 4(b) are images of a malignant and a benign cluster of microcalcifications in an enlarged area of a mammogram, respectively.
Figure 4B:
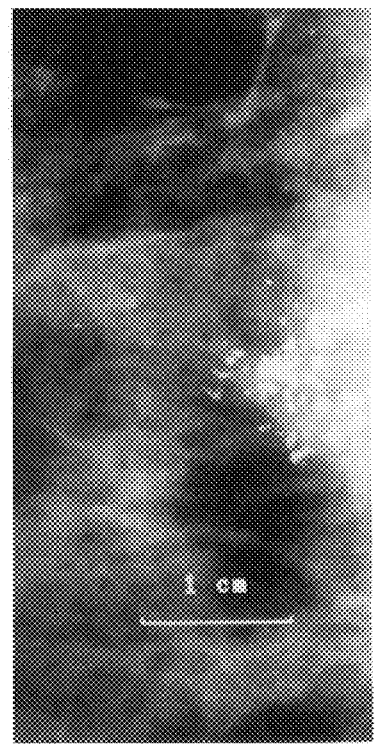

FIG. 4 shows an example of a malignant and a benign mammographic microcalcification cluster. Table 1 lists the set of eight features used in this invention for the classification of microcalcifications in mammographic images.

TABLE 1

EIGHT FEATURES OF CLUSTERED MICROCALCIFICATIONS FOR THE CLASSIFICATION OF MALIGNANT AND BENIGN LESIONS

| Feature Number | Feature Description |
| --- | --- |
| 1 | Cluster circularity |
| 2 | Cluster area |
| 3 | Number of microcalcifications |
| 4 | Average effective volume of microcalcifications |
| 5 | Relative standard deviation in effective thickness |
| 6 | Relative standard deviation in effective volume |
| 7 | Average area of microcalcifications |
| 8 | 2nd highest microcalcification-shape-irregularity measure in a cluster |

The features of Table 1 describe the characteristics of a cluster (features one, two, and three), and the characteristics of individual microcalcifications (features four to eight). These features are extracted automatically by the appropriately programmed computer 110 (FIG. 2), but they correlate qualitatively with radiologists' experience in differentiating malignant from benign clustered microcalcifications. [62] [57][58] This correlation may be the key to the successful use of these features to classify malignant and benign clustered microcalcifications.

Computerized Segmentation of Microcalcifications

Segmentation of a Microcalcification's Area

Computerized segmentation of microcalcifications allows detailed analysis of microcalcifications to be made. It is not a trivial task, however, because while microcalcifications can be extremely small in size and low in contrast, they can be highly variable in appearances. [62] In a database (database A) used for this invention, microcalcifications averaged 0.4 mm in size and 0.15 optical density (OD) units in contrast (or 56 gray levels on a 10-bit gray scale). The standard deviations were 0.46 mnm in size and 0.06 OD units in contrast.

Figure 5:
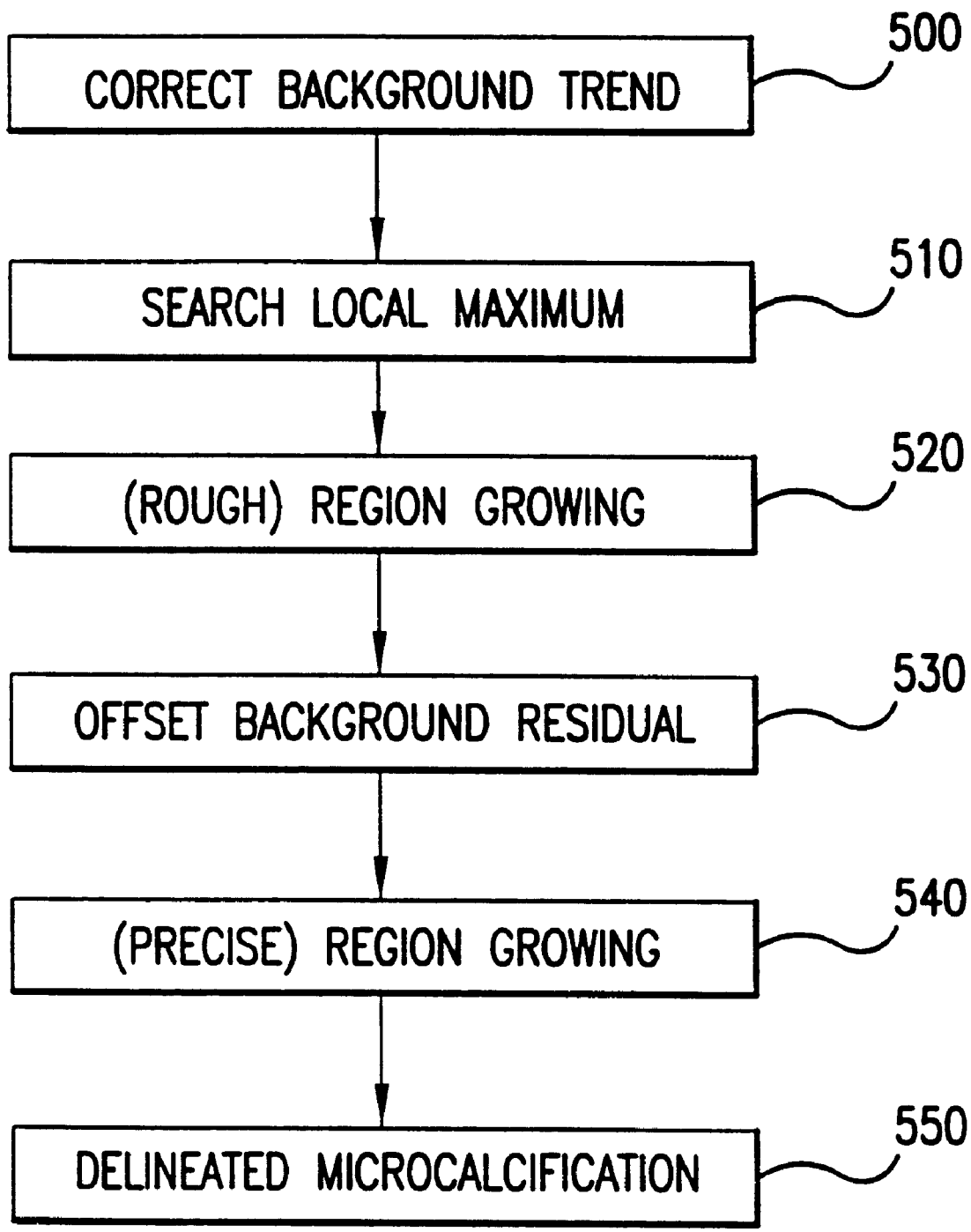
FIG. 5 is a flow chart of the segmentation technique for individual microcalcifications, according to the present invention.

The segmentation technique is based on simple thresholding of radiographic contrast. [63] This technique is summarized in the flow chart shown in FIG. 5. To remove low spatial frequency components in the background, a two-dimensional, third-order polynomial surface was fitted to a 1 cm×1 cm (0.1-mm pixel size) region of interest (ROI) centered on a microcalcification (steps 500 and 510). After subtracting the smooth background, a microcalcification was delineated using two passes of a region-growing technique, namely, a "rough" region-growing with a 50% threshold of the signal maximum minus background (step 520), and a "precise" region-growing with a locally modified threshold (step 540). Because the size of a microcalcification is small compared to that of an ROI, residual background variation in the proximity of a microcalcification can bias the "rough" threshold (step 520). The purpose of the second, "precise," threshold (step 540) was to correct for such a bias. This "precise" threshold (step 540) was calculated by subtracting a residual background offset computed from a 1 mm×1 mm region centered on the signal maximum (step 530), excluding the signal pixels initially identified by the "rough" region-growing (step 520).

Figure 6A:
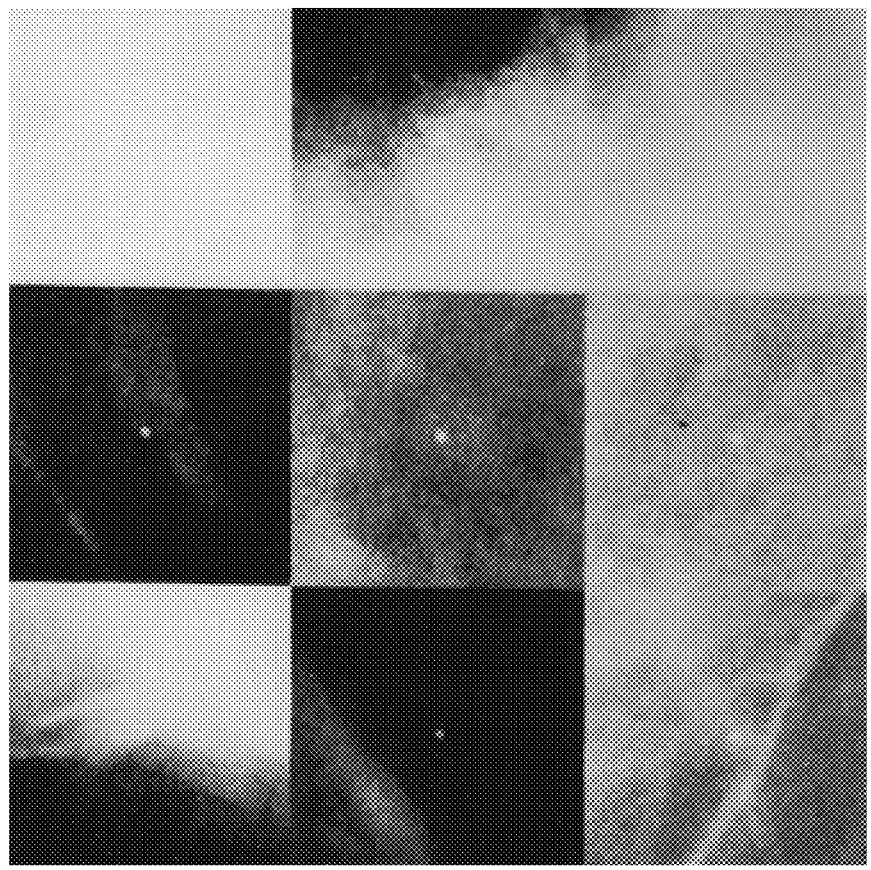
FIG. 6A is an image of simulated (0.2 mm×0.2 mm×0.2 mm) microcalcification, in actual mammographic regions of interest (ROIs)

The accuracy of this segmentation technique was evaluated in a simulation study using actual mammograms and simulated (blurred) microcalcifications. FIG. 6A shows an example of nine simulated (0.2 mm×0.2 mm×0.2 mm) microcalcifications in ROIs. As shown in FIG. 6A, nine regions of interest (ROIs) were selected from nine mammograms to represent different film densities, different radiographic noise, presence of parenchyma, and presence in the proximity of other microcalcifications. Simulated microcalcifications were assigned sizes of 0.1–0.4 mm in thickness, 0.2–0.5 mm in one side for a square-cross-section shaped particle, and 0.1–0.4 mm in the short side and twice in the long side for a rectangular-cross-section shaped particle, with all measurements incremented in 0.1-mm steps. The radiographic images of these microcalcifications were constructed according to a model of the screen film imaging chain, including scatter and blurring, as will now be discussed.

A Model of Screen-film Image Formation

Figure 6B:
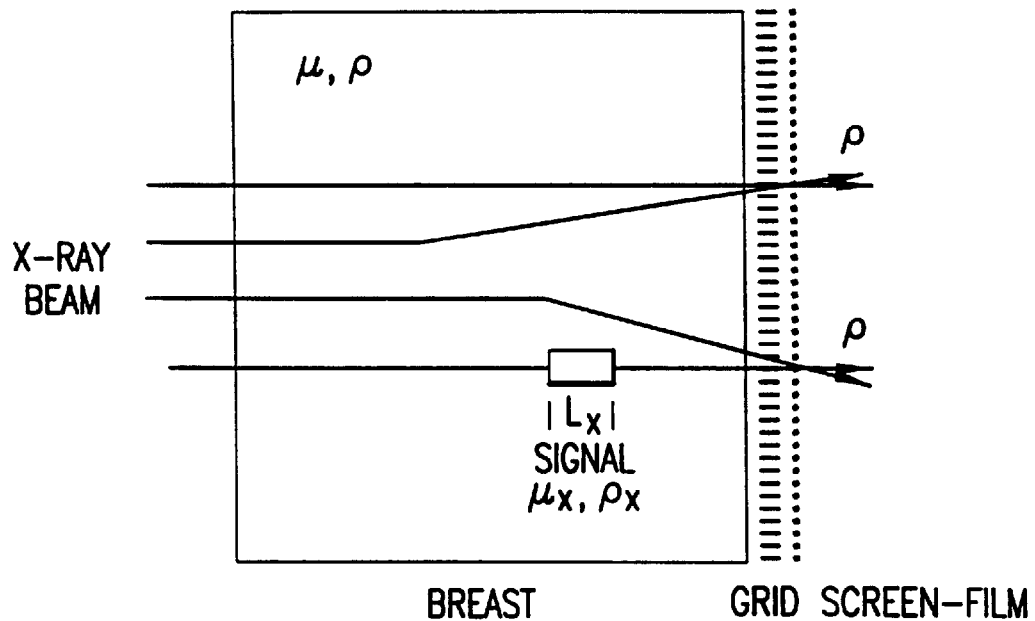
FIG. 6B. is a diagram illustrating how a microcalcification's contrast is formed, wherein $\mu$ and $\rho$ are the linear attenuation coefficient and density for glandular tissue, $\mu_x$ and $\rho_x$ are the linear attenuation coefficient and density for a microcalcification, $L_x$ is the microcalcification's thickness, and p and p' are two locations in the image corresponding to background and the microcalcification, respectively.

FIG. 6B shows a simplified model of imaging a microcalcification embedded in breast tissue. [93] Let exposure X (at point p) be due to the transmitted primary radiation that traverses only breast tissue plus scatter, and let exposure X' (at point p') be due to the transmitted primary radiation that traverses both the breast tissue and the microcalcification plus scatter. The radiation contrast of the microcalcification, $R_c$, can be defined as the difference in exposure, X–X', relative to the background exposure, X. If one assumes that the amount of scattered radiation is the same at points p and p', which is plausible because microcalcifications are extremely small compared to a typical breast, then the radiation contrast of the microcalcification can be written as:

$$R_c = \frac{X - X'}{X} = \frac{G}{G + \frac{CF}{1-F}}(1 - e^{-\Delta \mu L_x}) \quad (1)$$

In this equation, G and C are the grid transmission factors for primary and scatter radiation, respectively, F is the scatter fraction at the front surface of the grid, $\Delta \mu$ is the difference in linear attenuation coefficients between breast tissue and a microcalcification, and $L_x$ is the thickness of the microcalcification (along the x-ray beam).

A microcalcification's contrast decreases as the image propagates along the imaging chain. First, contrast in terms of exposure (radiation contrast) transforms to contrast in terms of optical density (radiographic contrast) when the image is recorded by the screen-film system. Subsequently, contrast in terms of optical density (radiographic contrast) transforms further to a difference in pixel values when a mammogram is digitized. Blurring occurs in both transformations, and contrast is thereby reduced. Transformation of exposure to optical density is described by the H&D curve of a screen-film system. Transformation of optical density to pixel value is described by the characteristic curve of a film scanner. Blurring is described by a convolution of the signal with the point spread function (PSF) of the imaging system. Whereas the characteristic curve for the Fuji drum scanner employed is approximately linear, the H&D curve for a MinR screen/Ortho-M film combination is approximately linear only in the range from 1.2 to 2.0 optical density units. However, the background optical densities for microcalcifications ranged from approximately 0.2 to more than 2.6 in our database. Therefore, the complete non-linear form of the H&D curve must be used in our calculations.

The loss in contrast due to blurring can be compensated approximated by two contrast-correction factors. It can be shown that contrast measured for a blurred signal is a function of the relative position between the measuring aperture and the object (which gives rise to the signal). The maximum contrast is measured when the aperture and the object are aligned optimally. The magnitude of this maximum contrast depends on the shape and size of the object, the shape and size of the aperture, and the point spread function (PSF) which causes the blurring. In present invention, the contrast of a microcalcification, expressed in pixel values, was calculated by averaging the pixel values of a segmented microcalcification minus the background. Assuming that a segmented microcalcification has exactly the same physical size and shape as those of the actual microcalcification, it can be shown that the microcalcification's contrast calculated by using our method is equivalent to the contrast measured with an aperture having the same size and shape as the actual microcalcification. In this simplified situation, we have $$R'_c = K_{sf} R_c \quad (2)$$

$$\Delta D' = K_{dz} \Delta D, \quad (3)$$

in which $R_c'$ and $\Delta D'$ are the blur-reduced contrast in terms of exposure and in terms of optical density respectively, whereas $R_c$ and $\Delta D$ are the corresponding original contrasts. The two contrast correction factors, $K_{sf}$ and $K_{dz}$ derived, as will be later described, depend only on the shape of the microcalcification and on the point spread function CSF) of the screen-film system or of the film scanner, respectively. The method of constructing the mammographic image of a simulated microcalcification will now be described.

Simulating Mammographic Microcalcifications

Simulated microcalcifications were assumed to be $Ca_5(PO_4)3OH$ (calcium hydroxyapatite) embedded in 100% glandular tissue [94–99] and imaged by a 18 kev monoenergetic x-ray beam with contamination by scatter from a 4-cm uniform-thickness compressed breast. The physical parameters are listed in Tables 2 and 3.

TABLE 2

ATTENUATION PROPERTIES USED IN MICROCALCIFICATION EFFECTIVE THICKNESS CALCULATION

|  | $\mu/\rho$ (cm$^2$/g) | $\rho$ (g/cm$^3$) |
| --- | --- | --- |
| Microcalcification | 6.35 | 3.06 |
| Glandular tissue | 0.775 | 1.035 |

TABLE 3

SCATTER PARAMETERS USED IN MICROCALCIFICATION EFFECTIVE THICKNESS CALCULATION

| Breast thickness | F | G | C |
| --- | --- | --- | --- |
| 2 cm | 0.266 | 0.67 | 0.24 |
| 4 cm | 0.382 | 0.69 | 0.21 |
| 6 cm | 0.476 | 0.71 | 0.2 |

In simulating a mammographic microcalcification according to the present invention, the following procedure was used. A sharp-edged 2-dimensional exposure profile was blurred by convolution with the PSF of the screen-film system obtained from MTF data. This convolution was performed at a spatial resolution of 0.0195-mm pixel size. Each point in the blurred profile was then converted to an optical density, with reference to the background exposure and a background density determined by a local average in the mammogram where the microcalcification would appear. The 2-dimensional optical density profile was then blurred by a second convolution with the PSF of the film scanner obtained from pre-sampling MTF data, and subsequently sampled at a pixel size of 0.1 mm. The simulated microcalcification was introduced into a mammogram by replacing the original pixels with the resulting 2-dimensional signal profile plus a local pixel-value fluctuation above the background in the original image.

Figure 7:
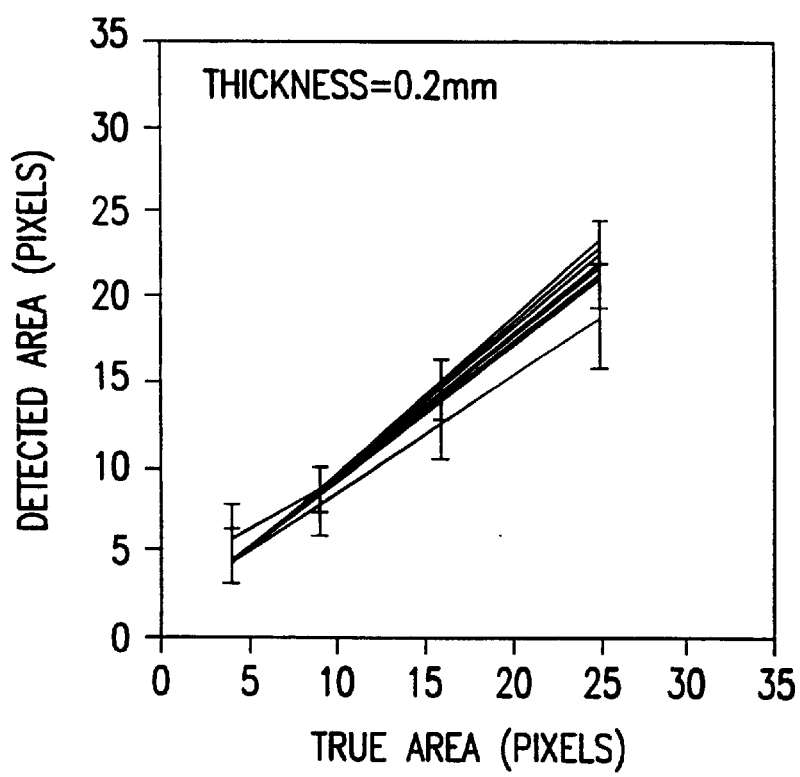
FIG. 7 is a graph showing a comparison of measured area with true area for 0.2 mm thick, square-cross-section shaped simulated microcalcifications.

FIG. 7 compares the true area with the measured area (the number of pixels delineated from a mammogram), for simulated microcalcifications of 0.2 mm thickness and square-cross-section shapes. To measure fidelity of the segmentation, the small number of background pixels that were erroneously identified as signal were excluded from the measured area. In this invention, 225 simulated microcalcifications were added to 225 locations in a center square region in each ROI. The microcalcifications were added one at a time so that the segmentation technique was always applied to a single microcalcification. FIG. 7 plots the average of the 225 measured areas in each ROI for simulated microcalcifications of one given size. For simplicity, only two sets of error bars were plotted: bold-faced error bars representing the maximum standard deviation in eight ROIs, and regular-faced error bars representing the standard deviation in ROI #3 (upper right ROI in FIG. 6A). Measured area from the eight ROIs agreed well, on average, with the true area, whereas measured area from ROI #3 was smaller than the true area because of extremely low contrast in this ROI (OD=0.4).

Figure 8:
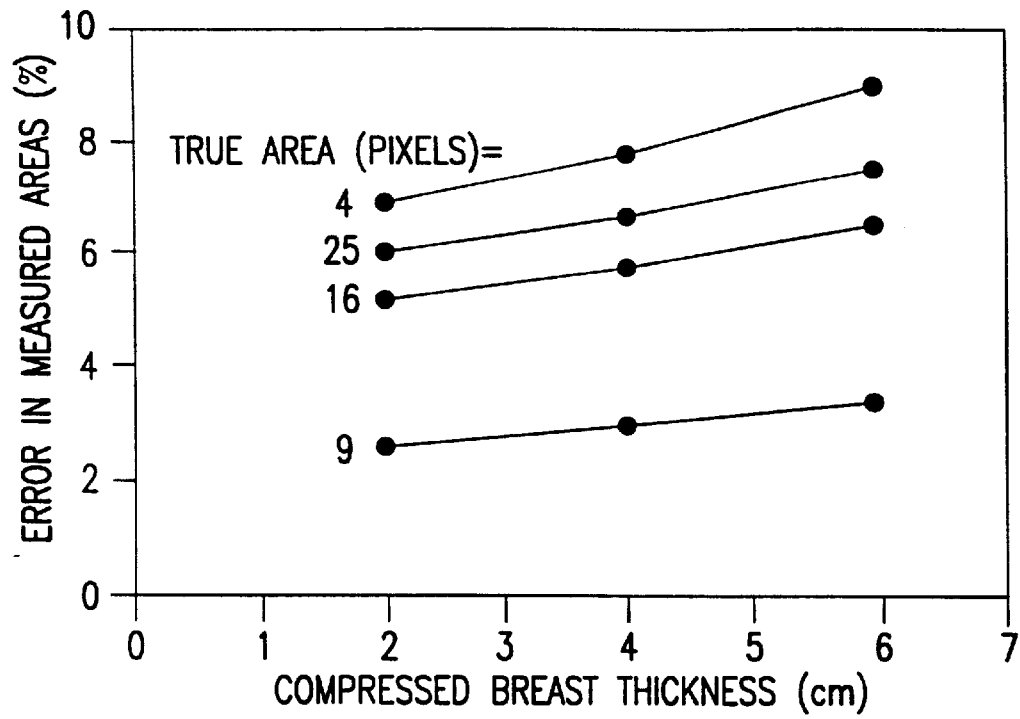
FIG. 8 is a graph showing effect of scatter on measured area of microcalcifications.

FIG. 8 shows the average of absolute errors in measured area as a function of breast thickness. Breast thickness affects scatter and, thus, affects the accuracy of the measured area. Results shown in FIG. 8 were obtained by changing the scatter parameters when constructing simulated microcalcifications. These results show that the segmentation error was less than 10% for a 2 to 6 cm compressed breast.

Estimating Microcalcification's Effective Thickness [104]

Contrast of a microcalcification reflects its size (thickness) in the dimension parallel to the x-ray beam (approximately perpendicular to the film plane). Thus, in measuring size of microcalcifications, contrast should be as useful as area. However, because of the nonlinearity in the H&D curve of a radiographic screen-film system, the relationship between contrast and a microcalcification's thickness is non-monotonic. For example, a small microcalcification embedded in fat can have a higher contrast than a large microcalcification embedded in glandular tissue (low optical density), or than a large microcalcification appearing near skin (high optical density). Converting contrast to a microcalcification's thickness can make contrast a more meaningful measure of size.

A microcalcification's effective thickness is defined as the microcalcification's length $L_x$ along the projection line of an x-ray beam (FIG. 6B). Effective thickness can be calculated in three steps:

(1) Convert contrast in terms of pixel value to contrast in terms of optical density (radiographic contrast) using a film scanner's characteristic curve (approximately linear for many film digitizers);

(2) Convert contrast in terms of optical density (radiographic contrast) to contrast in terms of exposure (radiation contrast), using the H&D curve of the screen-film system. Although one cannot determine the value of absolute exposure from a conventional H&D curve which shows only relative exposure, the difference in absolute exposure (radiation contrast) can be determined from a difference in optical density (radiographic contrast) with an arbitrarily chosen reference and (3) Calculate effective thickness from contrast in terms of exposure (radiation contrast), according to the property of x-ray attenuation. Two corrections improve the accuracy of this calculation: (i) an anti-scatter grid incorporated in the model of the imaging chain corrects for contrast loss due to scatter; and (ii) two correction factors, $K_{sf}$ and $K_{dz}$, incorporated in the model of the imaging chain correct for contrast losses due to blurring. These two factors, $K_{sf}$ for the screen-film system and $K_{dz}$ for the film scanner, are determined by the respective point spread functions (PSFS) and a microcalcification's actual physical size and shape, as will now be discussed.

Derivation of Contrast Reduction Factor Caused by Blurring

Let $OBJ_x(x, y)$ represent the exposure profile of an object (assuming more attenuating than background):

$$OBJ_x(x, y) = \begin{cases} 1, & \text{inside object;} \\ 0, & \text{outside object} \end{cases} \quad (4)$$

The exposure with $OBJ_x(x, y)$ centered at $(x_o, y_o)$ in a uniform background can be expressed as:

$$E_o(x, y) = (X'-X) \, OBJ_x(x-x_o, y-y_o) + X \quad (5)$$

Let $APE(x, y)$ represent the transmission function of the sampling aperture for both exposure and optical density:

$$APE(x, y) = \begin{cases} 1, & \text{inside aperture;} \\ 0, & \text{outside aperture.} \end{cases} \quad (6)$$

And assume the area of the aperture is A. If the sampling aperture is used to measure exposure, the contrast of the signal depends on the position of the aperture relative to the position of the object. Let the object be centered at (0, 0) and the aperture at (x, y). A spatially varying function of the radiation contrast $S_o(x, y)$ can be written as:

$$S_o(x, y) = \frac{X - E_o(x, y)}{X} \otimes \frac{APE(x, y)}{A} = \frac{X - X'}{X} OBJ_x(x, y) \otimes \frac{APE(x, Y)}{A} \quad (7)$$

The operator $\otimes$ symbolizes convolution.

Consider the special case that the aperture has identical shape as the object, that is $$APE(x, y) = OBJ_x(x, y) \quad (8)$$

and notice $R_c = (X-X')/X$, Eq. (7) becomes:

$$S_o(x, y) = \frac{1}{A} R_c OBJ_x(x, y) \otimes OBJ_x(x, y) \quad (9)$$

This equation states that the radiation contrast is a function of the position of the aperture. Contrast reaches a maximum when the aperture has the best alignment with the object, in which case:

$$S_o(0, 0) = R_c \quad (10)$$

Now consider blurring caused by the screen-film system. The blurring can be considered in the exposure domain, modeled by a convolution of the exposure with the point spread function of the screen-film system. Let $PSF_{sf}(x, y)$ represent the point spread function of the screen-film system. The blurred exposure can be written as:

$$E_{sf}(x, y) = (X'-X) \, OBJ_x(x, y) \otimes PSF_{sf}(x, y) + X \quad (11)$$

The spatially dependent radiation contrast can be written as:

$$S_{sf_x}(x, y) = \frac{X - E_{sf}(x, y)}{X} \otimes \frac{APE(x, y)}{A} = R_c OBJ_x(x, y) \otimes PSF_{sf}(x, y) \otimes \frac{APE(x, y)}{A} \quad (12)$$

If the aperture has identical shape as the object, $APE(x, y)$ is replaced by $OBJ_x(x, y)$:

$$S_{sf_x}(x, y) = S_o(x, y) \otimes PSF_{sf}(x, y) \quad (13)$$

This equation states that the radiation contrast function measured after blurring equals to the radiation contrast function measured prior to blurring convolved with the point spread function of the screen-film system. The blurred contrast is always smaller than the original contrast. The blurred contrast reaches a maximum when the sampling aperture align optimally with the object.

A contrast reduction factor can be defined as:

$$K_{sf} = \frac{S_{sf_x}(0, 0)}{S_o(0, 0)} = \frac{\{OBJ_x(x, y) \otimes PSF_{sf}(x, y) \otimes OBJ_x(x, y)\}(0, 0)}{A} \quad (14)$$

The effect of blurring on signal contrast caused by digitization of the film can be described in a similar fashion. Let the optical density in the film be written as:

$$I_o(x, y) = OBJ_D(x, y) + D \quad (15)$$

where $$OBJ_D(x, y) = F\{OBJ_x(x, y)\} \quad (16)$$

and $$D = F\{X\} \quad (17)$$

Function $F\{X\}$ summarizes the blurring caused by the screen-film system and the transformation of exposure to optical density.

If the contrast is measured using the same aperture, a spatially dependent function of radiographic contrast $S_{sf_D}(x, y)$ can be written as:

$$S_{sf_D}(x, y) = [D - I_o(x, y)] \otimes \frac{APE(x, y)}{A} = OBJ_D(x, y) \otimes \frac{APE(x, y)}{A} \quad (18)$$

If the aperture has identical shape as the object $OBI_x(x, y)$, then $$S_{sf_D}(x, y) = \frac{1}{A} OBJ_D(x, y) \otimes OBJ_x(x, y) \quad (19)$$

The blurring caused by the sampling aperture of the digitizer can be modeled similarly to the blurring caused by the screen-film system. The blurred image becomes $$I_{dz}(x, y) = OBJ_D(x, y) \otimes PSF_{dz}(x, y) + D \quad (20)$$

and the function of radiographic contrast becomes $$S_{dz}(x, y) = \frac{1}{A} OBJ_D(x, y) \otimes PSF_{dz}(x, y) \otimes OBJ_x(x, y) \quad (21)$$

in which $PSF_{dz}(x, y)$ is the point spread function of the sampling aperture of the digitizer.

A contrast reduction factor for the two highest radiographic contrast can be defined as:

$$K_{dz} = \frac{S_{dz}(0, 0)}{S_{sfD}(0, 0)} = \frac{\{OBJ_D(x, y) \otimes PSF_{dz}(x, y) \otimes OBJ_x(x, y)\}(0, 0)}{\{OBJ_D(x, y) \otimes OBJ_x(x, y)\}(0, 0)} \quad (21)$$

Figure 9:
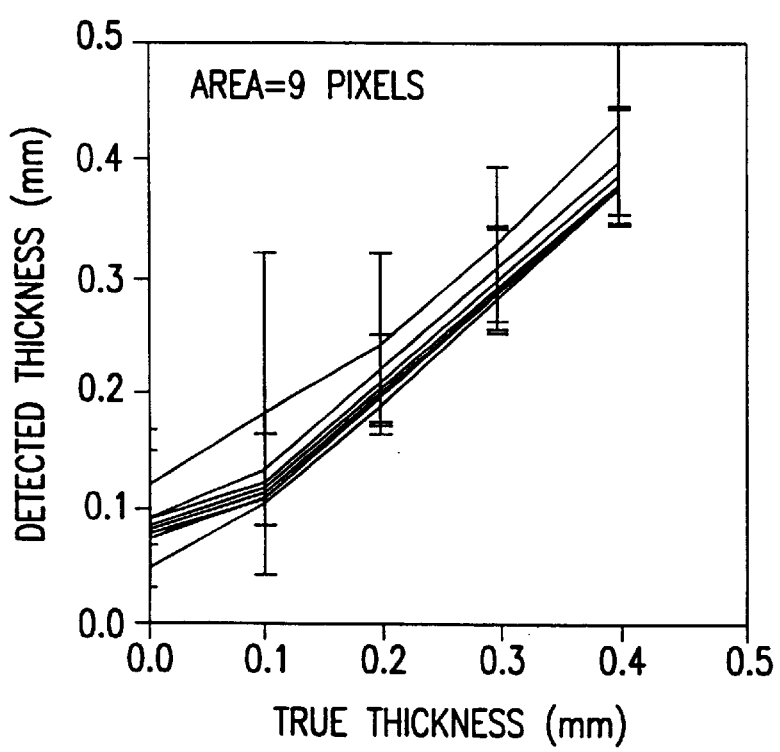
FIG. 9 is a graph showing a comparison of calculated effective thickness with true thickness for square-cross-section shaped (0.3 mm×0.3 mm) simulated microcalcifications.

The accuracy of the calculation of effective thickness was evaluated as will now be described. FIG. 9 compares the true thickness with the calculated effective thickness, for square-cross-section shaped (0.3 mm×0.3 mm) microcalcifications. For simulated microcalcifications of 0.1-mm or larger thickness, except for ROI ∩3 (upper right ROI in FIG. 6A), the calculated effective thickness agreed well, on average, with the true thickness. In ROI #3, the calculated effective thickness was larger than the true thickness. This was caused by errors in $K_{sf}$ and $K_{dz}$, and can be at least partially attributed to the relatively large error in segmentation (FIG. 7). It is interesting to note that the autocorrelation length of noise in the image was approximately equivalent to a 0.08-mm microcalcification. This was measured by extracting "signals" from the original image without actually adding simulated microcalcifications. Consequently, this technique cannot be used to extract microcalcifications with thickness of 0.1-mm or smaller.

Figure 10:
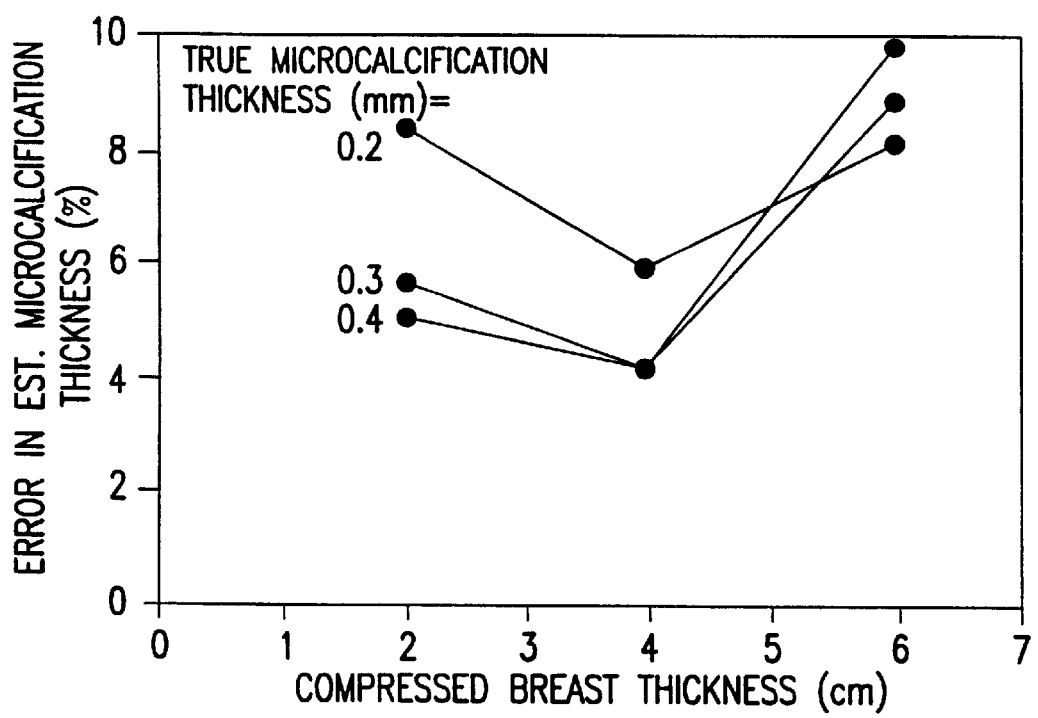
FIG. 10 is a graph showing effect of scatter on calculated effective thickness of micro calcifications.

The accuracy of this calculation is determined, in part, by the assumptions of the parameters used in the calculation. These parameters include scatter, H&D curve, and x-ray energy. The effect of these assumptions can be assessed by varying the parameters used in constructing simulated microcalcifications, and then, use fixed parameters to calculate effective thickness. FIG. 10 shows that the average absolute error in effective thickness due to scatter was less than 10% in a 2–6 cm compressed breast. The calculation of effective thickness was not affected by film-processor temperature, because processor temperature was found not to affect the shape of an H&D curve. Table 4(a) shows the theoretical error in effective thickness due to error in the assumed x-ray energy, and Table 4(b) shows the same error, but actually measured from the simulation.

TABLE 4(a)

THEORETICAL ERROR IN CALCULATED EFFECTIVE THICKNESS DUE TO ERRORS IN ASSUMED X-RAY ENERGY

| Actual X-ray Energy | Assumed X-ray Energy (kev) | | | | | | |
|---|---|---|---|---|---|---|---|
| (kev) | 18 | 19 | 20 | 21 | 22 | 23 | 24 |
| 18 | 0 | +0.067 | +0.142 | +0.226 | +0.317 | +0.416 | +0.524 |
| 19 | −0.058 | 0 | +0.063 | +0.135 | +0.213 | +0.298 | +0.390 |
| 20 | −0.104 | −0.054 | 0 | +0.061 | +0.129 | +0.202 | +0.280 |
| 21 | −0.144 | −0.101 | −0.053 | 0 | +0.058 | +0.121 | +0.189 |
| 22 | −0.176 | −0.139 | −0.097 | −0.050 | 0 | +0.055 | +0.114 |
| 23 | −0.204 | −0.170 | −0.134 | −0.093 | −0.048 | 0 | +0.052 |
| 24 | −0.226 | −0.197 | −0.164 | −0.128 | −0.089 | −0.046 | 0 |

Note.
Results shown are (effective − true) thickness in millimeters.
True thickness = 0.4 mm.

TABLE 4(b)

MEASURED ERROR IN EFFECTIVE THICKNESS CAUSED PARTLY BY ERRORS IN ASSUMED X-RAY ENERGY

| Actual X-ray Energy | Assumed X-ray Energy (kev) | | | | | | |
|---|---|---|---|---|---|---|---|
| (kev) | 18 | 19 | 20 | 21 | 22 | 23 | 24 |
| 18 | 4.76 ± 0.24% | +0.050 ± 0.001 | +0.122 ± 0.001 | +0.202 ± 0.002 | +0.290 ± 0.002 | +0.386 ± 0.002 | +0.488 ± 0.003 |
| 19 | −0.068 ± 0.001 | 4.44 ± 0.22% | +0.049 ± 0.001 | +0.119 ± 0.002 | +0.194 ± 0.002 | +0.277 ± 0.002 | +0.365 ± 0.003 |
| 20 | −0.112 ± 0.001 | −0.063 ± 0.001 | 4.23 ± 0.20% | +0.05 ± 0.002 | +0.116 ± 0.002 | +0.187 ± 0.003 | +0.264 ± 0.003 |
| 21 | −0.149 ± 0.002 | −0.106 ± 0.002 | −0.059 ± 0.002 | 3.95 ± 0.15% | +0.049 ± 0.003 | +0.112 ± 0.004 | +0.179 ± 0.004 |
| 22 | −0.180 ± 0.002 | −0.142 ± 0.002 | −0.101 ± 0.002 | −0.055 ± 0.003 | 4.18 ± 0.23% | +0.049 ± 0.004 | +0.107 ± 0.004 |
| 23 | −0.205 ± 0.002 | −0.172 ± 0.002 | −0.136 ± 0.003 | −0.095 ± 0.003 | −0.051 ± 0.003 | 4.4 ± 0.18% | +0.048 ± 0.005 |
| 24 | −0.226 ± 0.002 | −0.196 ± 0.002 | −0.164 ± 0.003 | −0.127 ± 0.003 | −0.088 ± 0.004 | −0.048 ± 0.003 | 5.04 ± 0.12% |

Note.
Results shown are (calculated − true) thickness ± 1 standard deviation, in millimeters, for assumed ≠ actual x-ray energy, and (|calculated − true|/true) thickness ± 1 standard deviation, for assumed = actual x-ray energy.
True thickness = 0.4 mm.

FEATURE EXTRACTION

Features Describing Individual Microcalcifications

As described above, the segmentation technique of FIG. 1 (step 20) was used in the method of the present invention as a preliminary step to the analysis of microcalcifications. This segmentation was done automatically by the computer 110 (FIG. 2), and achieved good accuracy for typical microcalcifications. With the microcalcifications segmented from mammograms, the next step in the method of the present invention is the automated computerized feature extraction of FIG. 1 (step 30) which will now be described.

Characteristics of individual microcalcifications, perceived from the perspective of the cluster, contain important information for predicting a lesion's histologic state. To analyze features of individual microcalcifications, their locations must be identified and they must be delineated from a mammogram. Microcalcifications can be identified by a computer detection scheme, and in so doing, the analysis of microcalcifications, from detection to the estimation of likelihood of malignancy, can be fully automated. This is important for clinical application, so as not to require additional work by the radiologist. However, manual identification for the development of the computerized classification scheme may be used instead of an automated detection scheme.

Size and Contrast of Microcalcifications

Once a microcalcification is delineated from a mammogram, its size and contrast can be readily measured. The following (idealized) physical measurements of a microcalcification are defined as follows:

(1) area as the projected area in a mammogram (obtained by counting the number of delineated pixels);

(2) effective thickness as the average length parallel to the x-ray projection line; and (3) effective volume as the product of area and effective thickness. These three physical measurements are estimated for every microcalcification within a cluster. In addition, the mean and relative standard deviation of these three measurements are calculated for the microcalcifications within a cluster.

Of these measurements, only the mean and relative standard deviations are used as features for the classification of microcalcifications. The measurements of each individual microcalcification are believed to be less useful in predicting likelihood of malignancy than their collective counterparts. [62] As Table 1 indicates, only four of the six means and standard deviations were chosen for inclusion in the feature set, whereas the other two were omitted on the basis of scatter graphs similar to those of FIGS. 12(a)–12(d) since they did not provide additional information.

Shape-Irregularity of Microcalcifications

Figure 11A:
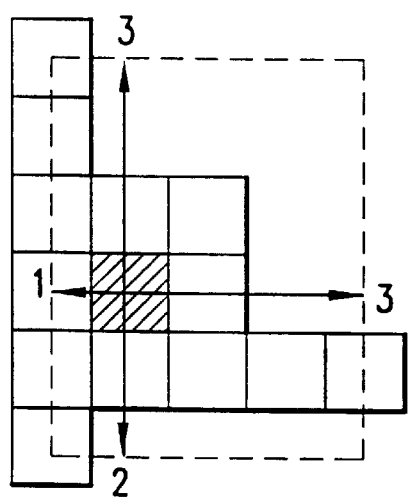
FIGS. 11(a) and 11(b) are illustration of four and eight shape indices, respectively, for calculating shape irregularity of an individual microcalcification, according to the present invention.
Figure 11B:
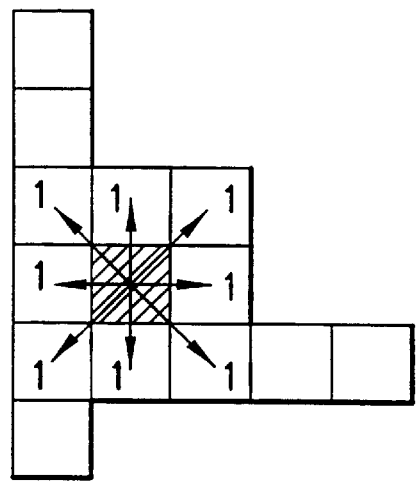

One of the classic mammographic signs of malignancy is linear or branching shaped microcalcification. [62,57] The shape-irregularity measure, defined as the standard deviation of twelve shape indices, illustrated in FIGS. 11(a) and 11(b), is designed to measure shape irregularity of individual microcalcifications.

As illustrated in FIG. 11(a), four of the twelve shape indices represent distances between the center-of-mass pixel (rounded off in calculation so that the center of mass is one full pixel) and the edges of a microcalcification (defined as the smallest rectangular box drawn on the pixel grid that encloses all pixels of the microcalcification, shown as dashed lines in FIG. 11(a)). The other eight shape indices are constructed by drawing straight lines in eight different directions, as shown in FIG. 11(b), between the center-of-mass pixel and other pixels within the microcalcification. Each of these eight indices represent the length of the longest line drawn in one direction. The relative standard deviation of these twelve shape indices is defined as the shape-irregularity measure of a microcalcification. This measure is small for a compact (e.g., square-shaped) microcalcification, since all twelve shape indices have similar values. However, it is large for an irregularly (e.g., linear) shaped microcalcification, since some of the shape indices are large whereas others are small.

The shape-irregularity measure was computed for all microcalcifications within a cluster, but only the second highest value was used as a feature (Table 1). The maximum number was discarded in order to increase this calculation's reliability. This method of using a single high shape-irregularity value to represent an entire cluster paralleled the method used by radiologists that searches for the most irregularly shaped microcalcification, rather than using an "average" microcalcification.

The shape-irregularity measure depends on accurate segmentation of individual microcalcifications, and thus, on the pixel size in digitized mammograms. In this invention, shape irregularity was measured from mammograms digitized at 0.1-mm pixel size. Since the microcalcifications in the database used (database A) averaged 0.4 mm or 16 pixels in size, 0.1-mm-pixel digitization makes it difficult to estimate accurately the exact shape of individual microcalcifications, particularly for small microcalcifications. However, the shape-irregularity measure was not designed to characterize the exact shape of a microcalcification, but rather to identify linear or branching microcalcifications. Since to differentiate between irregularly shaped and regularly shaped microcalcifications requires less information than to differentiate the exact shape of individual microcalcifications, 0.1-mm-pixel digitization may be adequate for calculating the shape-irregularity measure. This pixel digitization threshold is confirmed since, as is later described, the method of the present invention classifies malignant and benign clustered microcalcifications at a high level of accuracy, using mammograms digitized at 0.1-mm pixel size. However, since the effect of pixel size on computer classification performance was not specifically investigated in this invention, and since all investigators do not agree on this issue, [64][65]0.1-mm may not be the optimal pixel size. Nevertheless, the method of the present invention can achieve a high performance at 0.1-mm pixel size.

Features Describing a Cluster

The spatial distribution of microcalcifications, particularly the margin of a cluster, is considered diagnostically important. [58] In addition, many radiologists consider the number of microcalcifications within a cluster as a useful diagnostic indicator. [62] This invention uses a computer-estimated margin of a cluster to calculate the circularity and area of a cluster (Table 1). Circularity was defined as $P^2/4\pi A$, where P is the length of the perimeter, and A is the area of the microcalcification cluster.

A cluster's margin was estimated using a morphological dilation operator and a morphological erosion operator (see, also, U.S. Pat. Nos. 5,133,0202, 5,537,485, and 5,598,481). A morphological dilation operator enlarges an object, by assigning a pixel in the filtered image with the maximum pixel value of a group of pixels in the original image, where the group of pixels is known as kernel of the operator. similarly, a morphological erosion operator shrinks an object, by using the minimum pixel values. In this invention, a single kernel was used for both dilation and erosion operators. This kernel was constructed from a five-pixel-by-five-pixel square with the four corner pixels removed. The dilation and erosion operators were applied to a binary image containing only individual microcalcifications: the background was set to 0 and microcalcifications were represented by a single pixel of pixel value 1. The dilation operator was first applied ten times consecutively, to merge microcalcifications into a single object resembling the cluster. Then, the erosion operator was applied three times consecutively, to reduce the size of the object in order to reasonably represent the cluster's margin. The kernel and the parameters used in this technique were chosen empirically to obtain most satisfying results of the computer-estimated margins. This technique was adequate for most clusters, judged by visual inspection. In the exceptional cases, "islands" of microcalcifications did not merge into one cluster because the microcalcifications were distributed sparsely in a large area. In this situation, where more than one "island" existed in one cluster, the dilation operator was applied repeatedly until a single "island" eventually fornmed. Although the resulting contours tended to deviate from perceived margins in such situations, the perceived margins usually were large and irregular in themselves.

Effectiveness of the Feature Set

The selection criteria of features for classification of microcalcifications were as follows:

(1) a selected feature can be used to differentiate some malignant clusters from benign clusters in a scatter graph of two arbitrarily paired features; and (2) a selected feature correlates qualitatively with radiologists' descriptions of the characteristics of malignant and benign clustered microcalcification. [57][62] Scatter graphs of the feature set listed in Table 1 are shown in FIGS. 12(a)–12(d). Although many malignant clusters overlap with benign clusters in each graph, some malignant clusters do not overlap with benign clusters, and vice versa. For example, in FIG. 12(b), a group of benign clusters appears closer to the lower-left corner of the graph than all the malignant clusters. Therefore, these clusters can be identified as benign on the basis of this graph. Each of the eight features can be used to identify some benign clusters or malignant clusters. However, the combined effect of the feature set is difficult to visualize graphically, partly because the benign clusters identified by one pair of features do not necessarily correspond to the benign clusters identified by the other pairs of features. FIGS. 12(a)–12(d) provide a visual comparison of different features, but are limited to two dimensions by perceptual constraints and, thus, only provide a limited means of evaluating the effectiveness of the combination of features. The usefulness of the combined feature set can be demonstrated by an artificial neural network (ANN), as will be described later.

FIGS. 12(a)–12(d) also illustrate the qualitative correlation of the eight features with radiologists' experience and the overlap of malignant and benign clusters reflects the similarities in radiographic appearance of malignant and benign clusters commonly experienced by radiologists. [57] But more importantly, the differences in the distributions of malignant and benign clusters agree with radiologists' experience. In FIG. 12(a), benign clusters tend to be smaller and rounder whereas malignant clusters tend to be larger and irregular in shape. This corresponds to the clinical observation where benign microcalcifications associated with adenosis form tight clusters, but malignant ductal microcalcifications are often more directional and diffused. In FIG. 12(b), benign clusters tend to have fewer and smaller microcalcifications compared to malignant clusters; clinically, punctate and "lobular" calcifications are often benign. In FIG. 12(c), malignant microcalcifications tend to have larger variations in size; clinically, pleomorphism is used to describe some malignant microcalcifications. In FIG. 12(d), for a given size, malignant microcalcifications tend to be more irregular in shape than benign calcifications; clinically, linear or branching shape is the most important indication of malignancy.

Automated computerized feature extraction is the first of two key components in the method of the present invention. The set of eight features provides the basis for classification of malignant and benign clustered microcalcifications. The usefulness of the combined feature set underlies the computer scheme's high classification performance according to the present invention. Additionally, the use of computer-extracted features distinguishes automated computer classification techniques from computer techniques that use radiologist-reported features with the former being a more practical approach for clinical application. This set of eight features is used in the method of the present invention by an artificial neural network to classify malignant and benign clustered microcalcifications, as will now be described.

ARTIFICIAL NEUTRAL NETWORK (ANN)

An artificial neural network (ANN) is a mathematical model of the human neural system. [66] ANNs have been applied to many fields, including medical imaging. [46][47][60][67] Artificial neural networks are applied to multivariate problems (such as the analysis of eight features of microcalcifications), where it is difficult to develop a simple decision rule. An artificial neural network solves multivariate problems by forming a multi-variable (weights) mathematical model on the basis of examples, and then applying this model to realistic cases. ANNs are known for their flexibility in handling complex problems, but it is often difficult to understand an ANN's reasoning. Therefore, correlation of the ANN's results with experience is important.

The use of an artificial neural network is one of several statistical methods that can be applied in medical imaging. Other methods include linear discriminant analysis, K nearest neighbors, etc. The advantage of the ANN over these other methods is that it is a non-linear technique. Thus, ANNs have a greater potential in solving complex and incomplete problems as compared to other statistical methods. The ANNs used in this invention proved themselves capable of classifying malignant and benign clustered microcalcifications as well as interstitial lung diseases.

ANN Structure for Classification of Microcalcifications

Figure 13:
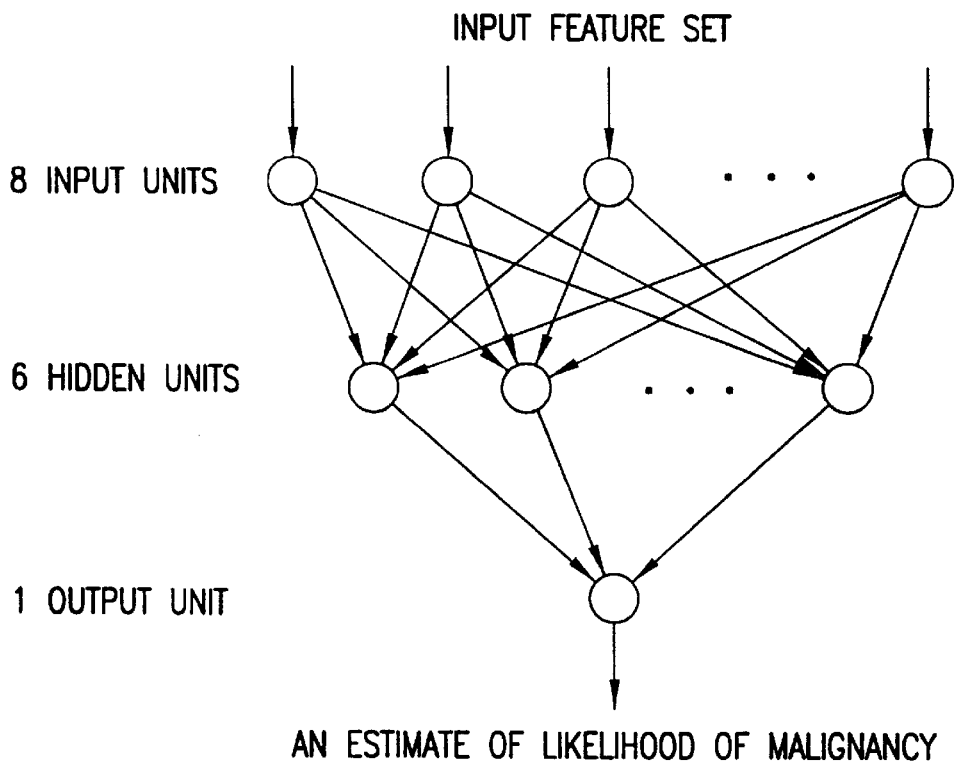
FIG. 13 is a schematic diagram of an artificial neural network (ANN) used in estimating a likelihood of malignancy of individual and clustered microcalcifications according to the present invention.
Figure 14:
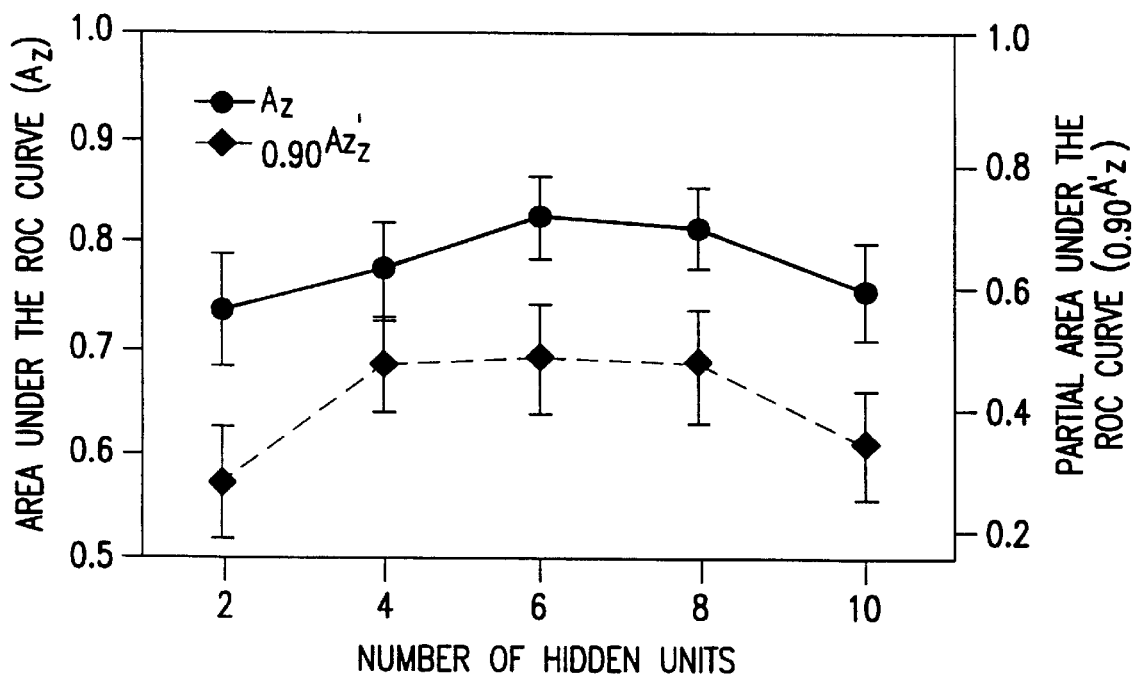
FIG. 14 is a graph showing classification performance of the ANN of FIG. 13 as a function of number of hidden units.

As depicted schematically in FIG. 13, the ANN used in this invention for classification of individual and clustered microcalcifications in mammographic images was a feed-forward, error-back-propagation network with three layers. [66] The input layer had eight input units, each reading one of the eight features (Table 1). The numerical value of each feature was normalized to between 0 and 1 so that the maximum of the features in a dataset was 1. The single hidden layer had six hidden units, as determined empirically for optimal network performance (FIG. 14). The output layer had a single output unit. The output of the ANN can be transformed to an estimate of likelihood of malignancy, as will be later described.

ANN Training

The ANN was trained using training samples with known diagnostic truth, in "supervised learning." During supervised learning, the ANN modifies its internal weights, which provide links to units in successive layers, in an attempt to force its output to equal the "truth" value. (In practice, although the ANN's output was bounded by 0 and 1, binary values of 0.1 for benign and 0.9 for malignant were used as truth, for easier training convergence.) This can be thought of as a process in which the ANN develops a model for the training samples. Supervised learning is an iterative process in which error—the sum of squared difference between "truth" and the ANN's output—reduces as training iterations increase.

Figure 15:
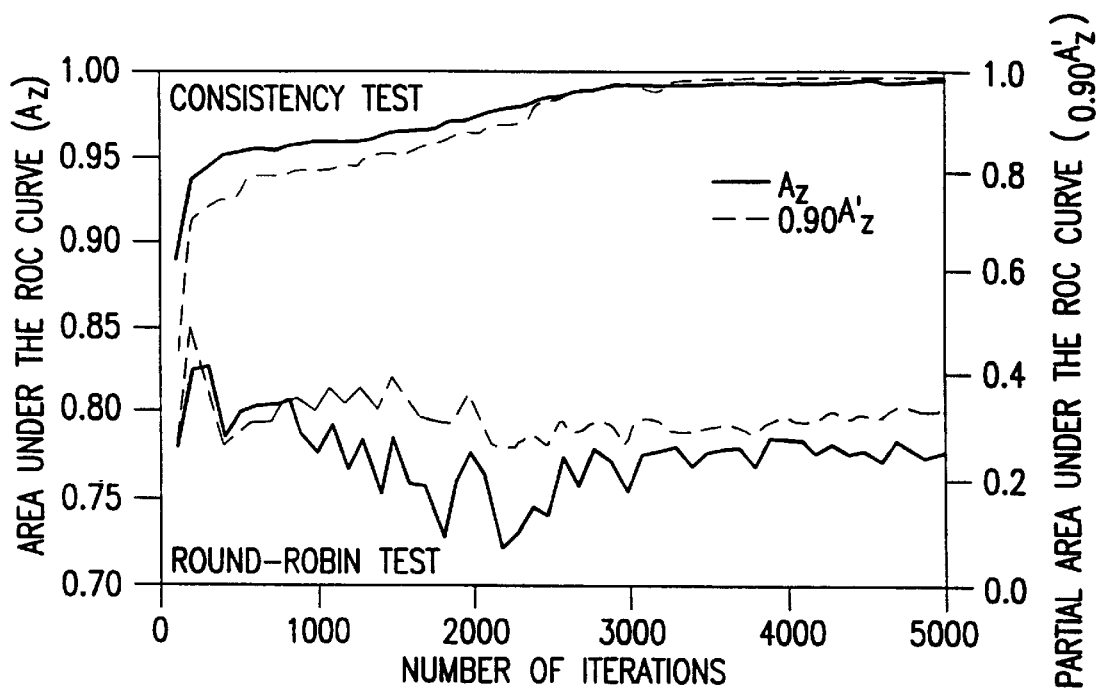
FIG. 15 is a graph showing classification performance of the ANN of FIG. 13 as a function of training iterations.

The error of the ANN measures how well the ANN models the training samples. The performance of the ANN [68] on the training samples increases as this error decreases. However, this error does not measure the generality of the ANN's "model" to the "world," and thus, does not necessarily have a monotonic relationship with the ANN's performance on different (test) samples. FIG. 15 shows an example in which, as training iterations increase, the ANN's performance on training samples increases, but its performance on test samples saturates and decreases. This phenomena is known as "over training," i.e., the ANN's "model" fits the training samples well, but does not generalize well to the "world." To prevent "over training," training was terminated after 200 iterations (FIG. 15).

ANN Testing

The ANN was tested using two methods: consistency and round-robin (or leave-one-out). In a consistency test, the test samples are identical to the training samples. Therefore, a consistency test measures strictly the ANN's ability to "memorize" the training samples. A consistency test does not measure the generality of the ANN beyond the training samples. This test can be used to assess whether the ANN's structure is adequate to "model" the training samples. FIG. 15 shows that the performance indices of the ANN, $A_z$ and $_{0.90}A_z$, approach 1.0 after sufficient training iterations. Thus, this ANN was able to analyze the eight features for the classification of malignant and benign clustered microcalcifications.

A round-robin test, on the other hand, measures the generality of the ANN beyond training samples. In a round-robin test, one divides the cases with known truth into a training set and a test set. The training set consists of all but one case, and the test set is the one left-out case. The training and test set are then used to train and test the ANN, after which the cases are re-partitioned, and a different case is chosen for the test set. The round-robin test completes when all cases are used as a test case exactly once. Results of the round-robin test are obtained by combining the test results of each case, from which a single ROC curve can be estimated. In the round-robin test, the test cases are different from the training samples. Therefore, this test measures generality of the ANN. The advantage of this method is that it efficiently uses available cases by assembling large (n−1) effective training samples.

In a round-robin test, the partition unit or the word "case" may be defined differently, either as a single-view mammogram ("per-view"), or as the collection of mammograms of a patient ("per-patient"). Typically mammogram studies are taken from at least two viewing directions selected from the head-to-toe viewing direction known as cranio-caudal (CC), the side-to-side viewing directions known as medio-lateral (ML), and the viewing direction which is generally at a 45 degree angle between head-to-toe and side-to-side views known as medio-lateral oblique (MLO). In the per-patient definition, a lesion may be depicted on more than one film (e.g., CC, ML, and MLO views), and a patient may have multiple lesions. The per-view definition is biased, because when, for example, a CC view is used as the test case and an MLO view appears in the training set, the test set is no longer completely independent of the training set. A comparison of the "per-view" round-robin test with the "per-patient" round-robin test on the database used (database A) showed an $A_z$ value of 0.90 versus 0.83 (p=0.10), respectively. Accordingly, only the "per-patient" round-robin test was used in this invention.

Related to the definition of the partition unit in the round-robin test, the performance of the method of the present invention can be evaluated either on a per-view basis or on a "per-lesion" basis. In the per-view analysis, each mammogram was treated as an independent case even if it depicted a lesion that was also depicted on another mammogram. This analysis was used because the method of the present invention analyzed each film independently. It is important to note that, although CC and MLO views of the same lesion were regarded as two separate cases in the result analysis, when training the artificial neural network (with the round-robin method) they were treated as one single case and appeared together in either the training or the testing set of the database. From a clinical point of view, however, the important question is whether a lesion is malignant. Radiologists tailor their analysis of the mammograms to this question by comparing images of the same lesion, and placing more weight on the one or more views in which a lesion appears to be most suspicious. While the method of the present invention did not analyze images of the same lesion collectively (i.e., per-patient), one way to simulate radiologists' analyses is to summarize the computer results on a per-lesion basis: use the highest per-view estimate of likelihood of malignancy of a given lesion as the per-lesion estimate for that lesion.

Validity of Results

The structure of the ANN, i.e., the number of adjustable weights, can affect the validity in the measured performance of the ANN. Large networks can solve more complex problems, but they cannot be reliably trained with a small number of cases. In this invention, the ANN had 54 adjustable weights. Approximately 100 and 200 cases, respectively, from two databases (databases A and B) were used in training. Thus, the training-case-to-weight ratio was approximately 2 and 4 for each respective database.

Figure 16:
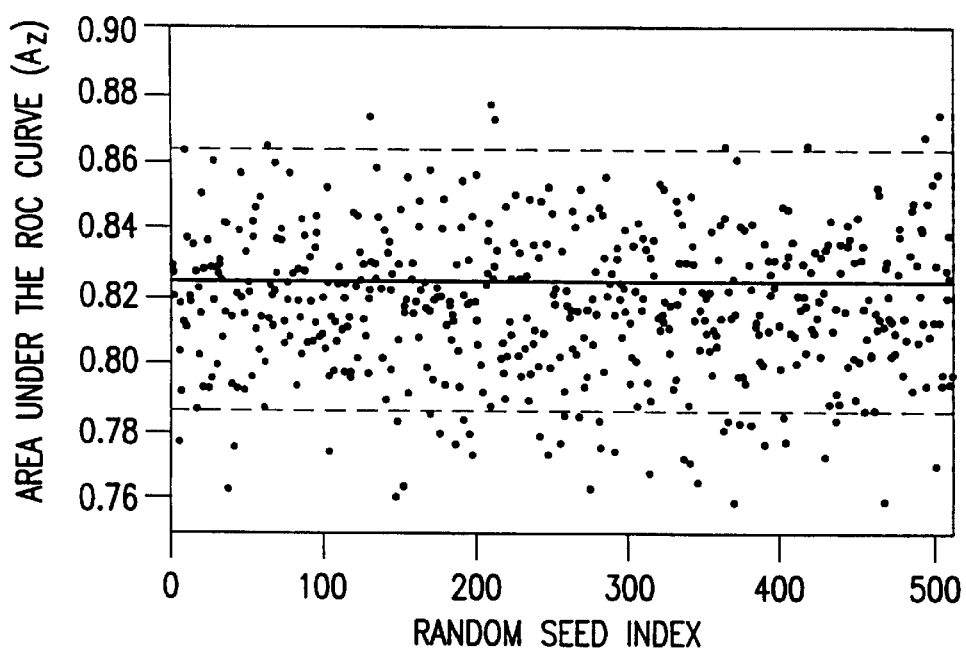
FIG. 16 is a graph showing round-robin-test classification performance of the ANN of FIG. 13 as a function of random seeds used during training.

The random number generator, used in the ANN to determine the initial weights and to determine the training sequence on different cases, may also affect the performance of the ANN. The sequence of the random numbers was dependent on the initial seed value used. This seed value was set to 1 in this invention for simplicity. FIG. 16 shows the dependence of the ANNs performance ($A_z$) on the random seeds. In this figure, random seeds are represented by an index value, not by the actual seed values. FIG. 16 shows that the ANN's performance varies randomly, as the seed changes, around an average value. The magnitude of this variation in performance agrees with the estimated uncertainty associated with the $A_z$ value.

To further evaluate the validity of the ANN's performance, the ANN can be trained on one database and then tested on an independent database. However, this method has its own limitations. It allows meaningful assessment of the variation in performance to be made only if the two databases were random samples of the same case population. Otherwise, the effect of case differences on performance cannot be separated from random variations in performance. [69][70]

The method of the present invention has two important components: (1) the automated computer-extracted features, and (2) the artificial neural network. The computer-extracted features provide a basis for analyzing mammographic microcalcifications. The artificial neural network provides a statistical estimate of the likelihood of malignancy on the basis of these features. The classification performance of the method of the present invention, and the combined effectiveness of the features and of the ANN will now be described.

Effectiveness of the Method of the Present Invention

Evaluating the effectiveness of the method of the present invention on radiologists' diagnostic performance in classification of microcalcifications is the final step in demonstrating that a computerized classification scheme can be used to improve radiologists' diagnostic performance. The diagnostic performance of radiologists reading mammograms in two reading conditions, one as in routine clinical practice, the other with the additional aid from the method of the present invention, will now be described. This invention differs from some of the other studies previously described in that this invention compares radiologists' performance with computer aid against their performance without computer aid, whereas some of the previous studies compare radiologists' performance against the computer performance. The comparison made in this invention provides direct evidence of the usefulness of the method of the present invention in computer-aided diagnosis.

This invention compares radiologists' diagnostic performance with and without the aid from an automated computer scheme. Previously, Getty et al. [45][69][73] used radiologist-extracted image features and a statistical classifier to show that reading and decision aids can be used to improve radiologists' diagnostic performance. However, since only an automated approach is clinically practical, the present invention will significantly advance the application of computer-aided diagnosis in, for example, breast cancer diagnosis.

A database (database B) was used in this observer study. This database was a quasi-consecutive biopsy series. Thus, this database is clinically relevant. It allows radiologists' diagnostic performance in clinical practice to be evaluated in this invention.

Radiologist Observers

Ten radiologist observers, five attending radiologists and five senior radiology residents, were invited to participate in the observer study. These observers were selected to represent a random sample of radiologists practicing in mammography. Observer performance was analyzed separately for attending radiologists and for residents. The attending radiologists were general radiologists who read mammogram as part of their routine clinical practice. Their experience in mammography averaged nine years (median six years, range one to thirty years), and mammography accounted for 30% of their practice on average. On average, they had read approximately 1,000 mammography cases in the past year. The residents had one or two training rotations in mammography, each of which was four weeks long and involved up to 400 mammograms. Thus, the attending radiologists were qualified and the residents were eligible for qualification to read mammograms according to the MQSA [74]

Film Material

Original mammograms of the database (database B) were used in this invention. This database had 104 cases of histologically proven clustered microcalcifications; of these, 46 cases were malignant and 58 cases were benign. This was a difficult database for the diagnosis of malignant and benign clustered microcalcifications. Ninety percent of the cases were acquired between 1990 and 1996. Eighty percent of the malignancies in this database were DCIS. None of the observers had prior knowledge of the cases used in this invention.

The mammographic films used in this invention were standard MLO and CC views of both breasts and magnification MLO and CC views of the lesion. Previous mammograms were not used in this invention to simulate a clinical base-line study. In this situation, radiologists must rely on their analysis of the morphology of the microcalcifications. It is important to note, however, that while the radiologists read both standard and magnification views, the computer's analysis of the cases was done on standard views only. Eighty cases included all six films, but twenty cases had only two standard views of the ipsilateral breast, two cases had only one magnification view of the lesion, and five cases had three or four magnification films. The technical quality of the mammograms was evaluated subjectively on a scale of 1 to 5 by an expert mammographer. The average technical quality of all 600 mammograms was 3.5, where 1=unusable, 2=some technical problem such as mild motion unsharpness, 3=fair, 4=good, and 5 excellent. All cases had at least one mammogram of technical quality 3 or higher, while thirty mammograms (5%) were rated technical quality 2. In ten cases, an explanatory note accompanied the mammograms to point out previous biopsy sites.

Observer Study Design

Each observer read all 104 cases twice, under two different reading conditions: the first reading condition was the same as in normal mammographic clinical practice, and the second was the normal condition plus the additional information of the computer-estimated likelihood of malignancy. These two reading conditions will be referred to as with and without the computer's aid.

Each observer was required to read each case independently under the two different reading conditions, as described above. To ensure that differences in observer performance on the same cases was caused by the presence or absence of the computer results—not by other artificial differences in the reading conditions—the following setup was adopted [75][72]:

(1) the ten radiologists were assigned into group $\alpha$ and group $\beta$ of comparable experience;

(2) the 104 cases were divided randomly into dataset 1 and dataset 2. Dataset 1 consisted of twenty-one malignant and thirty-one benign cases, whereas dataset 2 consisted of twenty-five malignant and twenty-seven benign cases;

(3) each observer's repeated reading of the same cases, under the two different reading conditions, occurred in two separate reading sessions of ten to sixty days apart (mean=30 days, median=35 days). This separation in time was to prevent the reading of a case in the second session be influenced by observer memory in the first session.

During each reading session, each observer read all 104 cases. In the first session, observers in group $\alpha$ read dataset 1 with aid, then read dataset 2 without aid. In the second session, these observers read dataset 1 without aid, then read dataset 2 with aid. Observers in group $\beta$ read the cases in the opposite reading conditions, i.e., in the first session, they read dataset 1 without aid then dataset 2 with aid, and in the second session, they read dataset 1 with aid then dataset 2 without aid.

To further minimize bias, the order in which the cases were read was randomized. The randomization was done independently for dataset 1 and for dataset 2, but the case sequence was held the same for all observers. Additional randomization across observers was not practical. However, the case sequence of each dataset was reversed between the first and the second session. This was to further deter observer memory from influencing the reading of a case in the second session. Additionally, the case sequence in each dataset was arranged so that, for the first (and last) five cases in each case sequence, the computer results were consistent with the histological truth. This was to prevent observers from losing interest in the computer's results which could occur if the computer results seemed grossly incorrect at the beginning of the study.

The study in evaluation of the present invention was designed to simulate the reading condition in typical mammography clinical practice. A mammography viewer (Radx MS804A, Radx Technology, Houston, Tex.) was used to mount the mammograms. A regular and a mammography magnifying glass were provided. The observers read the cases in a quiet room with minimal ambient room light. No time limit was imposed, but the time spent on each case in each reading condition was recorded. No remarkable difference in time used between the two reading conditions was observed.

After reading each case, the observers reported (1) their confidence that a lesion was malignant, and (2) their choice of recommended clinical action among: surgical biopsy, alternative tissue sampling, short-term follow up, and routine follow up. The observer's degree of suspicion was recorded using a visual analog scale, which was a 5-cm line labeled with "benign" at the left end and "malignant" at the right end. The observers were instructed to make a mark closer to the "benign" end for low suspicion, and make a mark closer to the "malignant" end for greater suspicion. These marks were then converted to numerical values with a ruler.

In the beginning of the study, the observers were informed of the purpose of the study, the general study design, the number of cases, mammographic views available, and that approximately half of the cases were malignant. They were urged to consider the computer's results when provided, and were informed that the computer performed at 90% sensitivity and 61% PPV, at a threshold of 30% on the computer estimated likelihood of malignancy. This hypothetical performance of the computer scheme could have been obtained if one used the computer-estimated likelihood of malignancy of 30% or higher as the criterion for recommending biopsies. The computer-estimated likelihood of malignancy was transformed from the ANN's output, as will be later described, and was obtained using the round-robin-by-patient test method. This computer-estimated likelihood of malignancy was printed on a small card. When a radiologist read the cases with the computer's aid, this card was mounted on the mammography viewer along with the mammograms.

A set of 25 example cases were made available to the observers immediately before a CAD reading session. These example cases were shown with the computer results. After reading each example case, the histological truth of that case was given to the observer. The purpose of these example cases was to familiarize the observers with the computer results, and help them formulate a strategy of how to use the computer results before the actual experiment. Each observer read a minimum of ten example cases.

Comparison of Observer Performance

The radiologists' confidence in differentiating between malignant and benign clustered microcalcifications was analyzed using ROC analysis in three statistical comparisons. In a separate analysis, radiologists' biopsy recommendations with and without the computer aid were compared.

Figure 17A:
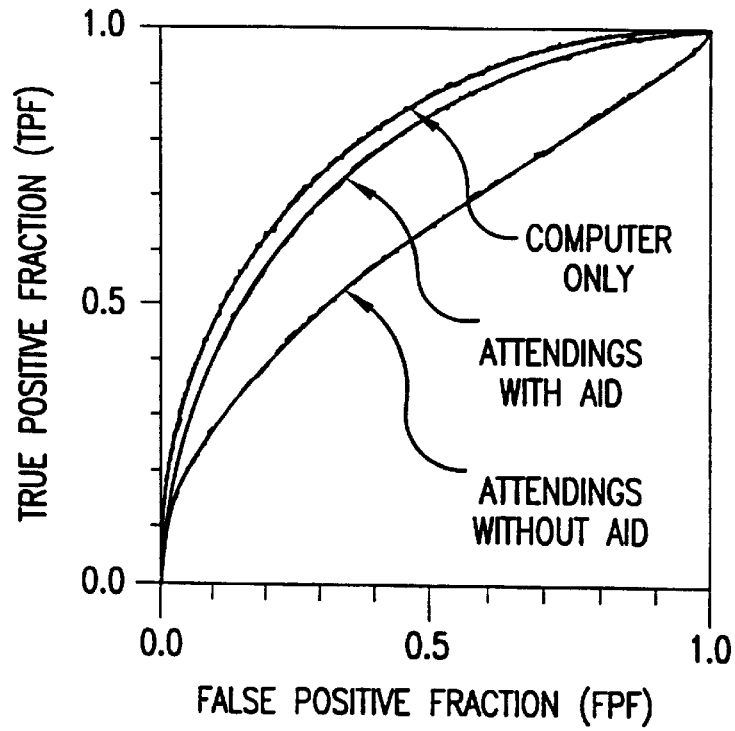
FIGS. 17(a) and 17(b) are receiver operating characteristic (ROC) curves showing classification performance with and without computer aid for five attending radiologist and five senior radiologists, respectively.
Figure 17B:
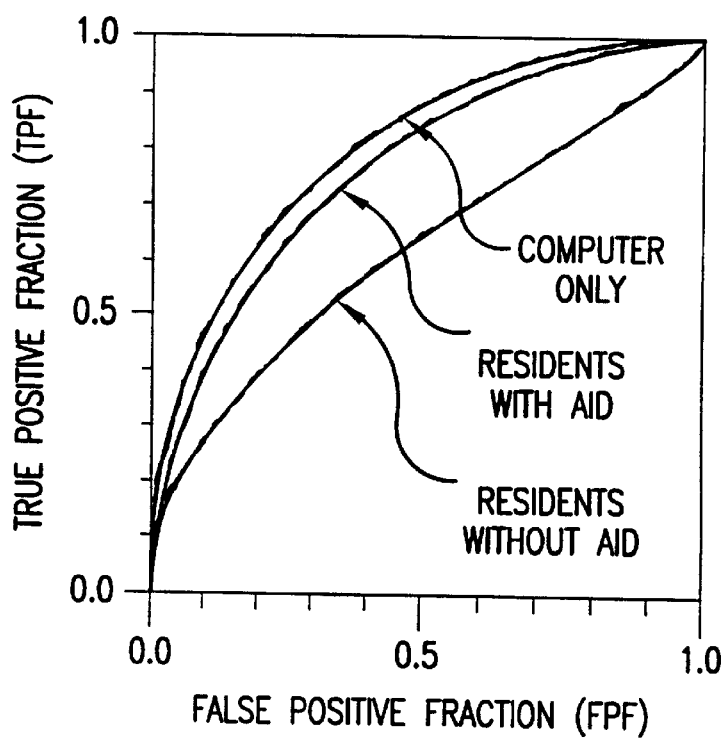

The Student two-tailed t-test for paired data was used to compare observer performance in differentiating malignant and benign clustered microcalcifications with and without the computer aid. This analysis takes into account the variability in observer performance, but does not take into account the variability in cases. The result (p-value) of this analysis can be interpreted as the probability of the observed differences being produced by chance alone, for this particular sample of cases. Thus, the conclusion may not be generalized directly to other samples of cases. [72] FIG. 17(a) compares the summary ROC curves of the five attending radiologists with and without the computer's aid, relative to the computer's ROC curve. The summary ROC curves of radiologists' were obtained by averaging the binormal parameters, a and b, of individual radiologist's ROC curves. The average $A_z$ values for the attending radiologists were 0.62 without aid and 0.76 with aid, whereas the average $_{0.90}A_z$ values were 0.06 without aid and 0.26 with aid. Both differences were statistically significant (p=0.006 in both cases). FIG. 17(b) shows a similar comparison of the summary ROC curves, with and without aid, for the five radiology residents. The average $A_z$ values, for the residents, were 0.61 without aid and 0.75 with aid (p=0.0006), whereas the average $_{0.90}A_z$ values were 0.04 without aid and 0.22 with aid (p=0.0008).

The CLABROC [103] algorithm was also used to compare observer performance in differentiating malignant and benign clustered microcalcifications with and without the computer aid. This analysis takes into account the variability in cases, but does not take into account the variability in observer performance. The result (p-value) of this analysis can be interpreted as the probability of the observed differences in performance, of a particular observer, being produced by chance alone. Thus, the conclusion of this analysis may not be generalized directly to other radiologists. [72] Table 5 shows the results of this analysis for each observer.

TABLE 5

COMPARISON OF EACH RADIOLOGIST'S ROC PERFORMANCE INDICES WITH AND WITHOUT THE COMPUTER AID

| | $A_z$ | | | $_{0.90}A'_z$ | | |
|---|---|---|---|---|---|---|
| Reader | Without Aid | With Aid | P Value | Without Aid | With Aid | P Value |
| A | 0.64 | 0.75 | 0.07 | 0.04 | 0.35 | 0.0001 |
| B | 0.60 | 0.75 | 0.02 | 0.04 | 0.19 | 0.09 |
| C | 0.71 | 0.77 | 0.25 | 0.07 | 0.23 | 0.05 |
| D | 0.54 | 0.72 | 0.007 | 0.06 | 0.18 | 0.10 |
| E | 0.61 | 0.80 | 0.0009 | 0.05 | 0.31 | 0.005 |
| F | 0.55 | 0.70 | 0.03 | 0.06 | 0.21 | 0.07 |
| G | 0.65 | 0.76 | 0.05 | 0.06 | 0.25 | 0.04 |
| H | 0.60 | 0.72 | 0.02 | 0.04 | 0.16 | 0.08 |
| I | 0.66 | 0.75 | 0.06 | 0.08 | 0.27 | 0.03 |
| J | 0.63 | 0.80 | 0.0009 | 0.03 | 0.25 | 0.01 |

Note:
Comparison made using CALBROC algorithm.
Readers A–E are attending radiologists,
readers F–J are senior radiologists.

In Table 5, notice that the p-values were generally not the same for different observers, because each p-value was computed for one particular observer. However, an increase in both $A_z$ and $_{0.90}A_z$, from reading without aid to reading with aid, are shown in Table 5 for every observer. These increases in performance were statistically significant for all but one observer. Therefore, results shown in Table 5 provide evidence that the increase in performance found by the CLABROC algorithm can be generalized to other radiologists with comparable skill.

In a third analysis, the Dorfinan-Berbaum-Metz method [76] was used to compare observer performance in differentiating malignant and benign clustered microcalcifications with and without the computer aid. This method uses jackknife and ANOVA to analyze the pseudovalues of a performance index, e.g., $A_z$. This analysis takes into account both the variability in cases and the variability in observer performance. The calculated p-value for modality effects can be interpreted as the probability of the observed differences in performance being produced by chance alone. Thus, the conclusion of this analysis can be generalized to similar cases and to other radiologists with similar skills. When this method was used to evaluate the difference in performance ($A_z$) with and without the computer aid for the attending radiologists and for the residents, the analysis yielded two-tailed p-values of 0.004 for the attending radiologists, and <0.0001 for the residents. This third analysis simultaneously evaluated both variability analyzed in the two pervious analyses, and confirmed that the improvement in diagnostic performance with the computer aid were statistically significant for the attending radiologists and for the residents.

A separate analysis was done to compare observers' biopsy recommendations with and without the computer's aid. For the purpose of this comparison, biopsy recommendation was defined as:

(1) biopsy=surgical biopsy+alternative tissue sampling; and (2) follow up=short-term follow up+routine follow up.

Figure 18:
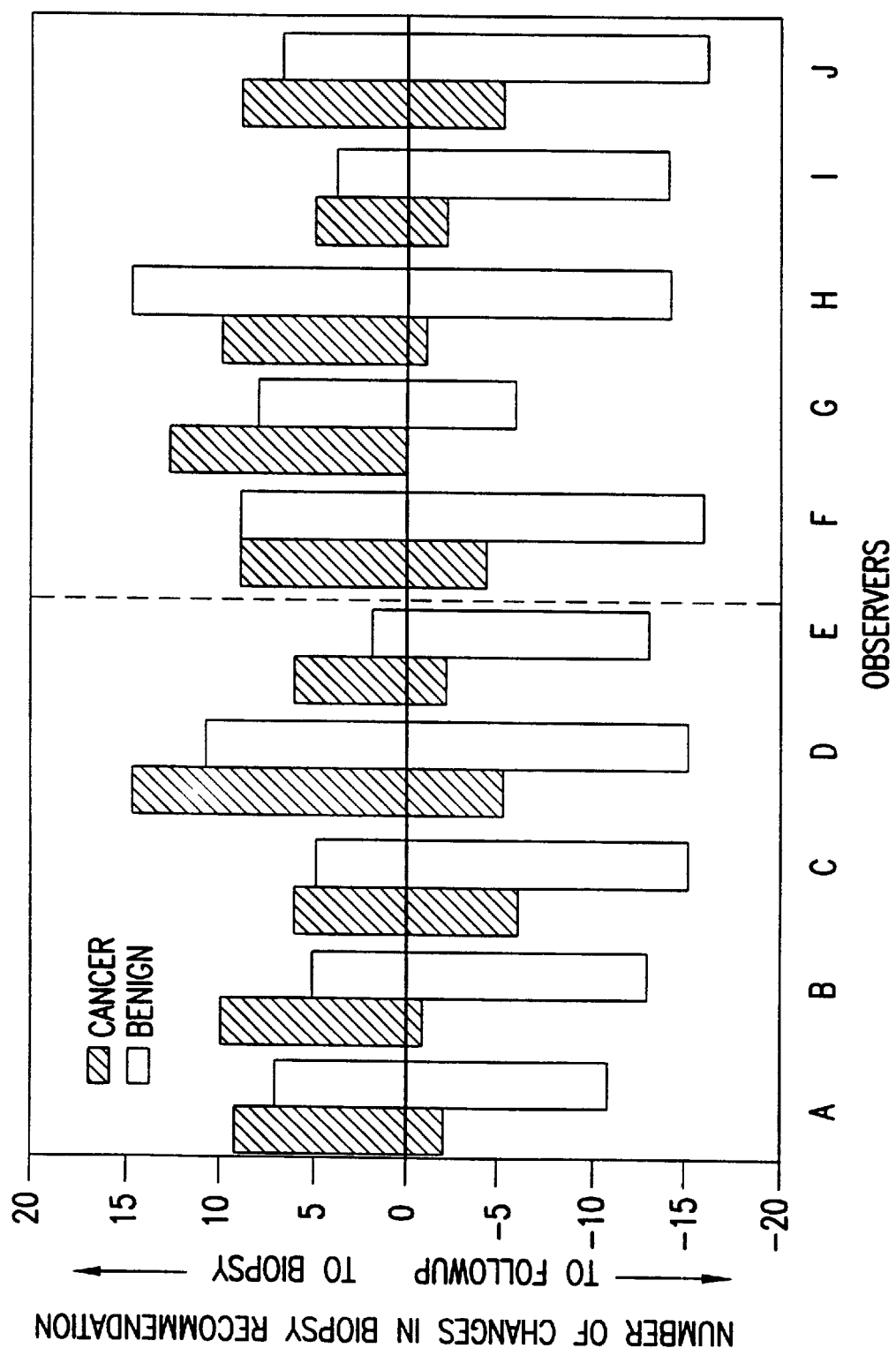
FIG. 18 is a graph showing a comparision of biopsy recomendations with and without computer aid.

The Student two-tailed t-test for paired data was used in this analysis. FIG. 18 shows, for each observer, the frequency of changes in biopsy recommendations from reading without aid to reading with aid. For malignant tumors, all but one observer increased the number of recommended biopsies. For benign lesions, eight observers reduced, and two observers increased, the number of recommended biopsies. The average changes in biopsy recommendations, from reading without aid to reading with aid, were an increase of 6.4 biopsies for malignant tumors (p=0.0006), and a decrease of 6.0 biopsies for benign lesions (p=0.003). The average sensitivity of biopsy recommendations increased from 73.5% to 87.4%, and the specificity increased from 31.6% to 41.9%. The corresponding hypothetical positive biopsy yield increased from 46% to 55%.

Clinical Relevance

The results of the study of the present invention are consistent with results of another study, by Getty et al. [45] that applied computer-aided diagnosis to a diagnostic task The mammogram-reading aid investigated by Getty et al. consisted of a check list of twelve features, whereas the decision aid consisted of a computer-estimated likelihood of malignancy based on the radiologist-reported features. They found that community radiologists performance in distinguishing malignant from benign mammographic lesions was improved in the enhanced reading condition using the reading and decision aids. In the study of the present invention, the computer aid consisted of a computer-estimated likelihood of malignancy based on eight computer-extracted features, as previously described. An improvement in radiologists diagnostic performance in distinguishing between malignant and benign clustered microcalcifications was found when radiologists read mammograms with the computer aid of the present invention.

In the study of the present invention, the order of diagnostic performance from low to high was radiologists without aid, radiologists with aid, and the method of the present invention by itself. This suggests that the radiologists were not able to use the computer results optimally. Ideally, radiologists performance with aid should be equal to or higher than that of the computer. Radiologists performance would equal that of the computer if they were to adopt the computer s analysis for all cases. On the other hand, radiologists performance would be higher than the performance of the computer if they were to adopt the computer analysis whenever it is more correct than their own. Additional studies are needed to investigate methods to improve radiologists ability in using the computer results more positively.

It is known that a computer scheme can help to improve radiologists performance in a detection task even if the performance the computer scheme is inferior to the performance of radiologists without aid. [33] However, in this invention, the computer aid was applied to a classification task, which differs from a detection task in two ways:

(1) in a detection task, if the computer finds a lesion missed by radiologists, the computer aid provides additional information to the radiologists. In a classification task, radiologists and the computer analyze the same lesion to assess its likelihood of malignancy. If their analyses do not agree, the computer aid challenges radiologists assessment; and (2) in a detection task, the computer aid is usually represented as a binary result, e.g., an arrow to show a computer detection and no arrow to show a normal finding. A comparable format of representing the computer analysis in a classification task would be to show a binary result (i.e., malignant or benign). In this invention, however, the computer aid was represented by a numerical value of likelihood of malignancy.

The ranking of diagnostic performance found in this invention differed from the results of Getty et al. In the study of Getty et al., the order of diagnostic performance from low to high was radiologists without aid, the computer alone, and radiologists with aid. Two important differences between the study of Getty et al. and that of the present invention could have contributed to the differences in the observed orders of diagnostic performance:

(1) Getty et al. studied all types of mammographic lesions, whereas the present study investigated only clustered microcalcifications (radiologists ability in incorporating the computer analysis might be different for different types of lesions); and (2) Getty et al.'s computer analysis was based on radiologist-reported features, whereas in the present invention the computer analysis was based on computer-extracted features (it might be harder for radiologists to make use of a computer analysis that is based on computer-extracted features).

The diagnostic performance of attending radiologists and of senior radiology residents was compared in this invention and was found to be similar. This could be interpreted in two different ways:

(1) it could be that senior radiology residents can distinguish between malignant and benign clustered microcalcifications equally well as can more experienced attending radiologists [77][78] (this could be true if diagnostic performance for microcalcifications is, in general, not strongly correlated with experience or if the residents currently in training have received excellent exposure in mammography, particularly in diagnosing malignant and benign microcalcifications); and (2) this similarity in performance could be interpreted as a failure of the study of the present invention to detect real differences in performance between the attending radiologists and the residents [45] (if the nature of the difficult cases used in this invention was familiar neither to the attending radiologists nor to the residents, their measured performance might be similar even though their performance may be different in clinical practice). Accordingly, additional studies are needed to investigate whether the diagnostic performance of residents is different from that of attending radiologists.

The study of the present invention shows that positive biopsy yield can be increased by using the method of the present invention. The hypothetical positive biopsy yield in the study of the present invention increased from 46% to 55%. However, these positive biopsy yield values may not be compared directly with values in clinical practice, because the cancer prevalence rates in clinical practice is likely to be different from that in the database used in the present invention. Table 6 shows the effect of cancer prevalence rate on positive biopsy yield, calculated by assuming fixed sensitivity and specificity values.

TABLE 6

ESTIMATED VALUES OF POSITIVE BIOPSY YIELD FOR DIFFERENT PREVALENCE OF BREAST CANCER

| Cancer Prevalence (%) | Positive Biopsy Yield (%) | |
|---|---|---|
| | Without Aid* | With Aid† |
| 10 | 11 | 14 |
| 20 | 21 | 27 |
| 30 | 32 | 39 |
| 40 | 42 | 50 |
| 44 | 46 | 54 |
| 50 | 52 | 60 |
| 60 | 62 | 69 |
| 70 | 71 | 78 |

*Sensitivity = 73.5%, specificity = 31.6%
†Sensitivity = 87.4%, specificity = 41.9%

As can be seen from Table 6, positive biopsy yield is strongly dependent on cancer prevalence rate, and increase in positive biopsy yield with the computer aid also depends on cancer prevalence rate. The positive biopsy yields shown in Table 6 can be interpreted as estimated positive biopsy yields for randomly sampled cases similar to those used in this invention, but with different cancer prevalence rates. In addition, Table 6 shows that positive biopsy yield can be improved by 4%–9% in clinical practice by using the method of the present invention. Since it is possible to increase positive biopsy yield by operating at a lower sensitivity without actually improving diagnostic performance, i.e., to diagnose only obvious cancers, the increases in positive biopsy yield shown in Table 6 must be viewed in conjunction with the 14% increase in sensitivity.

In the above-described study, the effect of the method of the present invention on radiologists performance was evaluated on a quasi-consecutive biopsy series. The effect of the method of the present invention on less suspicious, typically not-biopsied, cases was not evaluated. For the purpose of reducing the number of biopsies of benign lesions, it is particularly important to improve radiologists diagnostic performance on suspicious cases that are currently biopsied. However, if the method of the present invention is applied in clinical practice, it will be used to analyze all suspicious (workup) cases, biopsied or not biopsied. Therefore, the effect of the method of the present invention on radiologists diagnostic performance on currently not-biopsied cases must be investigated in future studies. If the method of the present invention consistently estimates low likelihood of malignancy for currently not-biopsied, actually benign cases, then radiologists diagnostic performance will not be compromised. If the method of the present invention estimates high likelihood of malignancy for some currently not-biopsied, but actually malignant cases, then radiologists diagnostic performance can be potentially improved in terms of sensitivity.

In the above-described study, the mammograms were read by the radiologists in a way similar to that used in clinical practice. Thus, the results of this invention are clinically relevant. However, in this study, previous mammograms were not shown to radiologists. Additionally, except for a few explanatory notes on lesions that could be identified as previous biopsy sites, patient age, family history and other relevant clinical data were not provided. Therefore, this invention emphasized mammographic evaluation of the microcalcifications. The effect of the method of the present invention on radiologists diagnostic performance in classification of microcalcifications, when all relevant clinical information are available, needs to be investigated in future studies. However, in clinical practice, previous mammograms are sometimes not available, e.g., at base-line examinations. In this situation, radiologists will read mammograms in a way similar to the described study.

A laboratory observer test is used in this invention to compare radiologists diagnostic performance with and without the computer's aid. [75][72] Subsequently, clinical trials must be used to show the computer's benefit. While laboratory observer tests have some limitations, e.g., observer motivation may not be the same as in clinical practice, a well designed and carefully executed laboratory observer test can provide strong scientific evidence for valid conclusions to be drawn. Laboratory observer tests cannot replace clinical trials, but they serve to motivate and guide the success of clinical trials.

The described study shows the benefit of the present invention in improving radiologists diagnostic performance in classification of microcalcifications. It shows that, by using the computerized classification scheme, radiologists performance in the diagnosis of malignant and benign clustered microcalcifications can be improved, by an increase in sensitivity and by a decrease in the number of biopsies for benign lesions. The present invention shows the benefit of an automated CAD scheme in cancer diagnosis, thereby extending the demonstrated benefit of automated CAD schemes beyond cancer detection. Thus, this study according to the present invention makes important contributions to the application of computer-aided diagnosis and to the diagnosis of breast cancer.

ANN Structure for Classification of Interstitial Lung Disease

Figure 19:
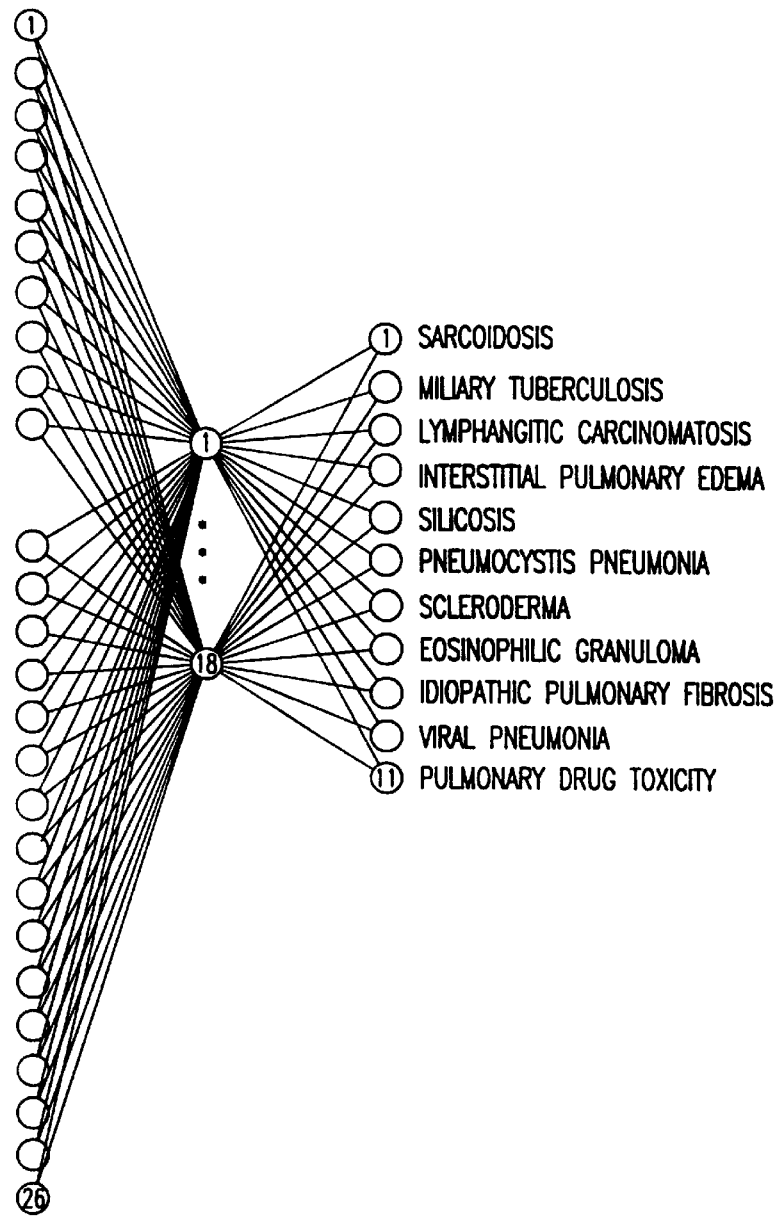
FIG. 19 is a schematic diagram of an artificial neural network (ANN) used in differential diagnosis of interstitial lung disease according to the present invention.

The structure of the ANN for classification of interstitial lung disease is different as will now be described. A three-layer, feed-forward ANN with a back-propagation algorithm was employed in the present invention for classification of interstitial lung disease. As shown in FIG. 19, the ANN consisted of 26 input units for receiving 10 clinical parameters and 16 radiological findings, 11 output units for classifying 11 types of interstitial lung disease, and 18 hidden units. The 10 clinical parameters include the patient's age, sex, duration of symptoms, severity of symptoms, temperature, immune status, known underlying malignancy, history of smoking, dust exposure and drug treatment. The 16 radiological findings include seven items regarding distribution of infiltrates (upper, middle and lower fields of the right and left lungs and proximal/peripheral), six items relating to characteristics of the infiltrate [100] (homogeneity, fineness/coarseness, nodularity, septal lines, [101] honeycombing and loss of lung volume), and three related thoracic abnormalities (lymphadenopathy, pleural effusion and heart size [102]). The 11 interstitial lung diseases include sarcoidosis, miliary tuberculosis, lymphangitic carcinomatosis, interstitial pulmonary edema, silicosis, pneumocystis pneumonia, scleroderma, eosinophilic granuloma, idiopathic pulmonary fibrosis, viral pneumonia and pulmonary drug toxicity. The present invention used 150 clinical cases, 110 published cases and 110 hypothetical cases for training and testing the ANN with a round-robin technique. Three chest radiologists independently provided the ratings of all features on published cases and only those of radiological findings on clinical cases. The performance of the ANN was evaluated by means of receiver operating characteristic (ROC) analysis in each disease. The average $A_z$ values were obtained from all $A_z$ values, which is the area under the ROC curve, on 11 diseases.

Figure 20:
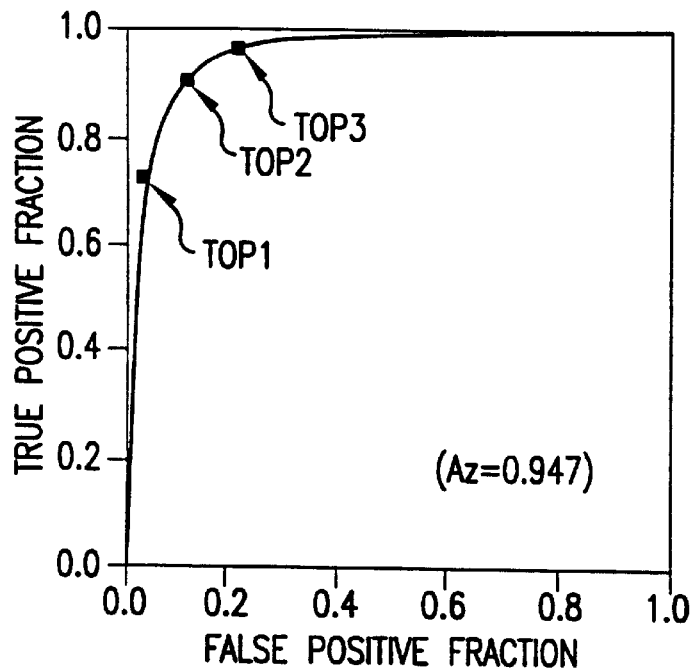
FIG. 20 is an ROC curve showing performance of the ANN of FIG. 19 in differential diagnosis of interstitial lung disease.

To evaluate the overall performance of the ANN for clinical cases, a modified round robin method was employed, as previously described. With this method, all of hypothetical cases and published cases, and all but one of the clinical cases is used for training. The one clinical case left out is used for testing. The $A_z$ value obtained by this method is 0.947 (FIG. 20). Also evaluated, was the ANN's performance per patient based on the relationship between correct diagnosis and ranking of the ANN's output. If the correct diagnosis corresponds to the highest confidence rating of the ANN's output (ranking 1), this condition was called "Top 1." Similarly, "Top 2" corresponds to the condition where correct diagnosis is included in the second highest confidence ratings (ranking 2), and "Top 3" corresponds to the third highest confidence ratings (ranking 3). The diagnostic accuracy of the ANN at these conditions is shown in Table 7 and FIG. 20.

TABLE 7

DIAGNOSTIC ACCURACY OF ANN FOR CLASSIFICATION OF INTERSTITIAL LUNG DISEASE

| Ranking | Sensitivity | Specificity |
|---------|-------------|-------------|
| TOP 1   | 70%         | 97%         |
| TOP 2   | 93%         | 89%         |
| TOP 3   | 95%         | 80%         |

Figure 21:
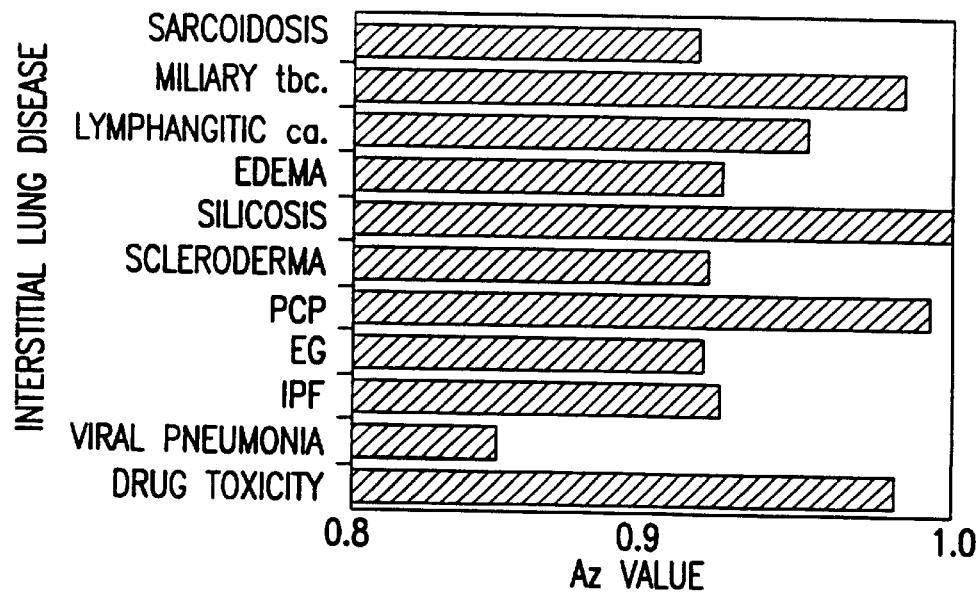
FIG. 21 is a graph showing performance the ANN of FIG. 19 in differential diagnosis of interstitial lung disease for each disease.

Both sensitivity and specificity are approximately 90% at "Top 2" condition. FIG. 21 shows the $A_z$ value of the ANN's performance obtained for each disease. There is a relatively large variation among $A_z$ values on these diseases.

Radiologist Observer Tests

To evaluate the effect of the ANN's output on radiologists' performance in differentiating between 11 interstitial lung diseases on chest radiographs, observer tests were performed. In this invention, 33 actual clinical cases, in which the performance of the ANN was comparable to that obtained by all clinical cases, were used. One radiologist and two radiology residents participated in these tests. First, observers read chest film together with clinical parameters for the initial rating. The observers marked the level of their confidence ratings on a score sheet, for example as shown in FIG. 22, with a pen of a first color at appropriate locations on each line of 11 diseases. The ANN's output shown in FIG. 23, which indicated the likelihood of each of the 11 possible diagnoses for each case, was presented to the observers. The observers were allowed to change their confidence ratings, if needed, due to the ANN's output, with a pen of a second color on the same line as that marked with the pen of the first color. In this way, it was possible to determine the influence of the ANN's output on the diagnosis of each radiologist.

Observer Tests Results

Figure 24:
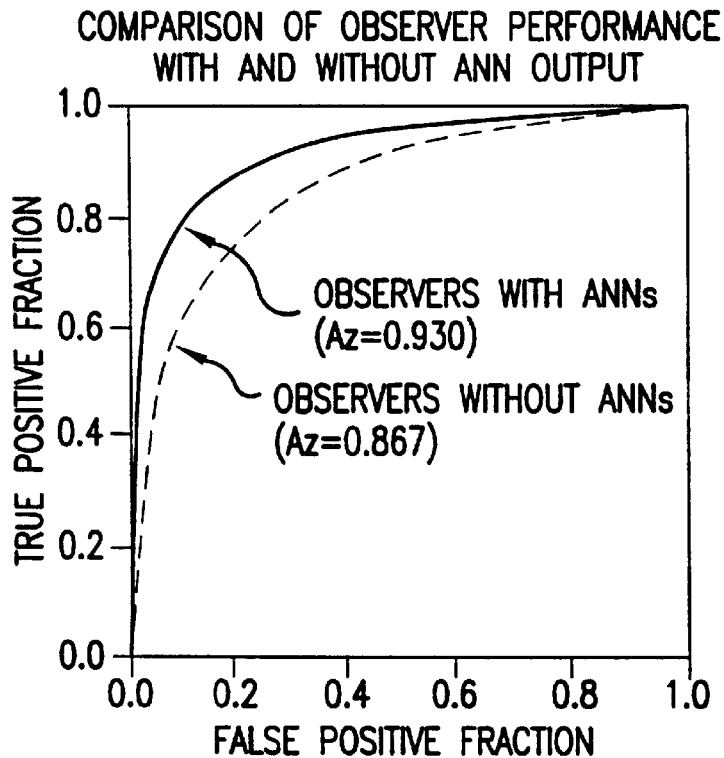
FIG. 24 is an ROC curve showing performance of differential diagnosis of interstitial lung disease with and without computer aid.

Observer performance was evaluated by means of ROC analysis using a continuous rating scale. FIG. 24 shows the comparison of the average ROC curves by observers with and without use of the ANN's output. The average performance of observers with use of the ANN's output was significantly improved as compared to that without computer aid. According to the Student two-tailed t-test, the difference between the $A_z$ values obtained by the observers with and without the ANN was statistically significant ($p<0.05$).

Figure 23:
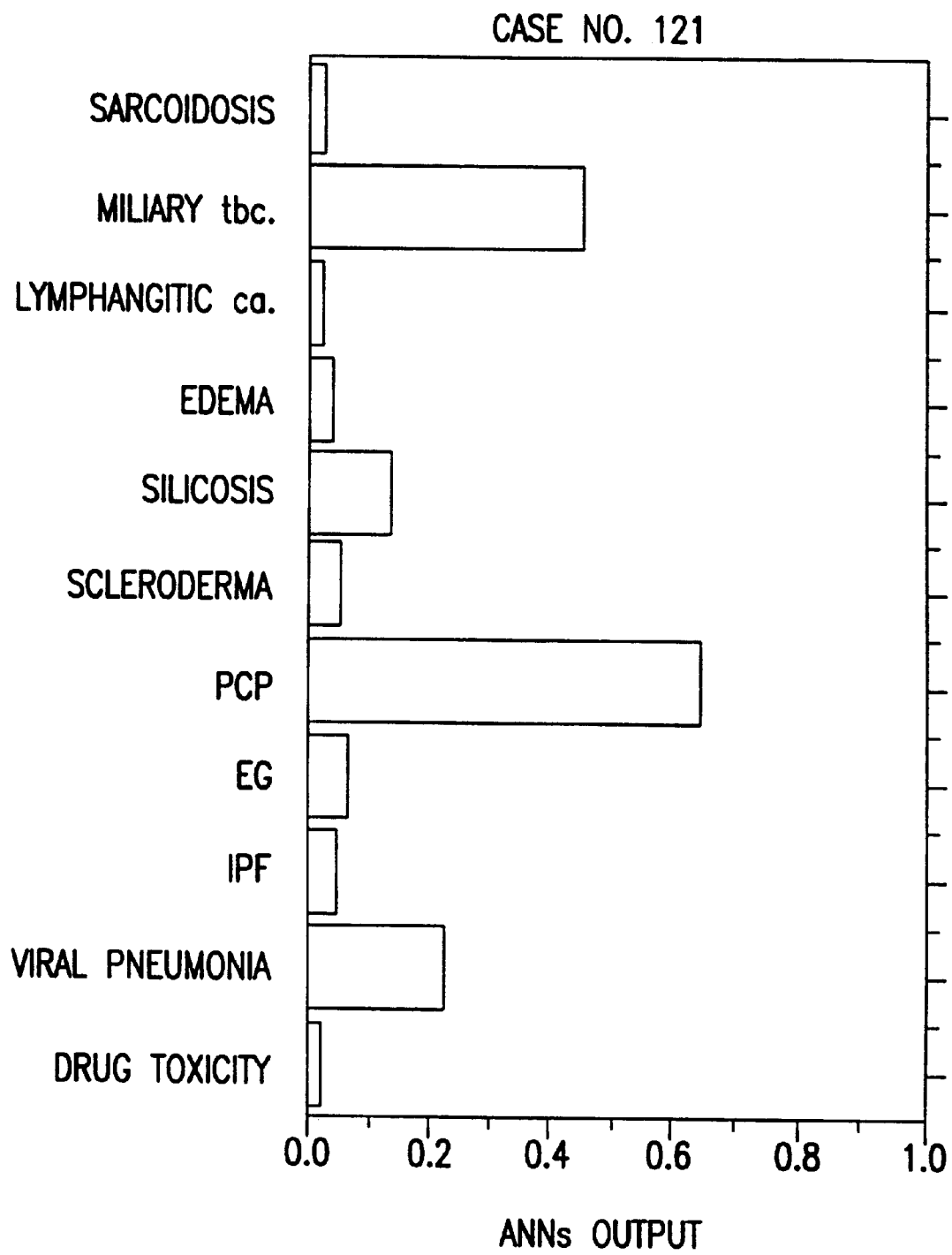
FIG. 23 is an illustration of the output of the ANN of FIG. 19 used for observer tests for monitoring performance in differential diagnosis of interstitial lung disease with and without computer aid.

According to the present invention, ANNs can significantly improve the diagnostic accuracy of observers in their differential diagnosis of interstitial lung disease and can assist observers in their final decision when the ANN's output is used as a second opinion, and as presented in a form similar to that of FIG. 23.

PRESENTATION OF COMPUTER RESULTS (CLASSIFICATION)

According to the present invention, different schemes are used to present the computer's results to the radiologists depending on whether the task is a classification task or detection task as will now be discussed. In a classification, a quantitative assessment of a questionable lesion or area is given. This can simply be done by displaying the computer's result to the radiologist in the form of a number. For example, in mammography, the computer can be used to assist the radiologist in determining whether a lesion is malignant or benign. The computer can accomplish this by extracting features from the image and then combining these features to develop an estimate of the likelihood of malignancy of the lesion. The features can be combined using any of a number of pattern classification techniques, such as an artificial neural network (ANN), as previously described. The output of the pattern classification technique is converted into the likelihood of malignancy in a number of different ways that will be described later.

The computer results are then displayed on a CRT monitor (e.g., display device 200, FIG. 3), printed on a piece of paper, or verbally stated using voice synthesis software (e.g., specialized hardware 330 and speaker 350, FIG. 3). In addition, the values of the individual features are given to the radiologist, in the form of a single number or in the form of bar graphs, which conveys the results to the radiologist faster than a list of numbers.

It is also helpful to display, in conjunction with the numerical results, comparable lesions similar to the one under consideration. The lesions are divided into two groups, benign and malignant. The radiologist then visually compares the appearance of the lesion in question with a set of similar lesions of known pathology. These are lesions with similar features (e.g., reference swetts), and/or lesions with similar likelihood of malignancy. This method has two advantages:

(1) if the lesion in question is radically different from the sample lesions, then it could indicate to the radiologist that the computer has made an error, probably resulting from an error in feature extraction; and (2) it can help the radiologist to understand clinically what the computer's estimated likelihood estimate means from a clinical perspective. This could help the radiologist both better understand the estimate and give the radiologist more confidence to believe the computer result.

The likelihood-of-malignancy Estimate

The first step in presenting the computer results to radiologists for interpretation is to transform the ANN output to a likelihood-of-malignancy estimate. This transformation converts the computer results to a format which is intuitively understandable by radiologists and which radiologists are able to relate to quantitatively.

A transformation of ANN output to likelihood of malignancy, which includes the effect of prevalence, will now be described. The phrase "likelihood of malignancy" can be used to indicate an estimate of the probability that a lesion is malignant. Thus, of 100 lesions labeled with a 20% likelihood of malignancy, 20 lesions are expected to be malignant. The ANN's output is not the likelihood of malignancy, but rather a ranked ordering of the likelihood of malignancy. This output can be used directly in ROC analysis to evaluate the performance of the method of the present invention, because ROC analysis concerns only ranked orders. However, in order for radiologists to incorporate the results of the computer analysis into their diagnostic decision-making process, the ANN output must be transformed to a familiar measure that radiologists understand intuitively. The ranked ordering cannot be easily interpreted by radiologists, because it is generally difficult to compare two ranked orders. In this situation, the two ranked orders are the ranked orders of the method of the present invention and the ranked orders of the radiologist. For example, a ranked order of 20% by the computer can be either higher, equal, or lower, than a ranked order of 50% by a radiologist, depending on the definitions of the two rank-order scales. Therefore, in this invention, the ANN output was transformed to likelihood of malignancy for radiologists' interpretation.

Figure 25:
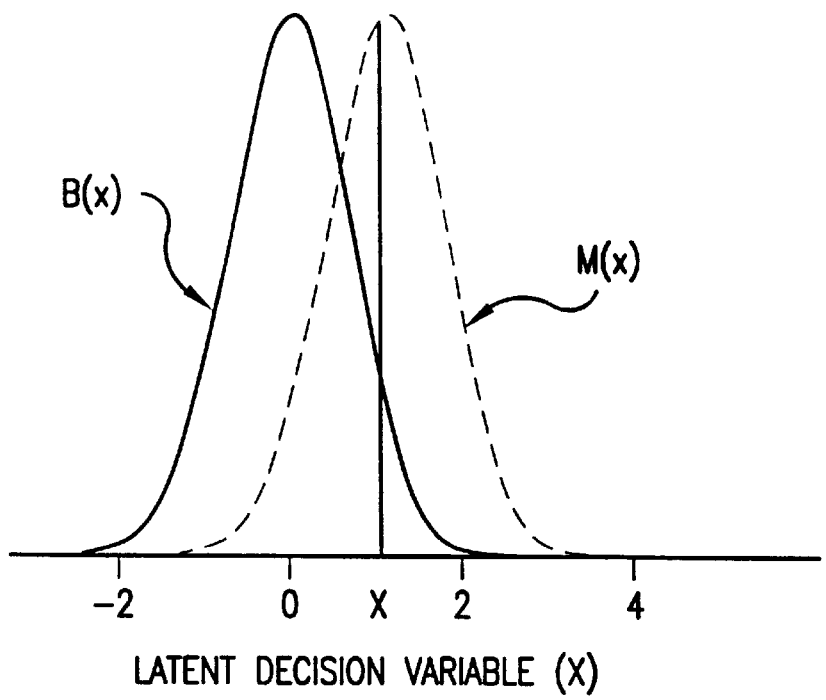
FIG. 25 is a graph used to illustrate the definition of likelihood of malignancy in the binormal model.

The ANN output can be transformed to likelihood of malignancy by using the maximum-likelihood estimated binormal model in ROC analysis, as illustrated in FIG. 25. In FIG. 25, M(x) is the probability density function of a latent decision variable x for actually malignant cases, and B(x) is the analogous probability density function for actually benign cases. The likelihood of malignancy, as a function of the latent decision variable, x, can be written as:

$$LM_1(x) = \frac{\eta M(x)}{\eta M(x) + (1-\eta)B(x)} \quad (22)$$

where $\eta$ is the prevalence of malignant cases in the population studied. $LM_1(x)$ is then converted to a likelihood of malignancy as a function of the ANN output. This is done by a polynomial fit on the data of ANN output (critical values) versus TPF and FPF pairs. These data are printed as a part of the output from the LABROC4 program. [71]

A transformation of the ANN output to the likelihood of malignancy, which does not include the effect of prevalence, will now be described. When a radiologist reads a patient's mammograms and makes a diagnosis based on those mammograms, the radiologist must consider the patient case as an individual case, rather than considering the whole patient population. Therefore, for that particular patient, cancer prevalence obtained from a large patient population is not the critical information. The information contained in the patient's mammograms or chest radiographs is more directly significant.

This alternative transformation of the ANN output to likelihood of malignancy can also be described using the maximum-likelihood estimated binormal model in ROC analysis. Referring to FIG. 25, M(x) is the probability density function of a latent decision variable, x, for actually malignant cases, and B(x) is the analogous probability density function for actually benign cases. The likelihood of malignancy, as a function of the latent decision variable, x, can be written as:

$$LM_2(x) = \frac{M(x)}{M(x) + B(x)} \quad (23)$$

$LM_2(x)$ is then converted to likelihood of malignancy as a function of the ANN output. This is done by a polynomial fit on the data of ANN output (critical values) versus TPF and FPF pairs. These data are printed as a part of the output from the LABROC4 program.

The Composite of Likelihood of Malignancy, Features, and Annotated Mammograms

Figure 26A:
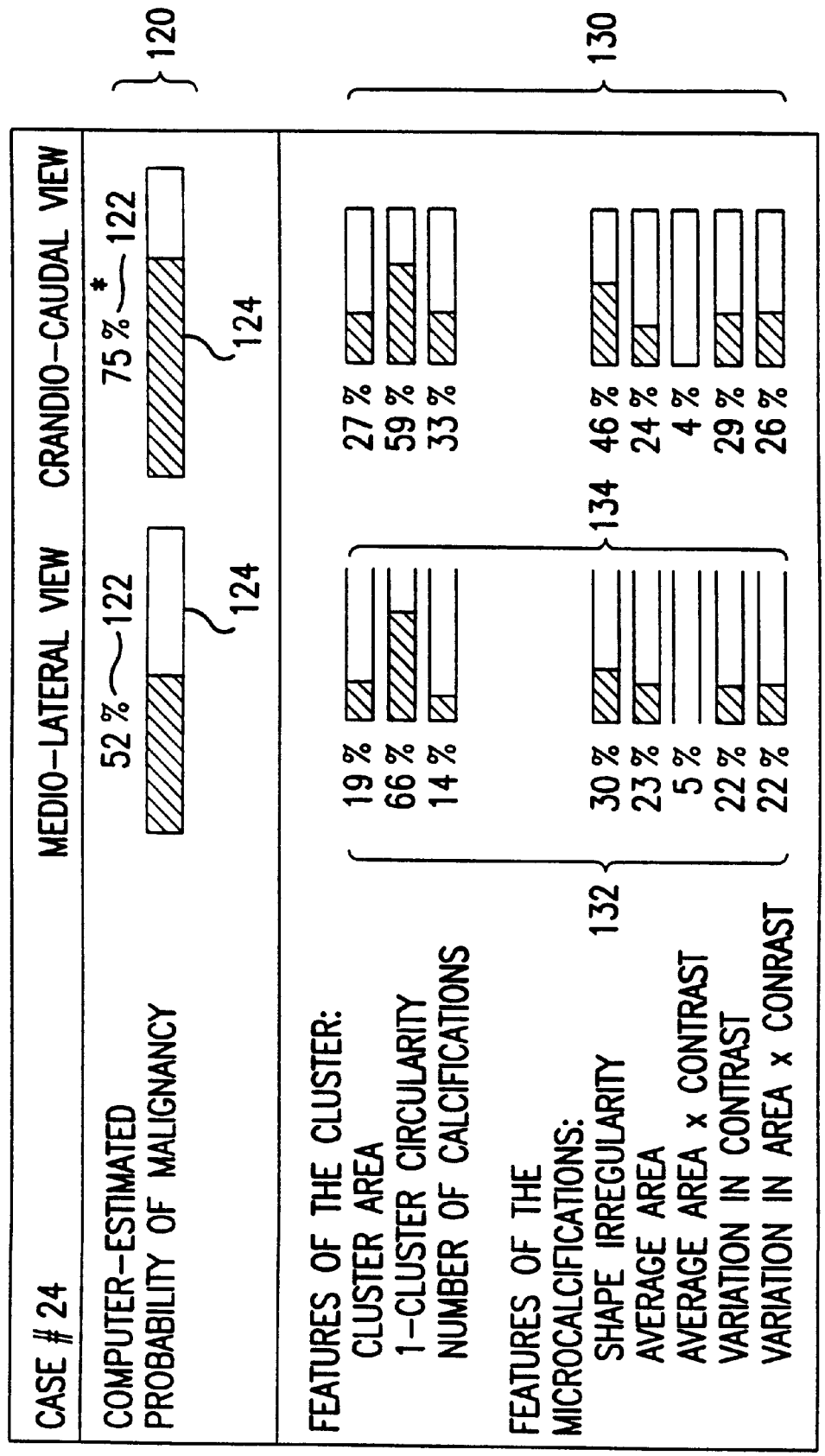
FIG. 26 is an illustration of a display of a composite computer-estimated likelihood of malignancy, computer extracted feature values, and annotated mammographic ROIs containing microcalcifications according to one embodiment of the present invention.
Figure 26B:
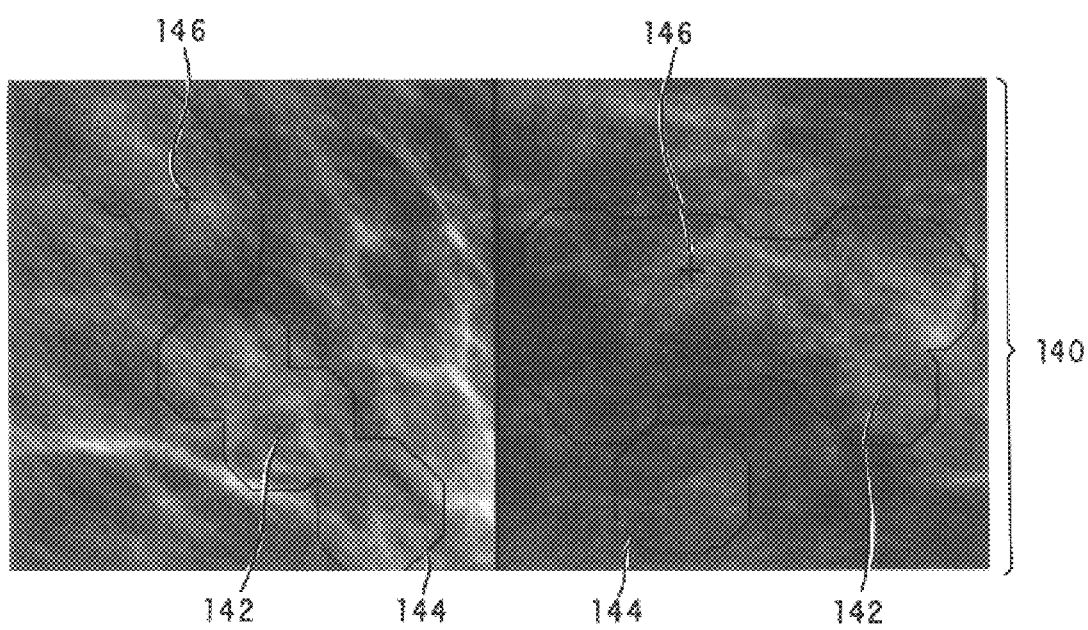

As shown in FIG. 26, the second step of presenting the computer results to radiologists (e.g., with the display 200, FIG. 3), according to the present invention, is to present a composite of the likelihood of malignancy value 120 estimated by the computer (e.g., computer 110, FIG. 3), the feature values 130 extracted by the computer, and regions of interest (ROIs) 140 of the mammograms with annotations generated by the computer. The key of this step is to combine many useful information 120–140 into a concise format so that radiologists can find the critical information quickly, as shown in FIG. 26.

The first component of the second step, is the computer-estimated likelihood of malignancy value 120, as shown in FIG. 26. Because this likelihood-of-malignancy value 120 will be interpreted by the radiologists, one of the transformations previously described must be used to convert the ANN output to a familiar quantity that radiologist can intuitively relate to. This likelihood-of-malignancy value 120 is redundantly presented as a numerical value 122 as well as a bar graph 124 for all views (e.g., MLO and CC views in FIG. 26). The purpose of this redundant presentation is to facilitate easy and fast understanding since some radiologists may be efficient at reading numerical values while others are more familiar with analog scales. A radiologist will choose to read one form (numeric 122 or analog 124) of the presentation and there is no need to read both forms.

The second component of the second step, is the generation of a list of computer-extracted features 130, as shown in FIG. 26. The computer-extracted features 130 serve as the basis of the computer-estimated likelihood of malignancy 120. However, since the computer-extracted features 130 are extracted by the computer, their values may or may not agree with what the radiologists would perceive. Therefore, presenting these computer-extracted features 130 allows radiologists to judge whether the computer analysis is reliable. If the radiologist agrees with the computer-extracted features 130, then the computer-estimated likelihood of malignancy 120 will seem reasonable. Conversely, if the radiologist partially or completely disagrees with the computer-extracted features 130, then the computer-estimated likelihood of malignancy 120 will seem unfounded to that radiologist. The radiologist then uses the information concerning the features in making his/her final diagnosis. Again, the computer-extracted features 130 are redundantly presented as numerical values 132 and as analog bar graph entries 134 for all views, as shown in FIG. 26.

The third component of the second step, is the presentation of the regions of interest (ROIs) 140 of the mammograms containing the microcalcifications in question, as shown in FIG. 26. These ROIs 140 are annotated with information used by the method of the present invention in arriving at the final estimate of the likelihood of malignancy 120. The purpose of these annotations is to provide further information to the radiologists to help him/her understand the computer results and judge the credibility and reliability of the computer's results. Each ROI 140 is annotated with (i) the location of all individual microcalcifications used in the computer analysis, represented by black dots 142, (ii) a computer-estimated margin around the microcalcifications from which features of the cluster are extracted, represented by a black line 144, and (iii) the location of the most linear or irregularly shaped microcalcification as identified by the method of the present invention, represented by a black cross hair 146. These annotated ROIs 140 need not to be high quality images. Their purpose is to allow radiologists to identify the correspondence to the same information in the original mammograms which has the best quality. Therefore, it is important that the ROIs 140 are in the exact same orientation as the original image and is of similar size. The mammographic views (CC, MLO, etc.) are also identified clearly for easy reference, as shown in FIG. 26.

The Presentation of Similar Cases

The second method of presenting the computer results to radiologists is to intelligently collect and present examples of mammographic cases which have similar characteristics as the present case of interest. This method will allow radiologists to intuitively understand the computer results. Radiologists will be able to relate the present case of interest to other previous cases and make a more accurate diagnosis on the basis of a number of (more than one) previous cases with known diagnostic truth.

The presentation of cases with similar likelihood of malignancy as assessed by the method of the present invention will now be described. This method of presentation involves two steps. In the first step, the method of the present invention obtains a quantitative estimate of the likelihood of malignancy. This estimate is the likelihood of malignancy transformed from the ANN output using the two alternative transformations as previously described, or the ANN output without any transformation. This quantitative calculation is an important aspect of the method of the present invention. However, since the likelihood of malignancy estimate will not be seen by the radiologists in this method, whether or not to transform the ANN output or how to transform it is not important. This calculation needs only to be consistent so that it can be used to identify cases with similar probability of malignancy (e.g., within a predetermined percentage, such as 5%).

Figure 27A:
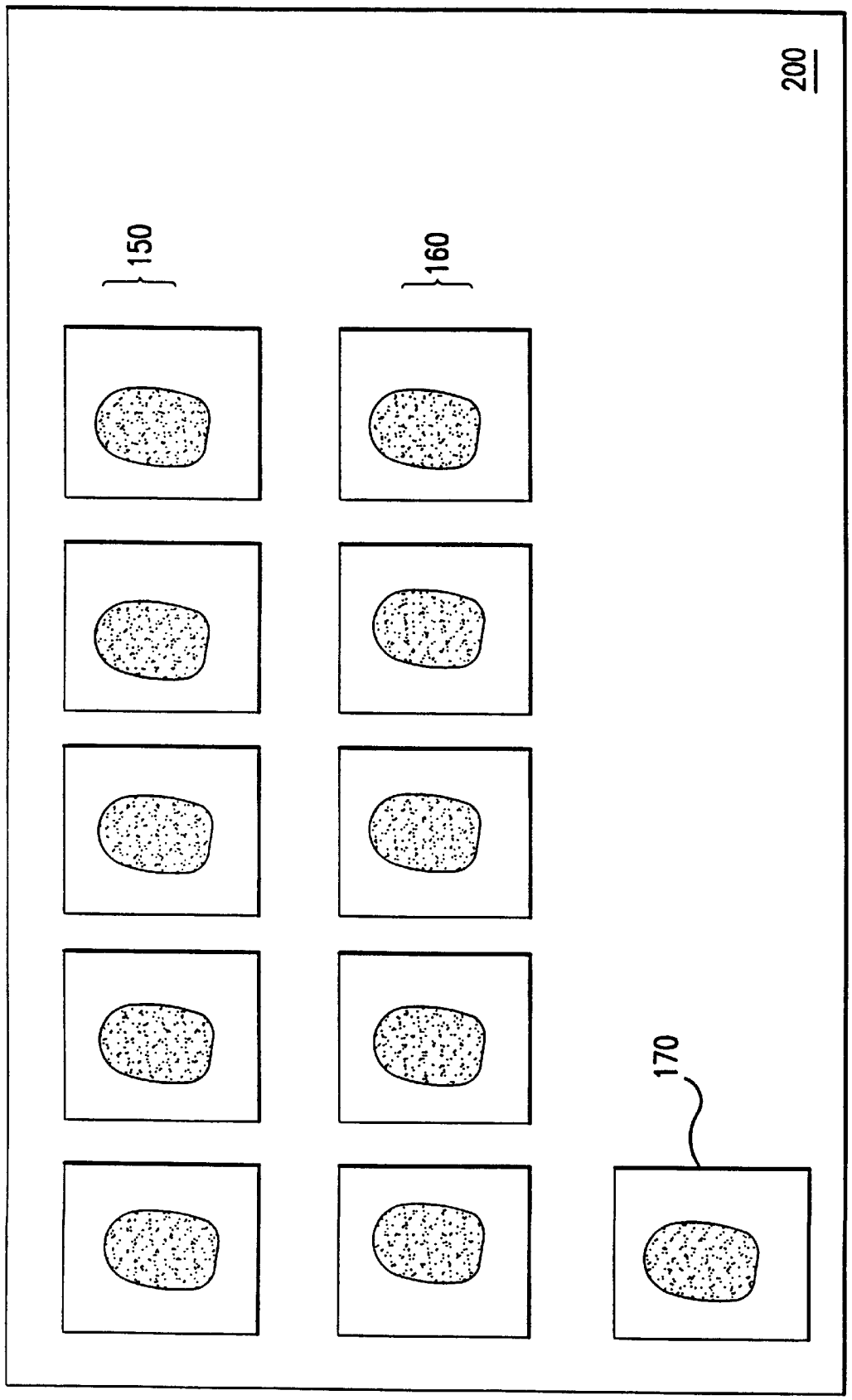
FIGS. 27(a) and 27(b) are illustrations of displays of a composite computer-estimated likelihood of malignancy, computer extracted feature values, and annotated mammographic ROIs containing microcalcifications according to second and third embodiments of the present invention.

In the second step, a few cases which have been assigned the same (or similar) likelihood-of-malignancy values in the calculation described above will be identified and presented to radiologists. Thus, as shown in FIG. 27(a), a radiologist will see a group of, for example, ten mammographic cases which the method of the present invention has assessed the same (or similar) chance of being malignant as the present case of interest. Because the method of the present invention is not perfect in identifying malignant and benign cases, the ten cases with known diagnostic truth and which are assessed of the same likelihood of malignancy by the computer consist of five actually malignant cases 150 and five actually benign cases 160, as shown in FIG. 27(a). Then the radiologist can review all cases and determine whether the present case of interest 170 is most similar to one or more of the actually malignant cases 150, or to one or more of the actually benign cases 160, and make his/her final diagnosis accordingly.

Figure 27B:
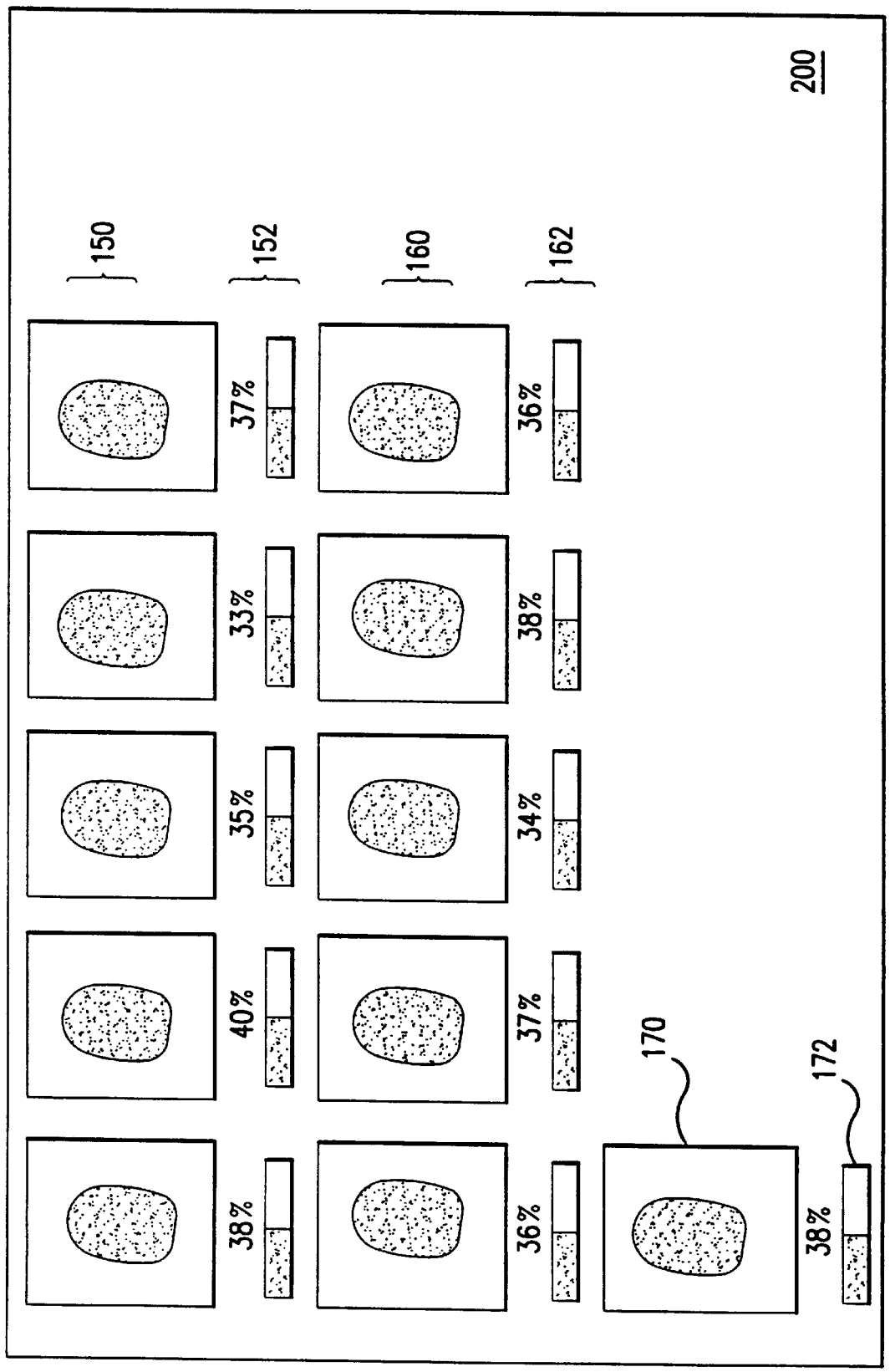

The key to this method is to collect a series of previous cases with diagnostic truth (malignant or benign) already established, and then use the results of the method of the present invention as a guide to identify cases that are similar to the present case of interest. Radiologists may be able to more effectively relate to the example cases used in this method than any quantitative figures as they are accustomed to read mammograms and extract critical information from them. As an alternative, the computer result on the likelihood of malignancy (e.g., the likelihood of malignancy 120 shown FIG. 26) 152, 162 and 172 can be presented to radiologists together with the malignant cases 150, the benign cases 160 and the case of interest 170, respectively, as shown in FIG. 27(b).

The presentation of cases with similar features as extracted by the method of the present invention will now be described. The method of presenting cases with known diagnostic truth (malignant versus benign) and which are assessed similar likelihood of malignancy, as previously described, can be extended to presenting cases with known diagnostic truth and with similar feature values as extracted by the method of the present invention. This method can be used in conjunction with the previously described methods as follows. First, a group of (say, ten) cases with known diagnostic truth and which are assessed similar likelihood of malignancy as the present case of interest by the method of the present invention are presented to the radiologist. If the radiologist is able to identify one or more cases from the group of ten cases which he/she considers to be similar or identical to the present case of interest, then the presentation of the computer results is completed. If, however, the radiologist can not identify an overall similar case, then he/she can proceed to analyze the features of the cases (e.g., the features 130 shown in FIG. 26). At this second stage, a second group of cases with known diagnostic truth (malignant versus benign) and with similar feature values (e.g., within a predetermined percentage, such as 5%, for each feature) as extracted by the method of the present invention are presented to the radiologist. This second group of example cases allows the radiologist to understand and relate to the computer results at the feature level. The radiologist will be able to adjust his/her perception of the features and/or to adjust his/her confidence of the computer accuracy according to the feature example mammograms. Radiologists' first impression of the features are not always accurate and they sometimes modify their assessment of the features as well as their final diagnostic opinion as they spend time analyzing the mammograms. Since the computer-extracted feature values are not always perfectly accurate, the presentation of example cases including similar extracted features can help radiologists better understand the computer results and can result in a more accurate diagnosis.

Interactive User Modification

A final method of presenting the computer results to radiologists is to allow the radiologist to make interactive modification of the information used in the computer analysis, thereby modifying the computer-estimated likelihood of malignancy. The information used by the computer in analyzing the microcalcifications may not be perfectly accurate and the computer may not use all of the microcalcifications in its analysis because not all of the microcalcifications are identified by the method of the present invention. This situation can occur either when there are a large number of microcalcifications present or when some microcalcifications are not distinctively visible. This situation can also happen as a result of the different thresholds in viewing the microcalcifications used by different radiologists—a collection of microcalcifications deemed as a complete identification by one radiologist may be deemed as an incomplete identification by another radiologist. This interactive approach servers as a means of arbitration to allow the radiologist and the method of the present invention to attempt to reach a common ground.

This method consists of a user interface (i.e., the computer 110, FIG. 3) which allows the radiologist to (i) view the computer results (e.g., the likelihood of malignancy, the features, and the annotations, as previously described), (ii) to add/delete microcalcifications with the computer mouse pointer 220 (FIG. 3) or directly with the touch screen display 200 (FIG. 3), and (iii) to identify the most linear or irregularly shaped microcalcification in a cluster with the computer mouse pointer 220 or directly with the touch screen display 200. The add/delete microcalcification function is particularly useful in the cases where two of more clusters are close to each other. In this situation, the delineation of cluster boundary (which is often arbitrary and subjective) is frequently critical to the cluster feature values. For example, the cluster areas of two small clusters will typically be quite different from the cluster area of a large cluster which consists of both of the small clusters.

Another way that this method is useful to the radiologists, is that it allows the radiologists to modify the features values and monitor the changes in the computer-estimated likelihood of malignancy. If utilized by the radiologist from time to time, this process of trial and error will help the radiologists to understand the reasoning of the method of the present invention. The radiologists can identify the relative significance of the features on the final computer-estimated likelihood of malignancy. The radiologist can then compare this observation to his/her own opinion. This information can again serve as a basis of or a criticism to accepting the computer-estimated likelihood of malignancy.

Detection Schemes

Figure 29:
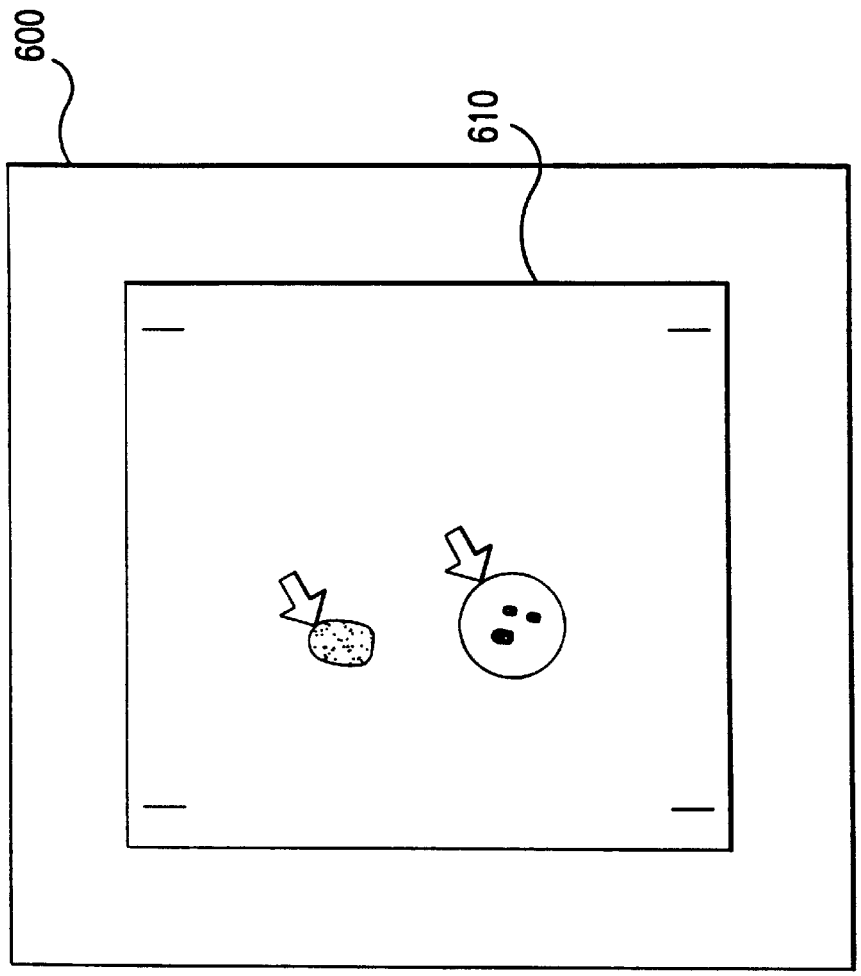
FIG. 29 is an illustration of a display of a detected ROI containing abnormal anatomical regions according to a second embodiment of the present invention.
Figure 28:
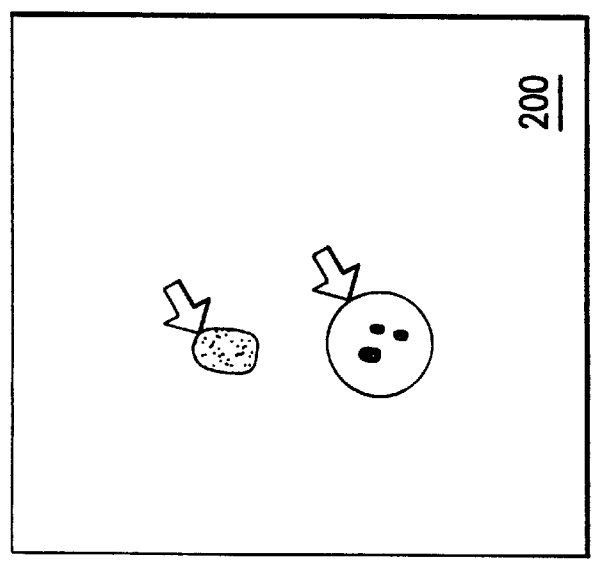
FIG. 28 is an illustration of a display of a detected ROI containing abnormal anatomical regions according to a one embodiment of the present invention.

Displays for computerized detection schemes need to direct radiologists to suspicious areas in a radiographic image. Possible method are to (1) directly annotate a copy of the radiographic image directly on the computer, as shown in FIG. 28 (See U.S. Pat. No. 4,907,156.), or (2) annotate a transparency 610 that then could be overlaid on the final radiograph 600 to identify computer-detected suspicious areas, as shown in FIG. 29, or (3) provide verbal directions for the radiologist to re-examine a specified location in the radiograph (e.g., with specialized hardware 330 and speaker 350, FIG. 3). In a mammogranm, according to method (3), this could be a voice message, such as "possible mass in the upper quadrant of mediolateral projection of the left breast." Method (1) has the advantages of being direct and easy to use, whereas method (2) is somewhat clumsy with a separate overlay that needs to be put into the patient file and then physically aligned with the film by the radiologist. Method (3) can be rather vague and require radiologists to search specified areas of the image, which can be tedious and time consuming.

Figure 30:
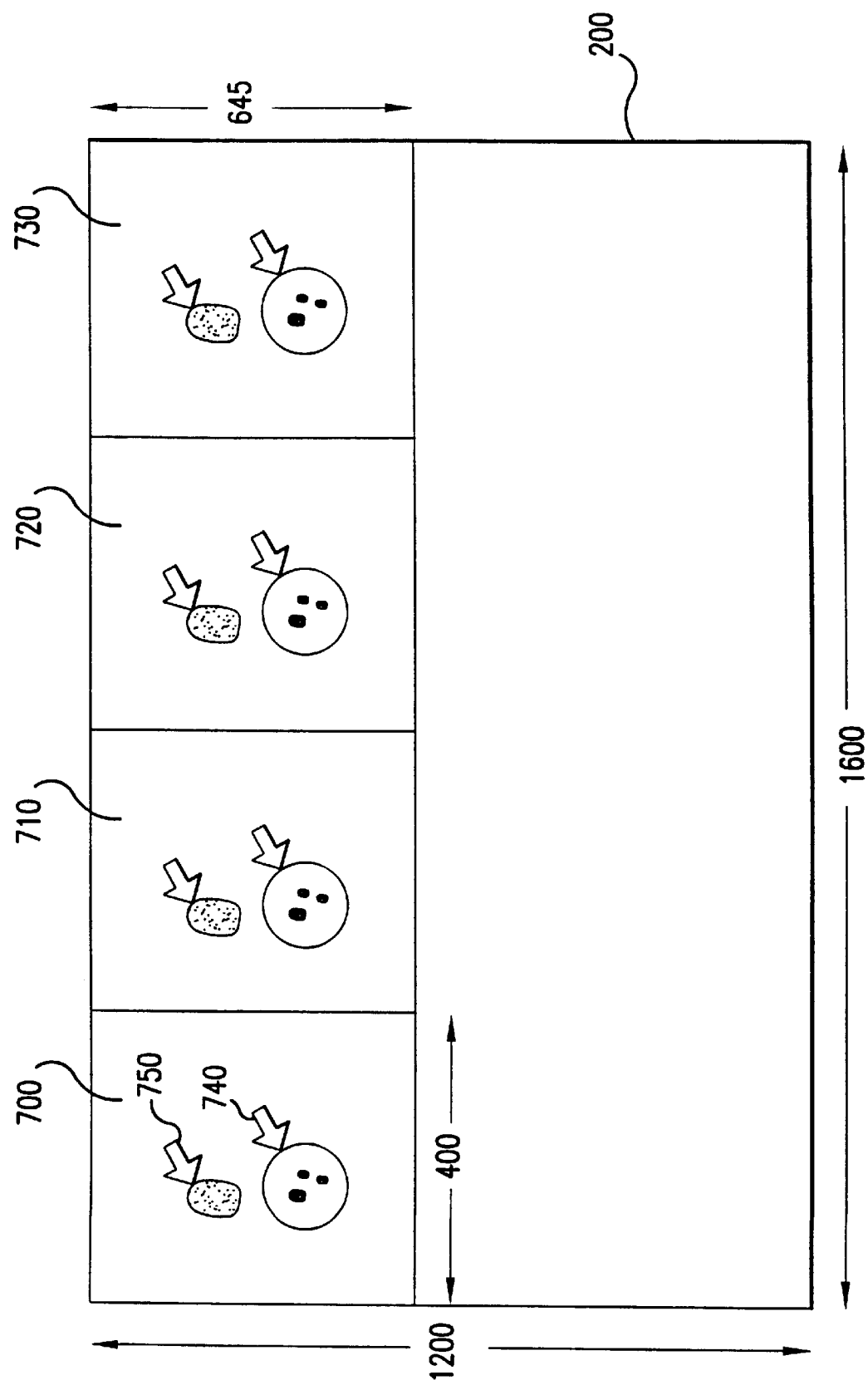
FIG. 30 is an illustration of a display of a plurality of detected ROIs containing abnormal anatomical regions according to a one embodiment of the present invention.
Figure 31:
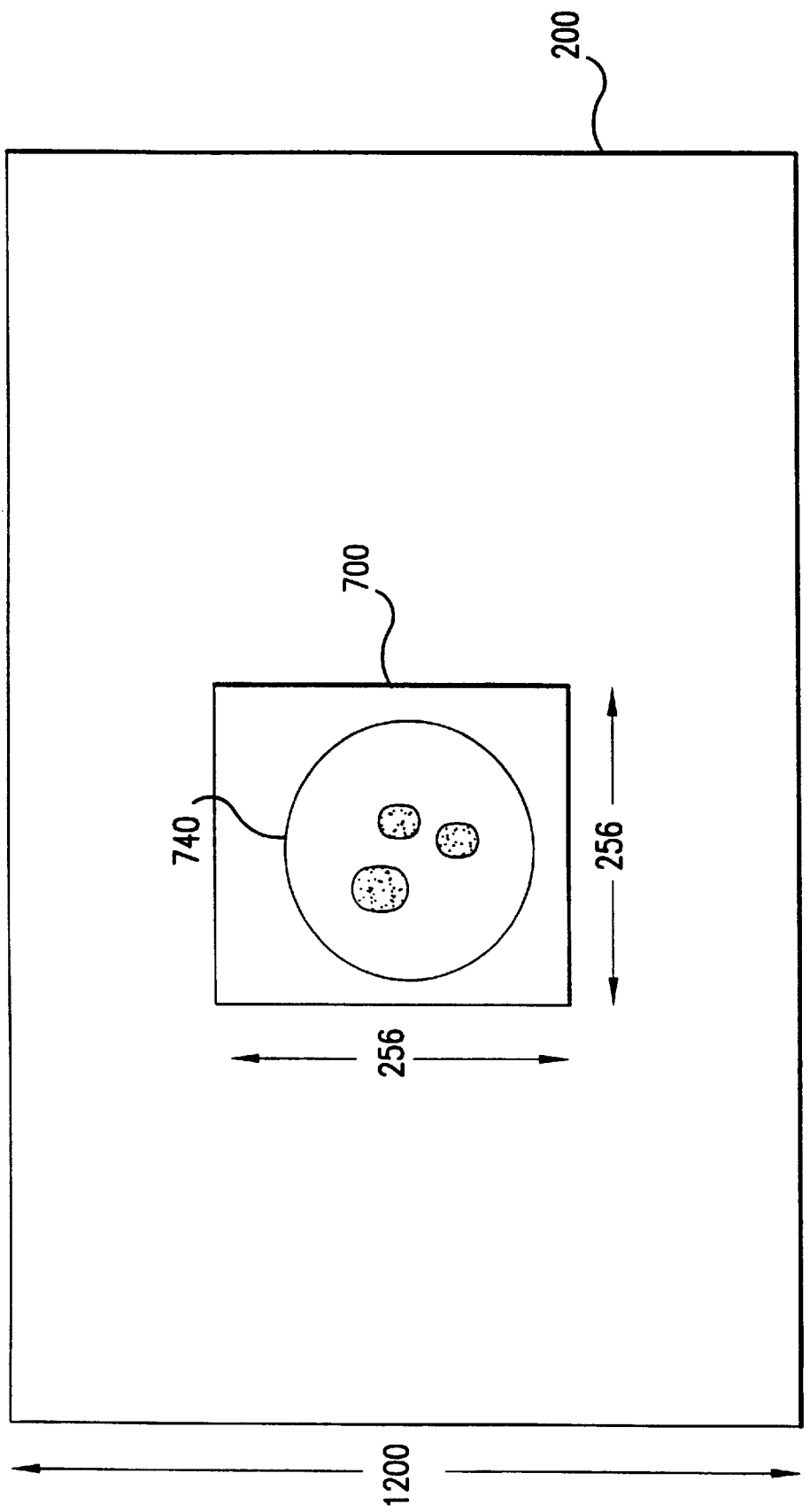
FIG. 31 is an illustration of a display of a cluster microcalcifiction of one of the plurality of detected ROIs of FIG. 30 according to the present invention.
Figure 32:
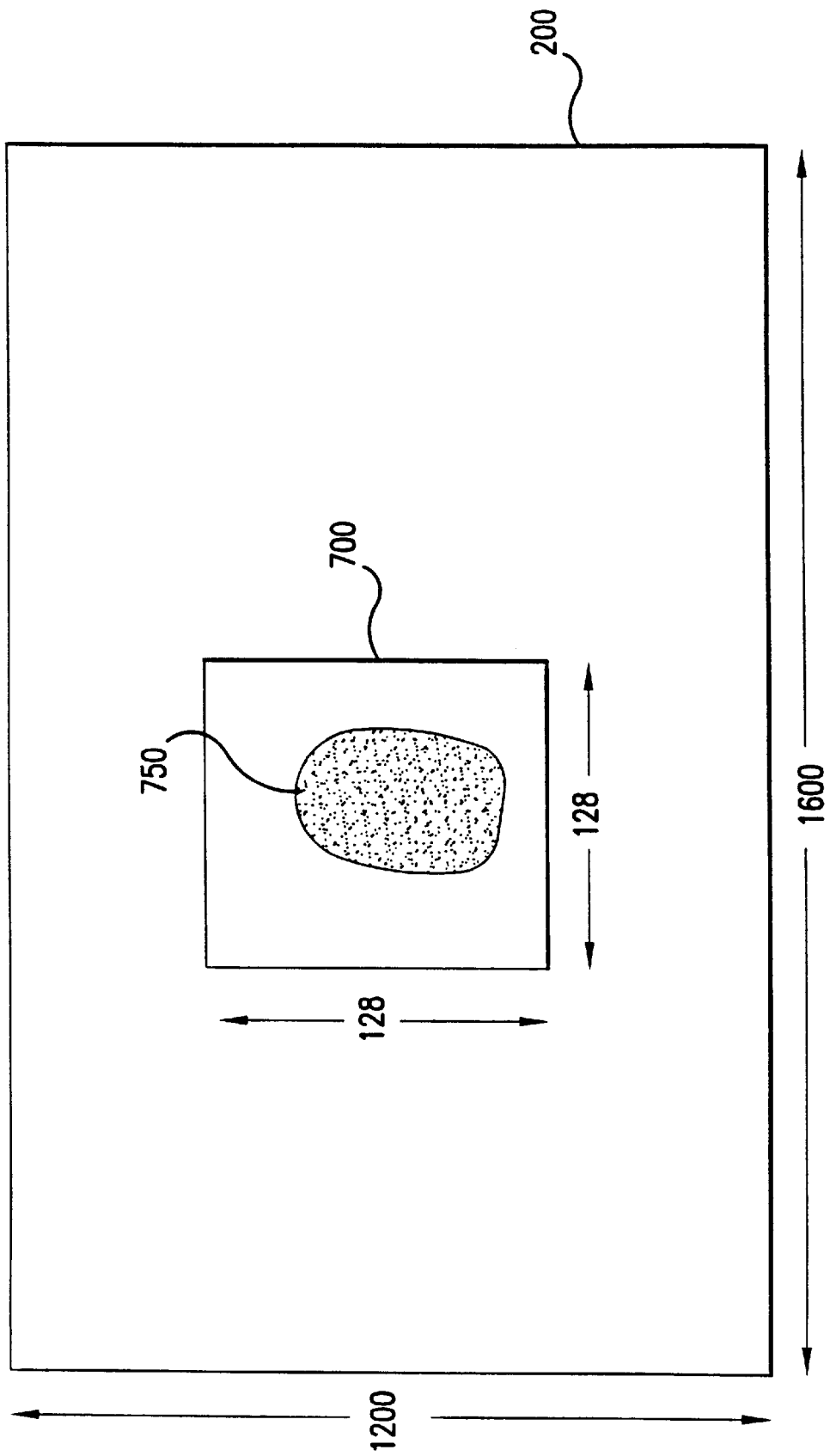
FIG. 32 is an illustration of a display of an individual microcalcifiction of one of the plurality of detected ROIs of FIG. 30 according to the present invention.

FIG. 30 shows a visual interface for mammography that allows the radiologist to interactively query the computer results. The images are displayed on the display device 200 (FIG. 3). The screen is 1600×1200 pixels and four standard mammographic views 700–730 are displayed at reduced resolution in a single line, as shown in FIG. 30. That is, all four views 700–730 are reduced to a 400×645 format size and displayed across the top of the monitor. The computer results are then annotated on these images using color-coded arrows: e.g., a blue arrow 740 for clustered microcalcifications and a red arrow 705 for masses (see, also, U.S. Pat. No. 4,907,156). By touching an arrow, e.g., arrows 740 or 750, the radiologist can display a region-of-interest (ROI) centered on the computer display 200 (FIG. 3), as shown in FIGS. 31 and 32. The ROI is 256×256 pixels at full resolution for clustered microcalcifications (FIG. 31) and two-times pixel replicated 128×128 ROI for masses (FIG. 32). These ROIs allow the radiologist to examine more closely the computer detected area in full detail. In most cases where the computer detection is a false positive, the radiologist can immediately tell from the ROI that the computer detection is false. This obviates the need for the radiologist to re-examine the original film saving time and effort. In cases of a true lesion being detected by the computer then the radiologist will want to re-examine the original film to verify the computer detection.

Figure 33:
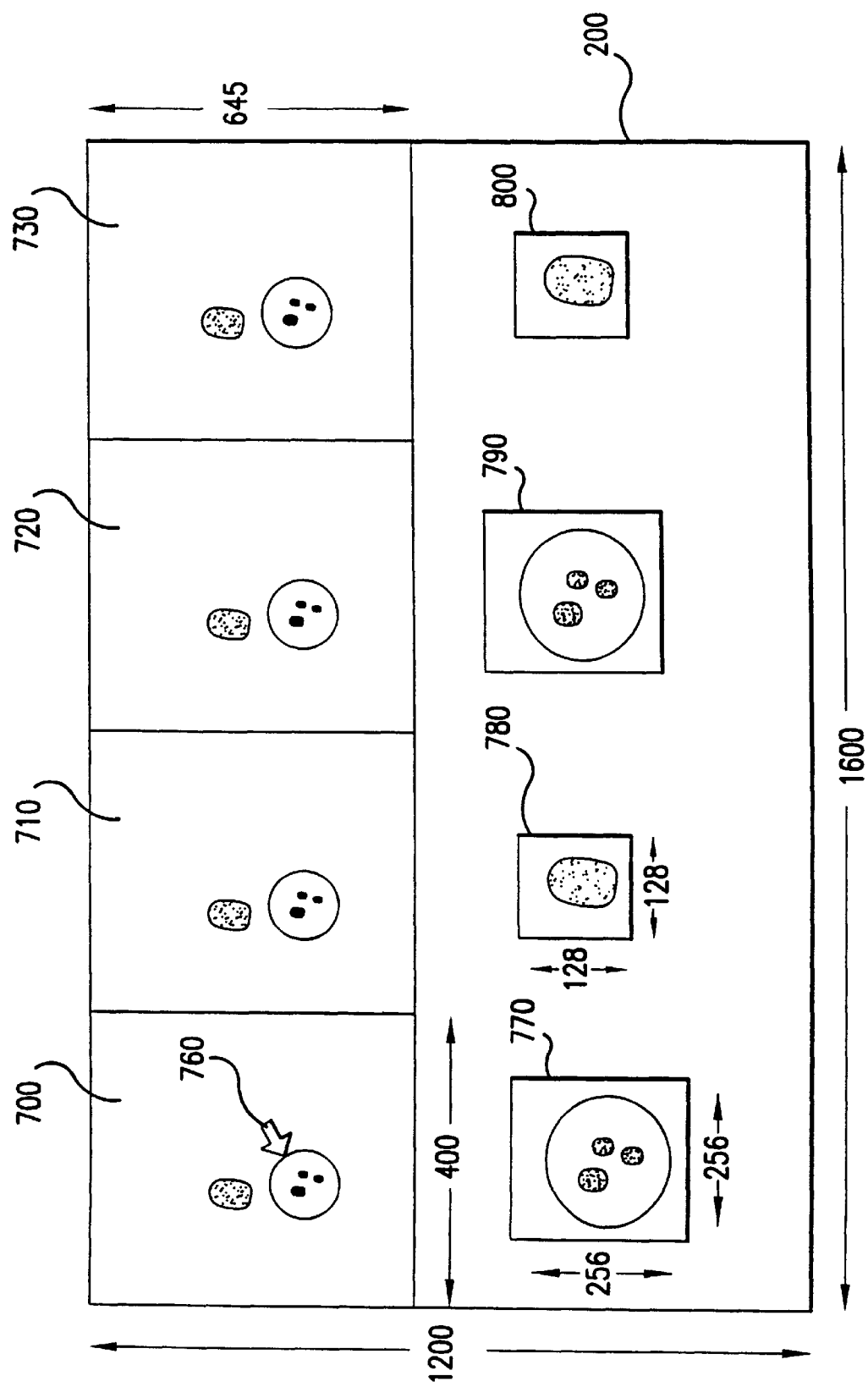
FIG. 33 is an illustration of a display of a plurality of detected ROIs containing abnormal anatomical regions according to a second embodiment of the present invention.

An alternative method for conveying the computer results to the radiologists is again to have the four standard mammographic views displayed at reduced resolution in a single line, as shown in FIG. 33. Then below these images are the ROIs 770–800, at full resolution, corresponding to the computer detections. The radiologist then touches any ROI that he/she thinks shows an actual lesion, e.g., ROI 770 and a corresponding location of the ROI in the full image is shown (e.g., by an arrow 760, as shown in FIG. 33 or with the black dots 142, the cross hairs 146, and/or the regions 144, as shown in FIG. 26).

Although in the preferred embodiment the system is described in terms of using ANNs for classification of microcalcifications and interstitial lung disease, the present invention is not limited to ANNs and other methods and analytic classifiers, such as discriminant analysis, K nearest neighbors, rule-based methods, expert systems etc., can be used for the classification task, as will be readily apparent to those skilled in the art.

Although in the preferred embodiment the system is described in terms of using ANNs with 8 input units, 6 hidden units, and 1 output unit for classification of microcalcifications, and 26 input units, 18 hidden units, and 11 output units for classification of interstitial lung disease, other combinations of input, hidden, and output units are possible, as will be readily apparent to those skilled in the art.

Although in the preferred embodiment, the system is described in terms of detecting, classifying and displaying microcalcifications and interstitial lung disease, in mammograms and chest radiographs, the processes of the present invention can be applied to detecting, classifying and displaying other types of abnormal anatomic regions, in other types of medical images, as will be readily apparent to those skilled in the art.

Although in the preferred embodiment, the system is described in terms of detecting, classifying and displaying microcalcifications and interstitial lung disease, in mammograms and chest radiographs, using differential imaging techniques, the present invention applies to other imaging techniques, such as single imaging techniques, as will be readily apparent to those skilled in the art.

The present invention includes a computer program product, for implementing the processes of the present invention (e.g., as shown in FIGS. 1, 5, 13, 19, 26 and 27–32), which may be on a storage medium including instructions and/or data structures which can be used to program the computer 110 (FIGS. 2 and 3) to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions (e.g., the hard disk 240, the floppy drive 250, the tape or CD ROM drive 260 with the tape or the CD media 270, the RAM 300, and the ROM 310). However, this invention may be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

APPENDIX

[1] Parker S L, Tong T, Bolden S and Wingo P A, Cancer statistics, 1997. *CA Cancer J Clin* 46:5–27; 1997.

[2] Fisher B, Redmond C and Fisher E. Ten-year results of a randomized clinical trial comparing radical mastectomy and total mastectomy with or without radiation. *N Engl J Med* 312:674–682; 1985.

[3] Carter C L, Allen C and Henson D E. Relation of tumor size, lymph node status, and survival in 24,740 breast cancer cases. *Cancer* 63:181–187; 1989.

[4] Buchanan J B, Spratt J S and Heuser L S. Tumor growth, doubling times, and the inability of the radiologist to diagnose certain cancers. *Radiol Clin N Am* 21:115–126; 1983.

[5] Feig S A. Decreased breast cancer mortality through mammographic screening: Results of clinical trials. *Radiology* 167:659–665; 1988.

[6] Moskowitz M and Gartside P S. Evidence of breast cancer mortality reduction: aggressive screening in women under age 50. *AJR* 138:911–916; 1982.

[7] Tabár L, Duffy S W and Krusemo U B. Detection method, tumor size and node metastases in breast cancers diagnosed during a trial of breast cancer screening. *Eur J Cancer Clin Oncol* 23:950–962; 1987.

[8] Pagana T J, Lubbe W J, Schwartz S M and Sprechini G D. A comparison of palpable and nonpalpable breast cancers. *Arch Surg* 124:26–28; 1989.

[9] Bassett L W, Liu T H, Giuliano A E and Gold R H. The prevalence of carcinoma in palpable vs impalpable mammographically detected lesions. *AJR* 157:21–24; 1991.

[10] Kopans D B. Screening mammography and the controversy concerning women aged 40–49 years. In Kopans D B and Mendelson E B eds. *RSNA categorical course in breast imaging* Chicago, Ill.: RSNA, 39–49; 1995.

[11] Dodd G D. American Cancer Society guidelines from the past to the present *Cancer* 72:1429–1432; 1993.

[12] Breen N and Kessler L. Changes in the use of screening mammography: evidence from the 1987 and 1990 National Health Interview Surveys. *Am J Public Health* 84:62–67; 1994.

[13] Haus A G. Technologic improvements in screen-film mammography. *Radiology* 174:628–637; 1990.

[14] Kopans D B. The positive predictive value of mammography. *AJR* 158:521–526; 1992.

[15] Moskowitz M. The predictive value of certain mammographic signs in screening for breast cancer. *Cancer* 51:1007–1011; 1983.

[16] Hall F M. Screening mammography-potential problems on the horizon. *N Engl J Med* 314:53–55; 1986.

[17] Meyer J E, Eberlein T J, Stomper P C and Sonnenfeld M R. Biopsy of occult breast lesions. Analysis of 1261 abnormalities. *JAMA* 4 263:2341–2343; 1990.

[18] Helvie M A, Pennes D R, Rebner M and Adler D D. Mammographic follow-up of low-suspicion lesions: compliance rate and diagnostic yield. *Radiology* 178:155–158; 1991.

[19] Knutzen A M and Gisvold J J. Likelihood of malignant disease for various categories of mammographically detected, nonpalpable breast lesions. *Mayo Clinic Proceeding* 68:454–460; 1993.

[20] Opie H, Estes N C, Jewell W R, Chang C H, Thomas J A and Estes M A, Breast biopsy for nonpalpable lesions: a worthwhile endeavor? *Am Surg* 59:490493; 1993.

[21] Mushlin A I and Fintor L. Is screening for breast cancer cost-effective? *Cancer* 69:1957–1962; 1992.

[22] Lindfors K K and Rosenquist C J. Needle core biopsy guided with mammography: a study of cost-effectiveness. *Radiology* 190:217–222; 1994.

[23] Johns P C and Yaffe M J. X-ray characterization of normal and neoplastic breast tissues. *Phys Med Biol* 32:675–695; 1987.

[24] Nishikawa R M and Yaffe M J. Signal-to-noise properties of mammographic film screen systems. *Med Phys* 12:32–39; 1985.

[25] Bird R E. Professional quality assurance for mammography screening programs. *Radiology* 177:587; 1990.

[26] Murphy W A, Jr., Destouet J M and Monsees B S. Professional quality assurance for mammography screening programs. *Radiology* 175:319–320; 1990.

[27] Thurfjell E L, Lemevall K A and Taube A A S. Benefit of independent double reading in a population-based mammography screening program. *Radiology* 191:241–244; 1994.

[28] Doi K, Giger M L, Nishikawa R M, Hoffinann K R, MacMahon H, Schmidt R A and Chua K G. Digital radiography: a useful clinical tool for computer-aided diagnosis by quantitative analysis of radiographic images. *ACTA Radiologica* 34:426439; 1993.

[29] Giger M L, Nishikawa R, Schmidt R, Vyborny C, Lu P, Jiang Y, Huo Z, Papaioannou J, Wu Y, Cox S, Kunst R, Bick U and Rosculet K. Preliminary evaluation of an "intelligent" mammography workstation. *Proc. SPIE* 1898:764766; 1993.

[30] Vybomy C J. Can computers help radiologists read mammograms? *Radiology* 191:315–317; 1994.

[31] Chan H-P, Doi K, Vyborny C J, Schmidt R A, Metz C E, Lam K L, Ogura T, Wu Y and MacMahon H. Improvement in radiologists' detection of clustered microcalcifications on mammograms: the potential of computer-aided diagnosis. *Invest Radiol* 25:1102–1110; 1990.

[32] Kegelmeyer W P, Pruneda J M, Bourland P D, Hillis A, Riggs M W and Nipper M L. Computer-aided mammographic screening for speculated lesions. *Radiology* 191:331–337; 1994.

[33] Kobayashi T, Xu XW, MacMahon H, Metz C E and Doi K. Effect of a computer-aided diagnosis scheme on radiologists' performance in detection of lung nodules on radiographs, *Radiology* 199:8473–848; 1996.

[34] Monnier-Cholley L, Katsuragawa S, Morishita J, MacMahon H and Doi K. Objective evaluation of computer scheme for detection of interstitial infiltrates on chest radiographs (Abstract). *Radiology* 193(P): 146; 1994.

[35] Chan H-P, Doi K, Vyborny C J, Lam K L and Schmidt R A. Computer-aided detection of microcalcifications in mammograms: Methodology and preliminary clinical study. *Invest Radiol* 23:664–671; 1988.

[36] Fam B W, Olson S L, Winter P F and Scholz F J. Algorithm for the detection of fine clustered calcifications on film mammograms. *Radiology* 169:333–337; 1988.

[37] Davis D H and Dance D R Automatic computer detection of clustered calcifications in digital mammograms. *Phys Med Biol* 35:1111–1118; 1990.

[38] Nishikawa R M, Jiang Y, Giger M L, Schmidt R A, Vyborny C J, Zhang W, Papaioannou J, Bick U, Nagel R and Doi K. Performance of automated CAD schemes for the detection and classification of clustered microcalcifications. In Gale A G, Astley S M, Dance D R and Cairns A Y eds. *Digital Mammography*. Amsterdam: Elsevier Science B. V., 13–20; 1994.

[39] Giger M L, Lu P, Huo Z, Bick U, Vyborny C J, Schmidt R A, Zhang W, Metz C E, Wolverton D, Nishikawa R M, Zouras W and Doi K. CAD in digital mammography: computerized detection and classification of masses. In Gale A G, Asdey S M, Dance D k and Cairns A Y eds. *Digital Mammography*. Amsterdam: Elsevier Science B.V., 281–287; 1994.

[40] Nishikawa R M, Schmidt R A Papaioannou J, Osnis R B, Haldemann Heusler R C, Giger M L, Wolverton D E, Comstock C and Doi K. Performance of a prototype clinical "intelligent" mammography workstation. In Doi K, Giger M L, Nishikawa R M and Schmidt R A eds. *Digital Mammography'96*. Amsterdam: Elsevier Science B.V., 93–96; 1996.

[41] Harms S E, Flamig D P, Hesley K L, Meiches M D, Jensen R A, Evans W P, Savino D A and Wells R V. M R imaging of the breast with rotating delivery of excitation off resonance: clinical experience with pathologic correlation. *Radiology* 187:493–501; 1993.

[42] Stelling C B. M R imaging of the breast for cancer evaluation. Current status and future directions. *Radiol Clin North Am* 33:1187–1204; 1995.

[43] Wahl R L, Cody R L, Hutchins G D and Mudgett E E. Primary and metastatic breast carcinoma: initial clinical evaluation with PET with the radiolabeled glucose analogue 2-[F-18]-fluoro-2-deoxy-D-glucose. *Radiology* 179:765–770; 1991.

[44] Adler L P, Crowe J P, al-Kaisi N K and Sunshine J L. Evaluation of breast masses and axillary lymph nodes with [F-18]2-deoxy-2-fluoro-D-glucose PET. *Radiology* 187:743–750; 1993.

[45] Getty D J, Pickett R M, D'Orsi C J and Swets J A. Enhanced interpretation of diagnostic images. *Invest Radiol* 23:240–252; 1988.

[46] Wu Y, Giger M L, Doi K, Vyborny C J, Schmidt R A and Metz C E. Artificial neural networks in mammography: application to decision making in the, diagnosis of breast cancer. *Radiology* 187:81–87; 1993.

[47] Baker J A, Kornguth P J, Lo J Y and Floyd C E J. Artificial neural network: improving the quality of breast biopsy recommendations. *Radiology* 198:131–135; 1996.

[48] Ackerman L V, Mucciardi A N, Gose E E and Alcorn F S. Classification of benign and malignant breast tumors on the basis of 36 radiographic properties. *Cancer* 31:342–352; 1973.

[49] Gale A G, Roebuck E J, Riley P and Worthington B S. Computer aids to mammographic diagnosis. *Br J Radiol* 60:887–891; 1987.

[50] Cook H M and Fox M D. Application of expert systems to mammographic image analysis. *Am J Physiol Imaging* 4:16–22; 1989.

[51] Patrick E A, Moskowitz M, Mansukhani V T and Gruenstein E I. Expert learning system network for diagnosis of breast calcifications. *Invest Radiol* 26:534–539; 1990.

[52] Elmore J G, Wells C K, Lee C H Howard D H and Feinstein A R. Variability in radiologists' interpretations of mammograms. *N Engl J Med* 331:1493–1499; 1994.

[53] Magnin I E, Alaoui M E and Brémond A. Automatic microcalcifications pattern recognition from x-ray mammographies. *Proc. SPIE* 1137:170–175; 1989.

[54] Parker J, Dance D R and Davies D H. Classification of ductal carcinoma in-situ by image analysis of calcifications from mammograms. *Proc. SPIE* 1905:832–840; 1993.

[55] Dhawan A P, Chitre Y and Moskowitz M. Artificial neural network based classification of mammographic microcalcifications using image structure features. *Proc. SPIE* 1905:820–831; 1993.

[56] Shen L, Rangayyan R M and Leo Desautels J E. Application of shape analysis to mammographic calcifications. *IEEE Trans Med Imaging* 13:263–174; 1994.

[57] Sickles E A Mammographic features of 300 consecutive nonpalpable breast cancers. *AJR* 146:661–663; 1986.

[58] Lanyi M. Diagnosis and differential diagnosis of breast calcifications. Berlin: Springer-Verlag, 1988.

[59] Huo Z, Giger M L, Vyborny C J, Bick U, Lu P, Wolverton D E and Schmidt R A Analysis of speculation in the computerized classification of mammographic masses. *Med Phys* 22:1569–1579; 1995.

[60] Jiang Y, Nishikawa R M, Wolverton D E, Metz C E, Giger M L, Schmidt R A, Vyborny C J and Doi K. Malignant and benign clustered microcalcifications: automated feature analysis and classification. *Radiology* 198:671–678; 1996.

[61] Jiang Y, Metz C E and Nishikawa R M. A receiver operating characteristic partial area index for highly sensitive diagnostic tests. *Radiology* 201:745–750; 1996.

[62] Tabár L and Dean P B. Teaching Atlas of mammography. New York: Thieme-Stratton, 1985.

[63] Jiang Y, Nishikawa R M, Giger M L, Doi K, Schmidt R A and Vyborny C J. Method of extracting signal area and signal thickness of microcalcifications from digital mammograms. *Proc. SPIE* 1718:28–36; 1992.

[64] Karssemeijer N, Frieling J T and Hendriks J H. Spatial resolution in digital mammography. *Invest Radiol* 28:413–419; 1993.

[65] Chan H P, Niklason L T, Ikeda D M, Lam K L and Adler D D. Digitization requirements in mammography: effects on computer-aided detection of microcalcifications. *Med Phys* 21:1203–1211; 1994.

[66] Rumelhart D E, Hinton G E and Williams R. Learning internal representations by error propagation. In Rumelhart D E, McClelland J L and Group TPR eds. Parallel distributed processing: *explorations in microstructure of cognition. Volume 1: Foundations* The MIT Press, 318–362; 1986.

[67] Chan H-P, Sahiner B, Petrick N, Helvie M A, Lam K L, Adler D D and Goodsitt M M. Computerized classification of malignant and benign microcalcifications on mammograms:texture analysis using an artificial neural network. *Phys Med Biol* 42:549–567; 1997.

[68] Metz C E. ROC methodology in radiologic imaging. *Invest Radiol* 21:720–733; 1986. 69 Swets J A, Getty D J, Pickett R M, D'Orsi C J, Seltzer S E and McNeil B J. Enhancing and evaluating diagnostic accuracy. *Med Decis Making* 11:9–18; 1991.

[70] Nishikawa R M, Giger M L, Doi K, Metz C E, Yin F F, Vybomy C J and Schmidt R A. Effect of case selection on the performance of computer-aided detection schemes. *Med Phys* 21:265–269; 1994.

[71] Metz C E, Herman B A and Shen J-H. Maximum-likelihood estimation of receiver operating (ROC) curves from continuously-distributed data. Submitted to *Statistics in Medicine.*

[72] Metz C E. Some practical issues of experiments design and data analysis in radiological ROC studies. *Invest Radiol* 24:234–245; 1989.

[73] D'Orsi C J, Getty D J, Swets J A, Pickett R M, Seltzer S E and McNeil B J. Reading and decision aids for improved accuracy and standardization of mammographic diagnosis. *Radiology* 194:619–622; 1992.

[74] Mammography quality standards act of 1992. Pub L no. 102–539, §354.

[75] Swets J A and Pickett R M. Evaluation of Diagnostic systems: Methods from signal detection theory. New York: Academic Press, 1982.

[76] Dorfman D D, Berbaum K S and Metz C E. Receiver operating characteristic rating analysis. Generalization to the population of readers and patients with the jackknife method. *Invest Radiol* 27:723–731; 1992.

[77] Bassett L W, Hollatz-Brown A J, Bastani R, Pearce J G, Hirji K and Chen L. Effects of a program to train radiologic technologists to identify abnormalities on mammograms. *Radiology* 194:189–192; 1995.

[78] Hillman B J, Fajardo L L, Hunter T B, Mockbee B, Cook C E, Hagaman R M, Bjelland J C, Frey C S add Harris C J. Mammogram interpretation by physician assistants. *AJR* 149:907–912; 1987.

[79] Metz C E. Statistical analysis of ROC data in evaluating diagnostic performance. In Herbert D and Myers R eds. *Multiple Regression Analysis: Application in the Health*

*Sciences* New York: American Institute of Physics, 365–384; 1986.

[80] Hanley J A and McNeil B J. The meaning and use of the area under a receiver operating characteristic (ROC) curve. *Radiology* 143:29–36; 1982.

[81] Kopans D B. Mammography screening for breast cancer. *Cancer* 72:1809–1812; 1993.

[82] Sickles E A, Ominsky S H Sollitto R A, Galvin H B and Monticciolo D L. Medical audit of a rapid-throughput mammography screening practice: methodology and results of 27,114 examinations. *Radiology* 175:323–327; 1990.

[83] Bird R E, Wallace T W and Yankaskas B C. Analysis of cancers missed at screening mammography. *Radiology* 184:613–617; 1992.

[84] McNeil B J and Hanley J A. Statistical approaches to the analysis of receiver operating characteristic (ROC) curves, *Med Decis Making* 4:137–150; 1984.

[85] Metz C E, Wang P-L and Kronman H B. A new approach for testing the significance of differences between ROC curves measured from correlated data. In Deconinck F eds. *Information Processing in Medical Imaging* Nijhoff: The Hague, 432–445; 1984

[86] Halpern E J, Albert M, Krieger A M, Metz C E and Maidment A D. Comparison of receiver operating characteristic curves on the basis of optimal operating points. *Academic Radiology* 3:245–253; 1996.

[87] McClish D K. Analyzing a portion of the ROC curve. *Med Decis Making* 9:190–195; 1989.

[88] Swets J A. Form of empirical ROCs in discrimination and diagnostic tasks: implications for theory and measurement of performance. *Psychol Bull* 99:181–199; 1986

[89] Hanley J A. The robustness of the "binormal" assumptions used in fitting ROC curves. *Med Decis Making* 8:197–203; 1988.

[90] Dorfman D D and Alf E, Jr. Maximum-likelihood estimation of parameters of signal-detection theory and discrimination of confidence intervals-rating method data. *Mathematical Psychology* 6:487–496; 1969.

[91] Kendall M K and Stuart A. The advanced theory of statistics. Vol. 1. 4th ed New York: Macmillan, 1977.

[92] Hays W L. Statistics. 4th ed. Chicago: Holt, Rinehart and Winston, 1988.

[93] Bames G T and Chakraborty D P. Radiographic mottle and patient exposure in mammography. *Radiology* 145:815–821; 1982

[94] Hassler O. Microradiographic investigations of calcifications of the female breast *Cancer* 23:1103–1109; 1969.

[95] Fandos-Morera A, Prats-Esteve M, Tura-Soteras J M and Traveria-Cros A Breast tumors: composition of microcalcifications. *Radiology* 169:325–327; 1988.

[96] Going J J, Anderson T J, Crocker P R and Levison D A Weddellite calcification in the breast: eighteen cases with implications for breast cancer screening. *Histopathology* 16:119–124; 1990.

[97] Gonzalez J E, Caldwell R G and Valaitis J. Calcium oxalate crystals in the breast. Pathology and significance. *Am J Surg Pathol* 15:586–59 1; 1991.

[98] Frouge C, Meunier M, Guinebretiere J-M, Gilles R, Vanel D, Contesso G, Paola R D and Bléry M. Polyhedral microcalcifications at mammography: histologic correlation with calcium oxalate. *Radiology* 186:681–684; 1993.

[99] Winston J S, Yeh I T, Evers K and Friedman A K. Calcium oxalate is associated with benign breast tissue. Can we avoid biopsy? *Am J Clin Pathol* 100:488492; 1993.

[100] see, e.g., U.S. Pat. No. 5,319,549.

[101] see, e.g., U.S. Pat. No. 5,343,390.

[102] see, e.g., U.S. Pat. No. 5,072,384.

[103] The CALBROC algorithm, developed by C E Metz at the University of Chicago, is a version of the CORROC algorithm (Metz C E, WANG P-L and Kronman H B. A new approach for testing the significance of differences between ROC curves measured from correlated data. In Deconinck F eds. *Information Process in Medical Imaging*, Nijhoff: The Hague, 432–445, 1984) that has been modified to analyze continuously-distributed data (Metz C E, Herman B A and Shen J-H. Maximum-likelihood estimation of receiver operating [ROC] curves from continuously-distributed data. Submitted to *Statistics in Medicine*."

[104] see, e.g., U.S. patent application Ser. No. 5,537,485.

[105] Swett H A, Fisher P R. ICON: a computer-based approach to differential diagnosis in radiology. *Radiology* 1987; 163:555–558.

[106] Swett H A, Fisher P R, Cohn A I, Miller P I, Mutalik P G. Expert system controlled image display. *Radiology* 1989; 172:487–493.

[107] Swett H, Giger M L, Doi K. Computer vision and decision support. In: Wells P, Hendee W, Eds. *Perception of Visual Information*. Springer-Verlag, 1992;

What is claimed as new and desired to be secured by Letters Patent of the United States is:

1. A computer-aided method for classifying a digitized medical image of interest, comprising:
   a) locating at least one candidate abnormality in the digitized medical image of interest;
   b) determining a region in which the at least one located candidate abnormality is located;
   c) extracting features from at least one of 1) the at least one located candidate abnormality and 2) said region in which said at least one located candidate abnormality is located;
   d) applying the extracted features to a neural network to produce a classification result;
   e) calculating a likelihood of malignancy of said at least one candidate abnormality using at least one of the following equations, $$LM_1(x) = \frac{\eta M(x)}{\eta M(x) + (1-\eta)B(x)},$$

and $$LM_2(x) = \frac{M(x)}{M(x) + B(x)},$$

wherein x is the classification result produced by the neural network, M(x) is the probability density function of the classification result x that said at least one candidate abnormality is actually malignant, B(x) is the analogous probability density function for actually benign cases, η is the prevalence of malignant cases in a population studied; and f) displaying the calculated likelihood of malignancy.

2. The method of claim 1, wherein step a) comprises: using differential imaging techniques.

3. The method of claim 1, wherein step b) comprises: using segmentation techniques.

4. The method of claim 1, wherein step c) comprises: extracting from the region features including at least one of circularity of the region, area of the region, and a number of candidate abnormalities within the region; and extracting from the at least one candidate abnormality within the region features including at least one of shape irregularity, area, and volume of said at least one candidate abnormality.

5. The method of claim 1, wherein step f) comprises:

displaying the likelihood of malignancy and the digitized medical image annotated with the region and the at least one candidate abnormality within the region.

6. The method of claim 1, wherein step d) comprises:

applying the extracted features to a neural network having eight input units, six hidden units, and one output unit.

7. The method of claim 1, further comprising:

obtaining and defining as features plural of the following: a patient's age, sex, duration of symptoms, severity of symptoms, temperature, immune status, underlying malignancies, smoking habits, dust exposure, and drug treatment; and wherein step c) comprises:
extracting features from the region based on a location of candidate abnormalities within the region, and
extracting from the at least one candidate abnormality plural features selected from the group of features consisting of homogeneity, fineness, coarseness, nodularity, septal lines, honeycombing, and loss of lung volume, and a patient's lymphadenopathy, pleural effusion, and heart; and step d) comprises applying the obtained plural features and the extracted features to said neural network.

8. The method of claim 7, wherein:

said step e) comprises calculating a respective likelihood of malignancy of each of plural predetermined abnormalities; and step f) comprises displaying the calculated likelihood of malignancy of each of the plural predetermined abnormalities.

9. The method of claim 7, wherein:

said step e) comprises applying the obtained plural features and the extracted features to a neural network having twenty-six input units, eighteen hidden units, and eleven output units.

10. The method of claim 9, wherein:

step e) comprises calculating a respective likelihood of malignancy of each of eleven abnormalities; and step f) comprises displaying the calculated likelihood of malignancy of each of the eleven predetermined abnormalities.

11. The method of claim 7, wherein step f) comprises:

displaying at least one of the likelihood of malignancy and the extracted features in at least one of numerical and analog form;

displaying the region annotated with a line around a perimeter of the region superimposed on the digitized medical image; and displaying the candidate abnormalities within the region in the digitized medical image of the case of interest with a location indicator superimposed on the candidate abnormalities.

12. The method of claim 1, wherein:

said step e) comprises calculating a respective likelihood of malignancy of each of plural predetermined abnormalities; and step f) comprises displaying the calculated likelihood of malignancy of each of the plural predetermined abnormalities.

13. The method of claim 1, further comprising:

g) obtaining digitized image data from at least one medical image which includes a candidate abnormality known to be actually abnormal and which has a likelihood of malignancy obtained by means of steps a) through e) similar to the likelihood of malignancy of the candidate abnormality of the digital medical image of interest located in step a);

h) obtaining digitized image data from at least one medical image which includes a candidate abnormality known to be actually normal and which has a likelihood of malignancy obtained by means of steps a) through e) similar to the likelihood of malignancy of the candidate abnormality of the digital medical image of interest located in step a); and i) displaying the digitized medical image of interest and at least one of the digitized image data obtained in steps g) and h), and the likelihood of malignancy of the displayed digitized image data obtained in steps g) and h).

14. The method of claim 13, wherein step a) comprises:

using differential imaging techniques.

15. The method of claim 13, wherein step b) comprises:

using segmentation techniques.

16. The method of claim 13, wherein step c) comprises:

extracting from the region features including at least one of circularity of the region, area of the region, and a number of candidate abnormalities within the region; and extracting from the at least one candidate abnormality within the region features including at least one of shape irregularity, area, and volume of said at least one candidate abnormality.

17. The method of claim 13, wherein step i) comprises:

displaying at least one of the likelihood of malignancy and the extracted features in at least one of numerical and analog form for at least one of the digital image data of interest and the obtained image data;

displaying the region annotated with a line around a perimeter of the region superimposed on the digitized medical images of at least one of the digital image data of interest and the obtained image data; and displaying the at least one candidate abnormality within the region superimposed on the medical images of at least one of the digitized image data of interest and the obtained image data.

18. The method of claim 13, further comprising:

obtaining and defining as features plural of the following: a patient's age, sex, duration of symptoms, severity of symptoms, temperature, immune status, underlying malignancies, smoking habits, dust exposure, and drug treatment; and wherein step c) comprises,
extracting features from the region based on a location of candidate abnormalities within the region, and
extracting features from the candidate abnormalities within the region based on at least one of homogeneity, fineness, coarseness, nodularity, septal lines, honeycombing, and loss of lung volume, and a patient's lymphadenopathy, pleural effusion, and heart size due to the candidate abnormalities within the region; and step d) comprises applying the obtained plural features and the extracted features to said neural network.

19. The method of claim 18, wherein:

said step e) comprises calculating a respective likelihood of malignancy of each of plural predetermined abnormalities; and step f) comprises displaying the calculated likelihood of malignancy of each of the plural predetermined abnormalities.

20. The method of claim 1, further comprising:

displaying plural regions each containing a located candidate abnormality derived from a digitized medical image, and in response to a user input selecting one of the displayed regions, displaying a full image of the digitized medical image from which the selected region was derived, and the location of the user selected region within the full image.

21. The method of claim 1, comprising:

displaying the digitized medical image of interest annotated with a respective region and said at least one candidate abnormality within the region; and superimposing a distinct indicator over a respective candidate abnormality.

22. The method of claim 21, wherein step a) comprises: using differential imagine techniques.

23. The method of claim 21, wherein step b) comprises: using segmentation techniques.

24. The method of claim 21, wherein step f) comprises:

displaying plural digitized medical images annotated with respective regions and candidate abnormalities within the regions.

25. The method of claim 21, wherein step f) comprises:

superimposing a first indicator of a first color over a cluster and a second indicator of a second color over a mass.

26. The method of claim to 21, wherein step f) comprises:

displaying a detailed view of one of clusters and masses indicated by one of first and second indicators upon one of a user touching one of the first and second indicators on a touch screen display and a user pointing to one of the first and second indicators with a pointing device.

27. The method of claim 21, further comprising:

displaying plural regions each containing a located candidate abnormality derived from a digitized medical image, and in response to a user input selecting one of the displayed regions, displaying a full image of the digitized medical image from which the selected region was derived, and the location of the user selected region within the full image.

28. A computer program product comprising a computer storage medium and a computer program code mechanism embedded in the computer storage medium for causing a computer to classify, and display candidate abnormalities in digitized medical images, by performing the following steps:

a) locating at least one candidate abnormality in the digitized medical image of interest;

b) determining a region in which the at least one located candidate abnormality is located;

c) extracting features from at least one of 1) the at least one located candidate abnormality and 2) said region in which said at least one located candidate abnormality is located;

d) applying the extracted features to a neural network to produce a classification result;

e) calculating a likelihood of malignancy of said at least one candidate abnormality using at least one of the following equations, $$LM_1(x) = \frac{\eta M(x)}{\eta M(x) + (1 - \eta)B(x)},$$

and $$LM_2(x) = \frac{M(x)}{M(x) + B(x)},$$

wherein x is the classification result produced by the neural network, M(x) is the probability density function of the classification result x that said at least one candidate abnormality is actually malignant, B(x) is the analogous probability density function for actually benign cases, $\eta$ is the prevalence of malignant cases in a population studied; and f) displaying the calculated likelihood of malignancy.

29. A system for classifying, a digitized medical image of interest, comprising:

a first mechanism configured to locate at least one candidate abnormality in the digitized medical image of interest;

a second mechanism configured to determine a region in which the at least one located candidate abnormality is located;

a third mechanism configured to extract features from at least one of 1) the at least one located candidate abnormality and 2) said region in which said at least one located candidate abnormality is located;

a fourth mechanism configured to apply the extracted features to a neural network to produce a classification result;

a fifth mechanism configured to calculate a likelihood of malignancy of said at least one candidate abnormality using at least one of the following equations, $$LM_1(x) = \frac{\eta M(x)}{\eta M(x) + (1 - \eta)B(x)},$$

and $$LM_2(x) = \frac{M(x)}{M(x) + B(x)},$$

wherein x is the classification result produced by the neural network, M(x) is the probability density function of the classification result x that said at least one candidate abnormality is actually malignant, B(x) is the analogous probability density function for actually benign cases, $\eta$ is the prevalence of malignant cases in a population studied; and a sixth mechanism configured to display the calculated likelihood of malignancy.

30. The system of claim 29, further comprising a memory containing a data structure, comprising:

a field which stores a location of the located at least one candidate abnormality;

a field which stores a location of the region;

fields which store the extracted features from the at least one candidate abnormality and the extracted features from the region; and a field which stores the calculated likelihood of malignancy.

31. The system of claim 30, wherein the sixth mechanism is further configured to display the digitized medical image of interest annotated with a respective region and said at least one candidate abnormality within the region, and superimpose a distinct indicator over a respective candidate abnormality, and said data structure of said memory further comprises:
        fields which store locations of the candidate abnormalities for the respective digitized medical images;
        fields which store locations of the regions for the respective digitized medical images; and
        fields which store locations of the distinct indicators.

32. The system of claim 31, wherein the first mechanism is further configured to use differential imaging techniques, and said data structure of said memory further comprises:
        fields which store parameters for the differential imaging techniques.

33. The system of claim 31, wherein the second mechanism is further configured to use segmentation techniques, and said data structure of said memory further comprises:
        fields which store parameters for the segmentation techniques.

34. The system of claim 31, wherein the sixth mechanism is further configured to superimpose a first indicator of a first color over a cluster and a second indicator of a second color over a mass, and said data structure of said memory further comprises:
        fields which store the locations and colors of the first and second indicators.

35. The system of claim 30, wherein the first mechanism is further configured to use differential imaging techniques, and said data structure of said memory further comprises:
        fields which store parameters for the differential imaging techniques.

36. The system of claim 30, wherein the second mechanism is further configured to use segmentation techniques, and said data structure of said memory further comprises:
        fields which store parameters for the segmentation techniques.

37. The system of claim 30, wherein the third mechanism is further configured to extract from the region features including at least one of circularity of the region, area of the region, and a number of candidate abnormalities within the region, and extract from the at least one candidate abnormality within the region features including at least one of shape irregularity, area, and volume of said at least one candidate abnormality, and said data structure of said memory further comprises:
        fields which store the circularities of the respective regions, the areas of the respective regions, and the number of candidate abnormalities in the respective regions for the respective digitized medical images.

38. The system of claim 30, wherein the fourth mechanism is further configured to apply the extracted features to a neural network having eight input units, six hidden units, and one output unit, and said data structure of said memory further comprises:
        field which store value of the input units, the hidden units, the output unit, and connection weights of the neutral network; and
        field which store the calculated likelihood of malignancy.

39. The system of claim 30, wherein the fifth mechanism is further configured to calculate a respective likelihood of malignancy of each of plural predetermined abnormalities, the sixth mechanism is further configured to display the calculated likelihood of malignancy of each of the plural predetermined abnormalities, and said data structure of said memory further comprises:
        fields which store the calculated likelihoods of malignancy of the plural predetermined abnormalities.

40. The system of claim 30, further comprising:

a seventh mechanism configured to obtain and define as features plural of the following: a patient's age, sex, duration of symptoms, severity of symptoms, temperature, immune status, underlying malignancies, smoking habits, dust exposure, and drug treatment, wherein the third mechanism is further configured to extract features from the region based on a location of candidate abnormalities within the region, and extract from the at least one candidate abnormality plural features selected from the group of features consisting of homogeneity, fineness, coarseness, nodularity, septal lines, honeycombing, and loss of lung volume, and a patient's lymphadenopathy, pleural effusion, and heart, the fourth mechanism is further configured to apply the obtained plural features and the extracted features to said neural network, and said data structure of said memory further comprises:
        fields which store the patient's age, sex, duration of symptoms, severity of symptoms, temperature, immune status, underlying malignancies, smoking habits, dust exposure, and drug treatment;
        fields which store the features extracted from the region based on the location of the candidate abnormalities within the region; and
        fields which store the homogeneity, the fineness, the coarseness, nodularity, septal lines, honeycombing, and loss of lung volume, and the patient's lymphadenopathy, pleural effusion, and heart size, due to the candidate abnormalities within the region.

41. The system of claim 40, wherein the fifth mechanism is further configured to calculate a respective likelihood of malignancy of each of plural predetermined abnormalities, the sixth mechanism is further configured to display the calculated likelihood of malignancy of each of the plural predetermined abnormalities, and said data structure of said memory further comprises:
        fields which store the calculated likelihoods of malignancy of the plural predetermined abnormalities.

42. The system of claim 40, wherein the fourth mechanism is further configured to apply the obtained plural features and the extracted features to a neural network having twenty-six input units, eighteen hidden units, and eleven output units, the fifth mechanism is further configured to calculate a respective likelihood of malignancy of each of eleven abnormalities, the sixth mechanism is further configured to display the calculated likelihood of malignancy of each of the eleven predetermined abnormalities, and said data structure of said memory further comprises:
        fields which store values of the input units, the hidden units, the output units, and connection weights of the neural network; and
        fields which store the calculated likelihoods of malignancy of abnormalities.

43. The system of claim 40, wherein the sixth mechanism is further configured to display at least one of the likelihood of malignancy and the extracted features in at least one of numerical and analog form, display the region annotated with a line around a perimeter of the region superimposed on the digitized medical image, and display the candidate abnormalities within the region in the digitized medical image of the case of interest with a location indicator superimposed on the candidate abnormalities, and said data structure of said memory further comprises:

fields which store parameters for annotating the region with a line around a perimeter of the region; and fields which store parameters for displaying the location indicators superimposed on the candidate abnormalities.

* * * * *